US012601676B2

(12) United States Patent
Blinkov

(10) Patent No.: US 12,601,676 B2
(45) Date of Patent: Apr. 14, 2026

(54) REMOVABLE CIRCULAR NOZZLE FOR FLOW CYTOMETERS

(71) Applicant: CYTEK BIOSCIENCES, INC., Fremont, CA (US)

(72) Inventor: Mikhail Blinkov, Fremont, CA (US)

(73) Assignee: Cytek Biosciences, Inc., Fremont, CA (US)

( * ) Notice: Subject to any disclaimer, the term of this patent is extended or adjusted under 35 U.S.C. 154(b) by 144 days.

(21) Appl. No.: 18/491,684

(22) Filed: Oct. 20, 2023

(65) Prior Publication Data

US 2024/0131506 A1 Apr. 25, 2024
US 2024/0226872 A9 Jul. 11, 2024

Related U.S. Application Data

(60) Provisional application No. 63/418,031, filed on Oct. 20, 2022.

(51) Int. Cl.
*G01N 21/05* (2006.01)
*B01L 3/00* (2006.01)
*G01N 15/1434* (2024.01)

(52) U.S. Cl.
CPC .............. *G01N 21/05* (2013.01); *B01L 3/502* (2013.01); *B01L 3/502715* (2013.01); *G01N 15/1436* (2013.01); *B01L 3/563* (2013.01); *B01L 2200/025* (2013.01); *B01L 2200/026* (2013.01); *B01L 2200/0689* (2013.01); *B01L 2300/0832* (2013.01); *B01L 2300/0877* (2013.01)

(58) Field of Classification Search
CPC ...... B01L 3/502; B01L 9/00; B01L 2200/025; B01L 2200/026; B01L 2200/0689; B01L 2300/0663; B01L 2300/0832; B01L 2400/049; B01L 3/502715; B01L 3/563; B01L 2300/0877; G01N 15/1436
See application file for complete search history.

(56) References Cited

U.S. PATENT DOCUMENTS 3,881,826 A * 5/1975 De Leeuw ............. G01N 21/05
250/576
5,030,002 A * 7/1991 North, Jr. ........... G01N 15/1404
356/336

(Continued)

OTHER PUBLICATIONS

Thomas, Shane; PCT/US23/77492; International Search Report; Apr. 24, 2024; 4 Pages.

(Continued)

*Primary Examiner* — Michael P LaPage
(74) *Attorney, Agent, or Firm* — Alford Law Group, Inc.

(57) ABSTRACT

A circular nozzle assembly is disclosed. A cuvette nozzle subsystem (assembly) for flow cytometry systems is disclosed including a cuvette assembly and a circular nozzle assembly selectively engaged with the cuvette assembly. The cuvette assembly includes a cuvette having a pocket and a flow channel, and a receptacle coupled within the pocket to the cuvette. The receptacle has a through-hole with a tapered conical portion and a circular cylindrical portion. The circular nozzle assembly includes an o-ring gasket coupled to a nozzle body with a flow channel. A tapered conical portion of the nozzle body engages the tapered conical portion of the through-hole to align the respective flow channels of the cuvette and the nozzle body together.

6 Claims, 45 Drawing Sheets

(56)                    References Cited

U.S. PATENT DOCUMENTS

| | | | | |
|---|---|---|---|---|
| 5,690,895 A * | 11/1997 | Matsumoto | ............ | G01N 21/05 |
| | | | | 356/73 |
| 8,233,146 B2 | 7/2012 | Chen | | |
| 9,927,345 B2 | 3/2018 | Buchanan et al. | | |
| 2004/0062685 A1* | 4/2004 | Norton | ............... | G01N 15/1404 |
| | | | | 436/63 |
| 2008/0291425 A1 | 11/2008 | Norton et al. | | |
| 2013/0343965 A1* | 12/2013 | Fox | ........................... | B01L 3/56 |
| | | | | 422/500 |
| 2014/0076994 A1 | 3/2014 | Buchanan et al. | | |
| 2015/0332907 A1* | 11/2015 | Valaskovic | ........... | H01J 49/167 |
| | | | | 250/282 |
| 2016/0320287 A1* | 11/2016 | Buchanan | .............. | G01N 15/14 |
| 2018/0038784 A1* | 2/2018 | Marks | ................ | G01N 15/1404 |
| 2019/0055598 A1* | 2/2019 | Buermann | ........ | B01L 3/502715 |
| 2024/0075477 A1* | 3/2024 | Shi | ............................ | B01L 3/56 |
| 2024/0094113 A1* | 3/2024 | Shi | ......................... | G01N 21/05 |

OTHER PUBLICATIONS

Thomas, Shane; PCT/US23/77492; Written Opinion of the International Searching Authority; Apr. 24, 2024; 6 Pages.

* cited by examiner

120

302A

302B

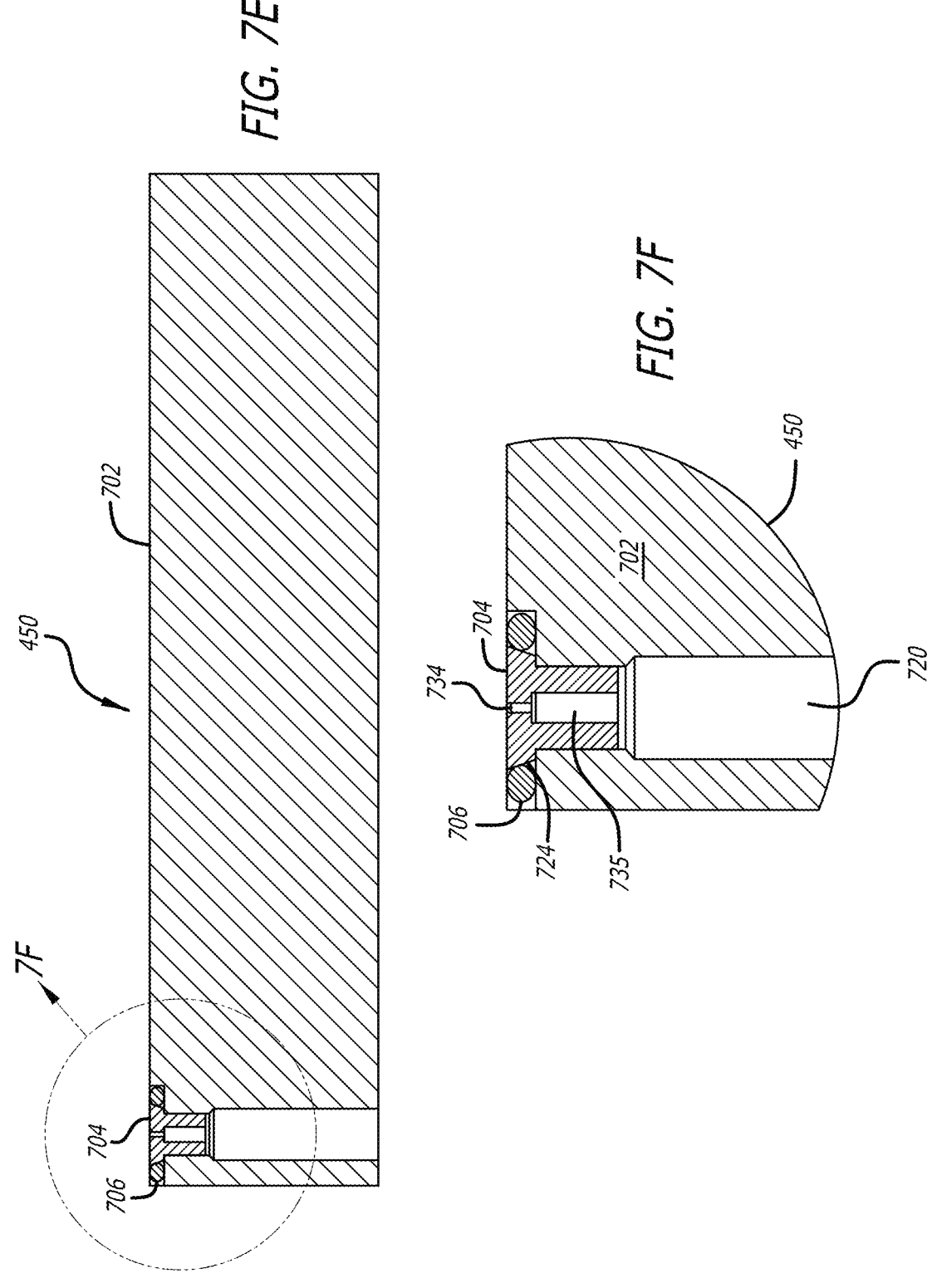

Exploded Side View

Side View Flipped
Upside Down

Assembled
Perspective View

Assembled Perspective Cross Sectional View

Assembled Bottom View

Circular Nozzle Perspective

Circular Nozzle Assembly
Cross section Side View

1008

1012

1010

1012T

1012B

1008B

Double check bottom
- made from top view

Circular Nozzle Bottom View

Circular Nozzle Top View

Perspective View

Side View

Bottom View

Top View

Magnified Partial Side View

1400
Alignment
Jig/fixture
Assembly

1000
Cuvette-
Nozzle
Subsystem

Top Sight hole 1416Z
1420T "Z-adjustment screw"
Z - pressing nozzle and receptacle to cuvette 1405 Arm Cuvette is attached to X,Y stage.

1416X
X adjustment

Y adjustment
1416Y

1402
Alignment Jig

1404 Back

1403 Base

1414
X,Y stage. Used for adjusting nozzle and...

Bottom Sight
hole
1420B

Perspective View of Jig Assembly

Perspective Line View - Jig Assembly

Magnified Side View - Jig Assembly Portion

Alignment can be observed from the top or bottom.

Optical Scope/Alt Light 1502T

1400 Alignment Fixture Assembly

Top Sight hole 1420T

1000

Light/Alt. Optical Scope 1502B

Bottom Sight hole 1420B

Side View

View - Alignment Needed

Aligned View

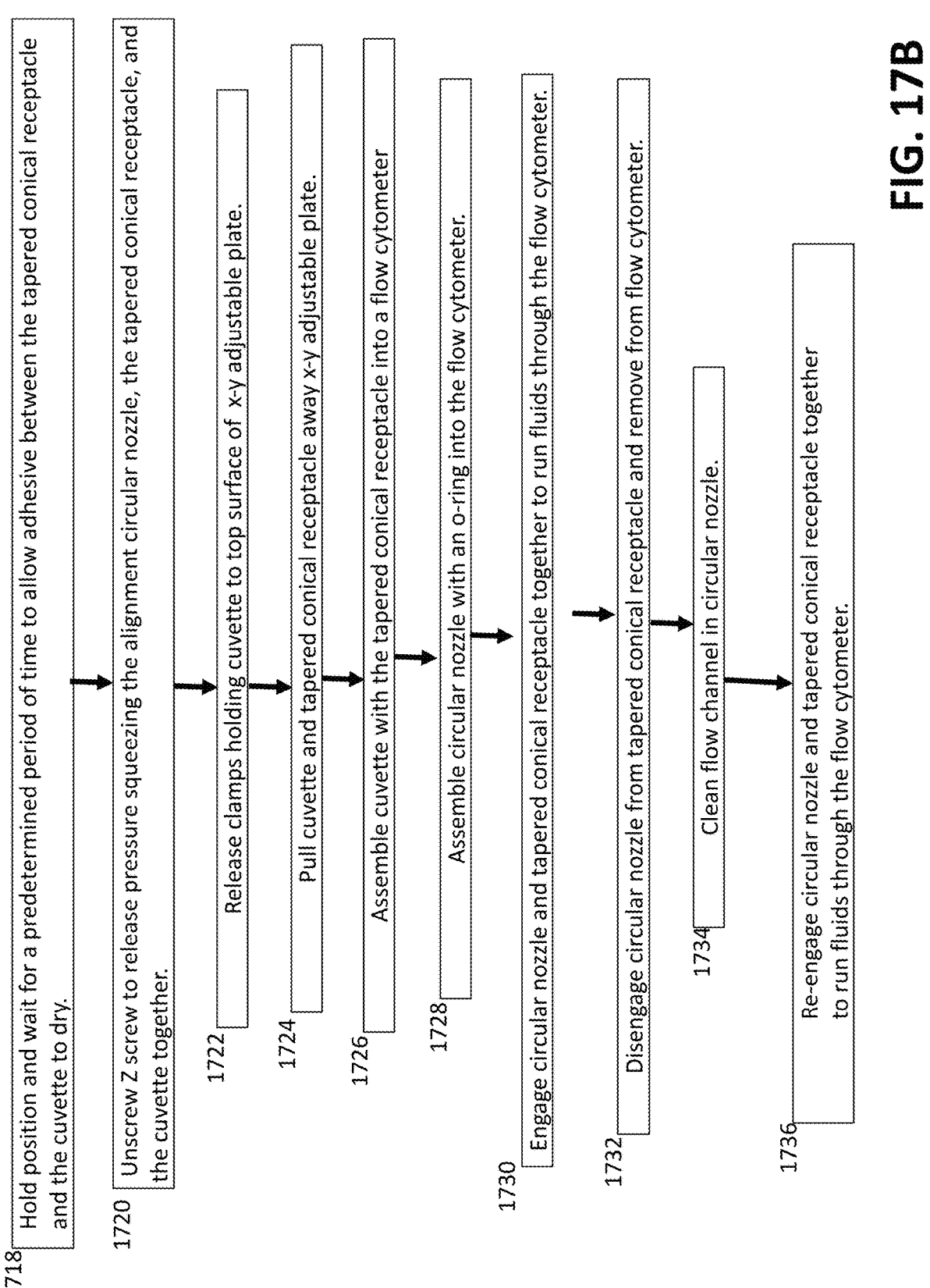

1718 Hold position and wait for a predetermined period of time to allow adhesive between the tapered conical receptacle and the cuvette to dry.

1720 Unscrew Z screw to release pressure squeezing the alignment circular nozzle, the tapered conical receptacle, and the cuvette together.

1722 Release clamps holding cuvette to top surface of x-y adjustable plate.

1724 Pull cuvette and tapered conical receptacle away x-y adjustable plate.

1726 Assemble cuvette with the tapered conical receptacle into a flow cytometer

1728 Assemble circular nozzle with an o-ring into the flow cytometer.

1730 Engage circular nozzle and tapered conical receptacle together to run fluids through the flow cytometer.

1732 Disengage circular nozzle from tapered conical receptacle and remove from flow cytometer.

1734 Clean flow channel in circular nozzle.

1736 Re-engage circular nozzle and tapered conical receptacle together to run fluids through the flow cytometer.

FIG. 17B

REMOVABLE CIRCULAR NOZZLE FOR FLOW CYTOMETERS

CROSS-REFERENCE TO RELATED APPLICATIONS

This patent application is a non-provisional that claims the benefit of United States (US) Provisional Patent Application No. 63418031 titled METHODS AND APPARATUS FOR REMOVABLE CIRCULAR NOZZLE IN FLOW CYTOMETERS filed on 20 Oct. 2022, by inventor Mikhail Blinkov, incorporated herein by reference for all intents and purposes.

This patent application incorporates by reference United States (US) Patent Application No. 17665480 titled INTEGRATED COMPACT CELL SORTER filed on Feb. 4, 2022, by inventors Glen Krueger et al., incorporated herein by reference for all intents and purposes. U.S. patent application Ser. No. 17/665,480 claims the benefit of U.S. Provisional Patent Application No. 63/172,072 titled INTEGRATED COMPACT CELL SORTER filed on Apr. 7, 2021, by inventors Glen Krueger et al., incorporated herein by reference for all intents and purposes.

FIELD

The disclosed embodiments relate generally to flow cytometer and cell sorter systems.

BACKGROUND

Flow cytometry and cell sorting involves the optical measurement of cells or particles of a test sample carried in a fluid flow. Cell sorting further sorts out selected cells of interest into different containers (e.g., test tubes) for further usage (e.g., testing) or counting. The lab instruments that achieve these tasks are respectively known as a flow cytometer and a cell sorter. The cell sorter can also be referred to as a sorting flow cytometer.

Cell sorters and flow cytometers are often configurable with removable nozzles. This is so that the nozzle can be periodically cleaned to avoid a clogged orifice and cross-contamination between different samples that are being tested. Additionally, different nozzles may be selected with different diameters of orifices to accommodate different drop sizes and different drop delays between sample drops of differing biological samples. After a periodic (e.g., daily) calibration of the flow cytometer with a selected nozzle, the nozzle may be removed multiple times during the same day. It is desirable that the removable nozzle is inserted substantially back into the same position that it was when previously calibrated. This is so the drop size and the drop delay (drop quality) between sample drops is substantially the same from sample run to sample run each time the removable nozzle is replaced after cleaning.

Furthermore, for efficient flow of drops of sample fluids in a flow cytometer, it is desirable that axes of the flow (fluid) channels in the nozzle and orifice are substantially in line (concentric) with the axis of the flow channel in a cuvette. It is desirable to periodically (e.g., during initial assembly and reassembly) check and set the channel alignment of these flow channels. If the flow channels are out of alignment, it is desirable to adjust the alignment of the nozzle with the cuvette in the flow cytometer to bring the channels into substantial alignment to increase drop efficiency and drop quality.

SUMMARY

The embodiments are best summarized by the claims. However, a summary of some of the embodiments is provided here.

In one embodiment, a cuvette nozzle subsystem (assembly) for flow cytometry systems is disclosed. The cuvette nozzle subsystem comprises a cuvette assembly and a circular nozzle assembly. The cuvette assembly includes a cuvette having a pocket and a flow channel, and a receptacle coupled within the pocket to the cuvette, wherein the receptacle has a body with a through-hole having a tapered conical portion and a circular cylindrical portion. The circular nozzle assembly is selectively engaged with the cuvette assembly. The circular nozzle assembly has an o-ring gasket coupled to a nozzle body with a flow channel. The nozzle body has a tapered conical portion to engage with the tapered conical portion of the through-hole in the receptacle to align the respective flow channels of the cuvette and the nozzle body together.

In another embodiment, a flow cytometer or cell sorter system is disclosed. The system comprises: a flow cell coupled in communication with a fluidics system to receive a sheath fluid, wherein a sample fluid flows with cells or particles through the flow cell to be surrounded by the sheath fluid. the flow cell includes a flow cell body coupled around the drop drive assembly to receive the sample fluid from the sample injection tube; a cuvette coupled to a base of the flow cell body, the cuvette having a pocket and a cylindrical flow channel to receive the fluid stream of the sample fluid; a receptacle coupled to the cuvette within the pocket by an adhesive, wherein the receptacle has a body with a through-hole having a tapered conical portion; and a circular nozzle assembly selectively engageable with the receptacle and cuvette. The circular nozzle assembly has a nozzle body with a center flow channel and an o-ring gasket coupled to a top surface around the center flow channel. The nozzle body has an upper tapered conical portion to engage with the tapered conical portion of the through-hole in the receptacle to align together the cylindrical flow channel of the cuvette and the center flow channel of the nozzle body.

In another embodiment, a method for a circular nozzle assembly of a flow cytometer or cell sorter system is disclosed. The method includes moving a first circular nozzle assembly up into a pocket of a cuvette in a flow cytometer; further moving the first circular nozzle assembly up to insert a tapered conical portion of the first circular nozzle assembly into a through-hole of a receptacle; and further moving the first circular nozzle assembly up to engage the tapered conical portion of the first circular nozzle assembly with a tapered conical portion of the through-hole in the receptacle to guide the flow channels in the cuvette and the first circular nozzle assembly into alignment together.

In another embodiment, a method for coupling a receptacle and cuvette together for a subassembly of a flow cytometer or a cell sorter is disclosed. The method include providing a cuvette 406 with a pocket 1003; applying a thin layer of adhesive to one or more portions of a top surface 1003T in the pocket 1003 of the cuvette 406; placing a receptacle into the pocket 1003 of the cuvette so that its base engages the one or portions of adhesive and the surface 1003T of the cuvette 406, wherein a through-hole of the receptacle is around a flow channel in the cuvette; and waiting a predetermined period of time (a wait or drying period) to allow the adhesive 1005 between the receptacle 1006 and the cuvette 406 to dry.

BRIEF DESCRIPTION OF THE DRAWINGS

Various embodiments are illustrated by way of example, and not by way of limitation, in the Figures of the accompanying drawings.

FIG. 7E is a cross-sectional view of the nozzle assembly.

FIG. 7F is a magnified view of a portion of cross-sectional view of the nozzle assembly.

FIGS. 17A-17B are a flow chart of the steps of an alignment process to align flow channels in the circular nozzle and the cuvette.

It will be recognized that some or all of the Figures are for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION

In the following detailed description of the embodiments, numerous specific details are set forth. However, it will be obvious to one skilled in the art that the embodiments may be practiced without these specific details. In other instances, well known methods, procedures, components, and circuits have not been described in detail so as not to unnecessarily obscure aspects of the embodiments. It is important to note that directional terms (like "left", "right", "bottom", "top", "up", "down", etc.) are for explanatory purposes relative to the figures. Other directional terms may accurately describe a given embodiment, depending on directions defined for the given embodiment. The various sections of this description are provided for organizational purposes. However, many details and advantages apply across multiple sections.

SYSTEM OVERVIEW

Figure 1A:
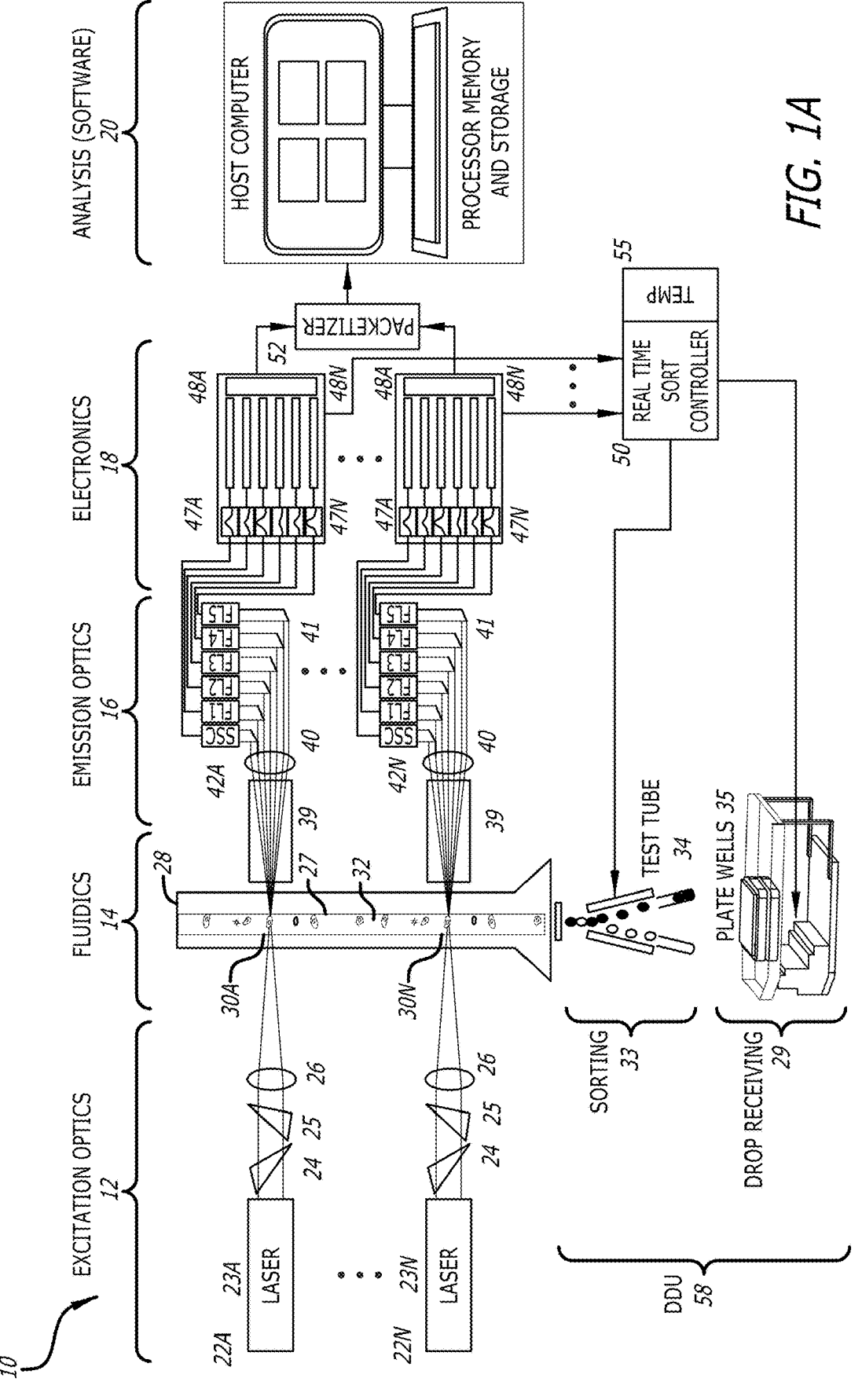
FIG. 1A is a basic conceptual diagram of a cell sorter system (a sorting flow cytometer system) and a flow cytometer system is shown.

FIG. 1A is a basic conceptual diagram of a cell sorter system (sorting flow cytometer) 10. Five major subsystems of the system 10 include an excitation optics system 12, a fluidics system 14, an emission optics system 16, an acquisition system 18, and an analysis system 20. The fluidics system 14 can include a sample loading system (not shown), an interrogating system 28, a cell sorting system 33, and a drop receiving system 29. Generally, a "system" and "subsystem" includes (electrical, mechanical, and electro-mechanical) hardware devices, software devices, or a combination thereof.

The excitation optics system 12 includes, for example, a plurality (e.g., two to five) of excitation channels 22A-22N each having a different laser device 23A-23N and one or more optical elements 24-26 to direct the different laser light to optical interrogation regions 30A-30N spaced apart along a line in a flow channel 27 of a flow cell 28. Example optical elements of the one or more one or more optical elements 24-26 include an optical prism and an optical lens. The excitation optics system 12 illuminates an optical interrogation region 30 in a flow cell 28. The fluidics system 14 carries a fluid sample 32 surrounded by a sheath fluid through each of a plurality of optical interrogation regions 30A-30N in the flow cell/flow channel.

The emission optics system 16 includes a plurality of detector arrays 42A-42N each of which, for example, includes one or more optical elements 40, such as an optical fiber and one or more lenses to direct fluorescent light and/or (forward, side, back) scattered light to various electro-optical detectors (transducers), including a side scatter (SSC) channel detector and a plurality (e.g., 16, 32, 48, 64) of fluorescent wavelength range optical detectors in each array, such as a first fluorescent optical detector (FL1) receiving a first wavelength range of fluorescent light, a second fluorescent optical detector (FL2) receiving a second wavelength range of fluorescent light, a third fluorescent optical detector (FL3) receiving a third wavelength range of fluorescent light, a fourth fluorescent optical detector (FL4) receiving a fourth wavelength range of fluorescent light, a fifth fluorescent optical detector (FL5) receiving a fifth wavelength range of fluorescent light, and so on to an Nth fluorescent optical detector (FLN) receiving an Nth wavelength range of fluorescent light. Each of the detector arrays 42A-42N receives light corresponding to the cells/particles that are struck and/or one or more fluorescent dyes that attached thereto and excited by the differing laser light in interrogation regions/points 30A-30N along the flow channel 27 of the flow cell 28 by each of the corresponding plurality of lasers 23A-23N. The emission optics system 16 gathers photons emitted or scattered from passing cells/particles and/or fluorescent dyes attached to the cells/particles. The emission optics system 16 directs and focuses these collected photons onto the electro-optical detectors SSC, FL1, FL2, FL3, FL4, and FL5 in each detector array, such as by fiber optic (optical fibre) cables 39, one or more one or more lenses 40, and one or more mirrors/filters 41. Electro-optical detector SSC is a side scatter channel detector detecting light that scatters off the cell/particle. The electro-optical detectors FL1, FL2, FL3, FL4, and FL5 are fluorescent detectors may include band-pass, or long-pass, filters to detect a particular and differing fluorescence wavelength ranges from the different fluorescent dyes excited by the different lasers. Each electro-optical detector converts photons into electrical pulses and sends the electrical pulses to the acquisition (electronics) system 18.

For each detector array 42A-42N, the acquisition (electronics) system 18 includes one or more analog to digital converters 47A-47N and one or more digital storage devices 48A-48N that can provide a plurality of detector channels (e.g., 16, 32, 48 or 64 channels) of spectral data signals. The spectral data signals can be signal processed (e.g., digitized by the A/Ds) and time stamped, and packeted together by a packetizer 52 into a data packet corresponding to each cell/particle in the sample). These data packets for each cell/particle can be sent by the acquisition (electronics) system 18 to the analysis system 20 for further signal processing (e.g., converted/transformed from time domain to wavelength domain) and overall analysis. Alternatively, or conjunctively, time stamped digital spectral data signals from each channel that is detected can be directly sent to the analysis system 20 for signal processing.

The analysis system 20 includes a processor, memory, and data storage to store the data packets of time stamped digital spectral data associated with the detected cells/particles in the sample. The analysis system 20 further includes software with instructions executed by the processor to convert/transform data from the time domain to data in a wavelength/frequency domain and stich/merge data together to provide an overall spectrum for the cell/particle/dyes excited by the different lasers and sensed by the detector arrays. With detection of the type of cell/particle through the one or more fluorescent dyes attached thereto, a count of the cells/particles can be made in a sample processed by a flow cytometer and/or cell sorter.

In some cases, it is desirable to sort out the cells in a sample for further analysis with a cell sorter (sorting flow cytometer). Accordingly, the spectral data signals can also be processed by a real time sort controller 50 in the acquisition (electronics) system 18 and used to control a sorting system 33 to sort cells or particles into one or more test tubes 34. In which case, the sorting system 33 is in communication with the real time sort controller 50 of the acquisition (electronics) system 18 to receive control signals. Instead of test tubes 34, the spectral data signals can also be processed by the real time sort controller 50 of the acquisition (electronics) system 18 and used to control both the sorting system 33 and a droplet deposition system 29 to sort cells or particles into wells 35 of a moving capture tray/plate. In which case, both the droplet deposition system 29 and the sorting system 33 are in communication with the acquisition (electronics) system 18 to receive control signals. In an alternate embodiment, the analysis system 20 can generate these control signals from analyzing the spectral data signals in order to sort out different cells/molecules and control the sorting system 33 and the droplet deposition system 29 to capture the drops of samples with cells/particles into one or more wells 35 of the plurality of wells in the capture tray/plate.

U.S. patent application Ser. No. 15/817,277 titled FLOW CYTOMETERY SYSTEM WITH STEPPER FLOW CONTROL VALVE filed by David Vrane on Nov. 19, 2017, now issued as U.S. patent Ser. No. 10/871,438; U.S. patent application Ser. No. 15/659,610 titled COMPACT DETECTION MODULE FOR FLOW CYTOMETERS filed by Ming Yan et al. on Jul. 25, 2017; and U.S. patent application Ser. No. 15/942,430 COMPACT MULTI-COLOR FLOW CYTOMETER HAVING COMPACT DETECTION MODULE filed by Ming Yan et al. on Mar. 30, 2018, each of which disclose exemplary flow cytometer systems and subsystems all which are incorporated herein by reference for all intents and purposes. U.S. Pat. No. 9,934,511 titled Rapid Single Cell Based Parallel Biological Cell Sorter issued to Wenbin Jiang on Jun. 19, 2016, discloses a cell sorter system that is incorporated herein by reference for all intents and purposes.

Compact Cell Sorter

Figure 1B:
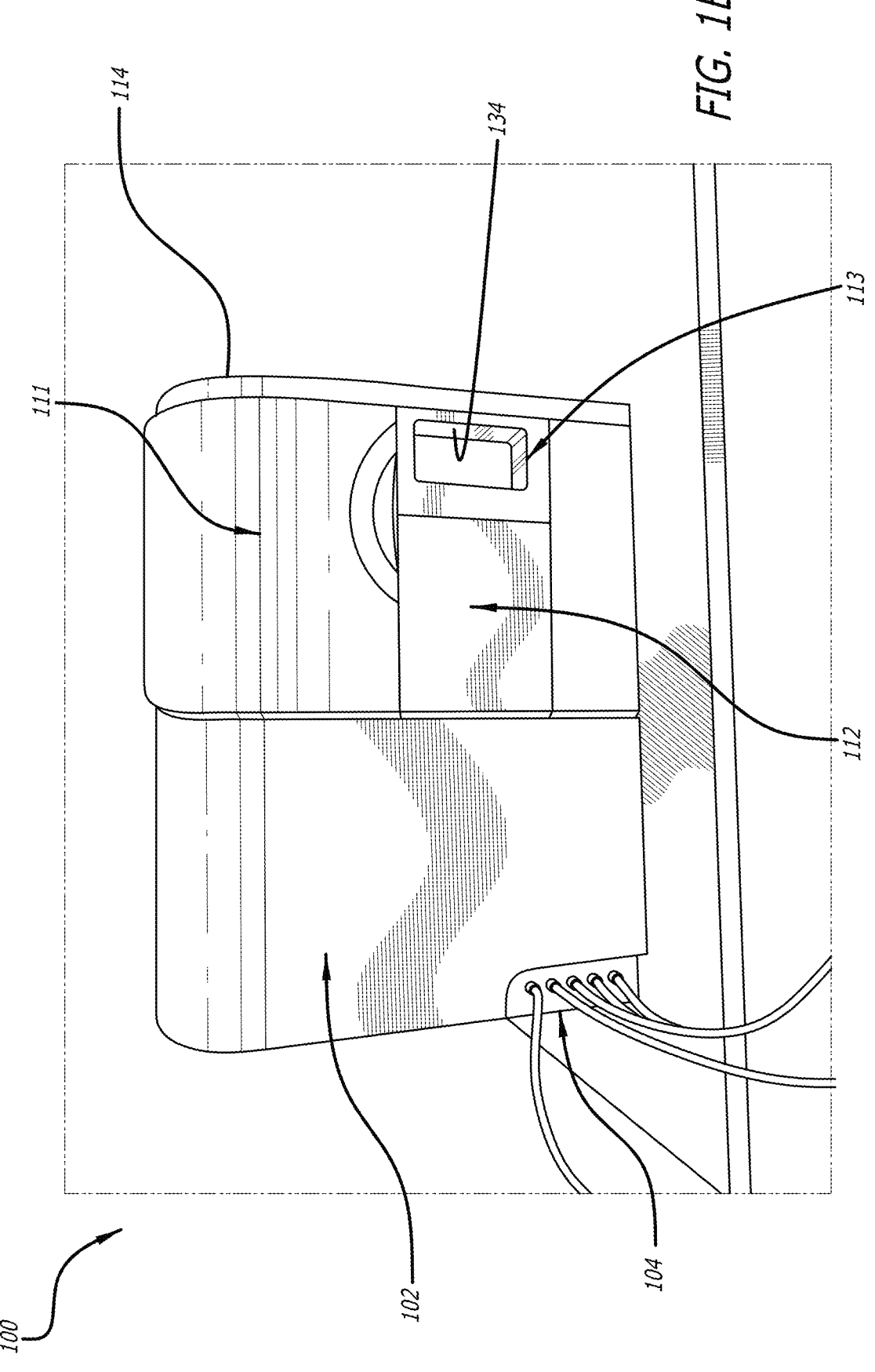
FIG. 1B is front view of a compact cell sorter system with its various doors in a closed state.

FIG. 1B illustrates a front view of an integrated compact cell sorter system 100. The integrated compact cell sorter system 100 includes a chassis/frame 101 (see FIG. 1C) to support the various systems and subsystems of the cell sorter. A fluidics panel/door 102, a flow cell door 111, a droplet deposition unit (DDU) door 112, and a sample input door 113 are pivotally coupled to the chassis/frame 101 to cover over and seal various chambers of the cell sorter system. One or more side panels 114 are used to cover over other portions of the chassis/frame and the subsystems therein in a more fixed manner. A fluidics input/output panel 104 connects the cell sorter system 100 to external fluid tanks and an external gas supply, such as a pressurized air supply.

Figure 1C:
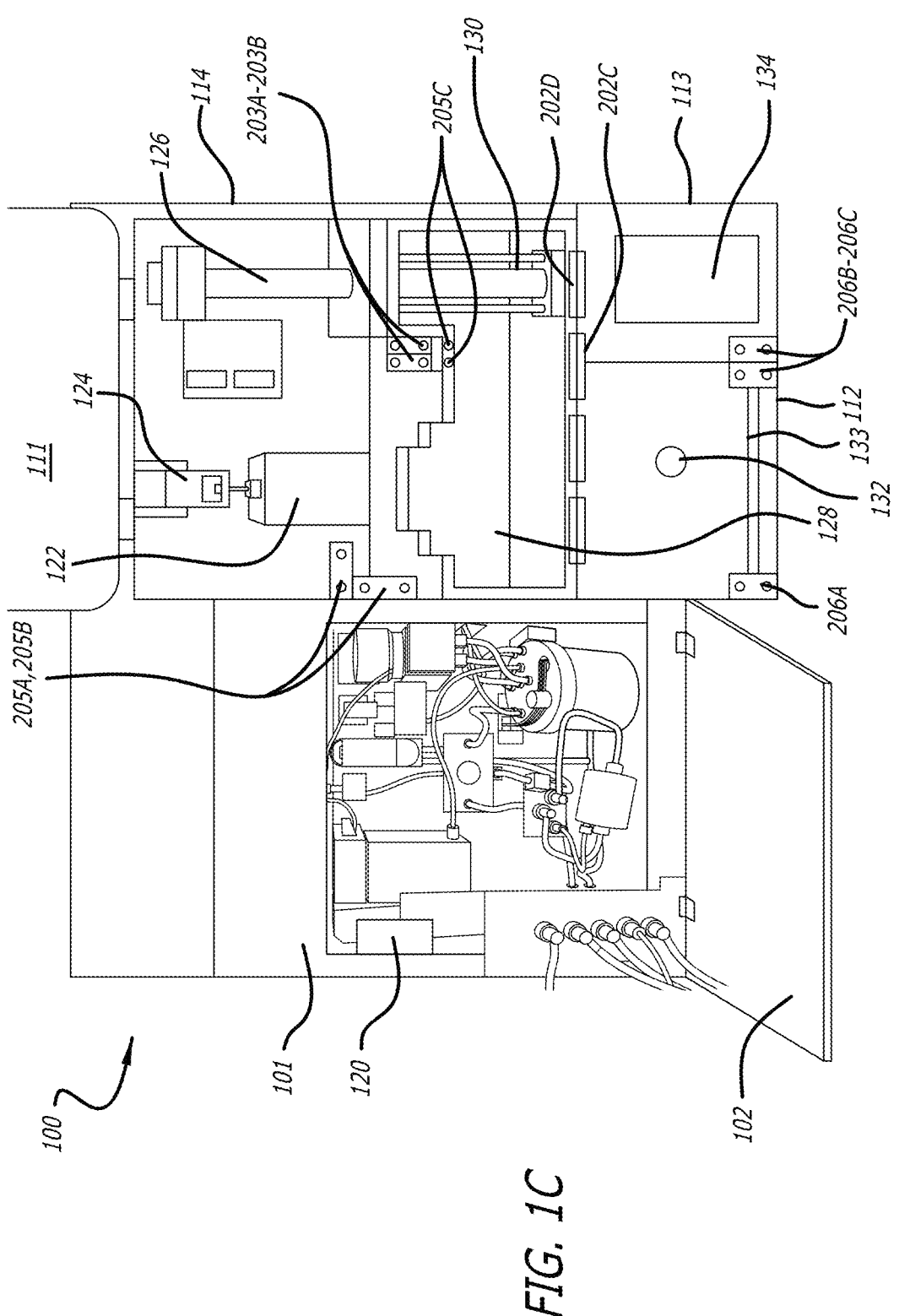
FIG. 1C is front view of a compact cell sorter system with its various doors in an open state.

Referring now to FIG. 1C, a front view of the integrated complex cell sorter system 100 is shown with opened doors and panels removed. The fluidics panel/door 102, the flow cell door 111, the DDU door 112, and the sample input door 113 of the integrated compact cell sorter system 100 are pivoted to an open position around hinges to reveal the various systems and subsystems of the cell sorter system. The integrated compact cell sorter system 100 includes a fluidics bucket 120 (part of the fluidics system), a deflection chamber (unit) 122, a flow cell 124, a sample pressure chamber 126 a droplet deposition unit (DDU) chamber or collection chamber 128, a sample input station (SIS) 130, and a sort collection camera 132. The sample input door 113 has a window 134 through which a sample tube can be viewed if mounted in the SIS 130. The DDU door 112 has a sort collection camera 132 that can view left and right deflected drops fall out of a slot in the deflection chamber 122 and into the DDU chamber 128 to be collected by test tubes or wells in a well plate.

The fluidics bucket 120 (part of the fluidics system) includes a gas bubble remover eliminating gas bubbles in the sheath fluid. The fluidics bucket 120 is further discussed with reference to FIGS. 3A-3B. The fluidics system is under pressure to cause a sheath fluid and a sample biological fluid to flow.

The flow cell 124 is coupled in communication with the fluidics bucket 120 to receive the sheath fluid. A sample biological fluid flows with cells or particles through the flow cell 124 to be surrounded by the sheath fluid. The flow cell 124 is further discussed with reference to FIGS. 4A-4G.

The deflection chamber 122 is under the flow cell 124 to receive the drops of sample biological fluid and sheath fluid out of the flow cell 124. The deflection chamber 122 selectively deflects one or more of charged drops away from the center stream path along one or more deflection paths. The deflection chamber 122 is further discussed with reference to FIGS. 16A-16B.

The droplet deposition unit (DDU) chamber/system 128 is in communication with the deflection chamber 122 to receive selectively deflected drops in the stream of the sample biological fluid with the one or more biological cells or particles into one or more containers. The DDU chamber 128 is further discussed with reference to FIGS. 2A-2B.

In one embodiment, the flow cell 124 includes a flow cell body coupled in communication with the fluidics system to receive the sheath fluid, the flow cell body having charging port to charge the droplets, the flow cell body having a chamber with a circular cylindrical portion and a funnel portion, the funnel portion to form a fluid stream of the sample fluid surrounded by the sheath fluid out of a bottom side opening; a drop drive assembly coupled to the flow cell body, the drop drive assembly including a glass sample injection tube (SIT) inserted into the chamber of the flow cell body and having a first end located in the funnel portion of the chamber, the glass sample injection tube having a second end coupled in communication with the fluidics system to receive the sample fluid and inject the sample fluid into the funnel portion of the chamber; and a cuvette coupled to a base of the flow cell body, the cuvette having a flow channel adjacent the bottom side opening of the flow cell body, the cuvette to receive the fluid stream of the sample fluid surrounded by the sheath fluid out of the bottom side opening, the cuvette being transparent to light and allowing the sample fluid to undergo interrogation in the flow channel by a plurality of different lasers to determine a plurality of different types of cells or particles in the sample fluid.

In one embodiment, the flow cell 124 includes the following: a flow cell body coupled around the drop drive assembly to receive the sample fluid from the sample injection tube, the flow cell body coupled in communication with the fluidics system to receive the sheath fluid, the flow cell body having a charging port to charge the droplets, the flow cell body having a funnel portion to form a fluid stream of the sample fluid surrounded by the sheath fluid out of an opening; and a cuvette coupled to a base of the flow cell body, the cuvette having a channel to receive the fluid stream of the sample fluid surrounded by the sheath fluid out of the opening, the cuvette being transparent to light and allowing the sample fluid to undergo interrogation in the channel by a plurality of different lasers to determine a plurality of different types of cells or particles therein.

In one embodiment, the flow cell 124 further includes the following: a nozzle assembly selectively engaged with the cuvette, the nozzle assembly having a nozzle and an O-ring around the nozzle selectively pressed against a face of the cuvette around the channel, the nozzle receiving the sample stream from the cuvette and forming sample drops out of the nozzle assembly; a carriage assembly slidingly coupled to the flow cell body, the carriage assembly to slidingly receive the nozzle assembly; and a linkage pivotally coupled to the carriage assembly and the flow cell body, the linkage including a lever arm to selectively engage the nozzle with the cuvette to receive a fluid stream and selectively disengage the nozzle from the cuvette to repair or replace the nozzle.

In one embodiment, the flow cell 124 further includes the following: a lever hinge formed to be statically coupled to the flow cell body; a carriage release lever rotatably coupled to the lever hinge; and two lever arms rotatably coupled to the carriage release lever and to a carriage plate of the carriage assembly, wherein the two lever arms, the carriage plate, the carriage release lever, and the lever hinge have a kinematic linkage that enables the carriage assembly to maintain a vertical movement along the center axis.

In one embodiment, the flow cell 124 further includes the following: a nozzle assembly having the following: a nozzle handle having a body with a gripping end and a nozzle end, the body having a through hole between top and bottom surfaces near the nozzle end with a partial gland in the top surface extending around the through hole, the partial gland having a slot extending out from the through hole to the nozzle end of the nozzle handle; a nozzle insert positioned in a portion of the through hole of the body of the nozzle handle, the nozzle insert having a circular body with a center nozzle orifice concentric with the through hole to flow drops of a sample fluid, and a beveled ring in a top surface extending out from the circular body; a gasket positioned in the partial gland against the beveled ring of the nozzle insert with a portion extending above the top surface of the nozzle insert and the top surface of the nozzle handle, the gasket to provide a seal around the center nozzle orifice; and wherein the slot extending out from the partial gland to the nozzle end facilitates removal of the gasket.

In one embodiment, the DDU system 128 includes the following: a case or a housing with an open face surround by edges of the case, the case forming a portion of a containment chamber, the case having a top side opening aligned with the deflection chamber to receive the selectively deflected drops in the stream of the sample biological fluid into one or more containers in the containment chamber, a seal mounted around edges of the case, one or more hinges coupled to a bottom portion of the case, and a door coupled to the one or more hinges to pivot the door about the one or more hinges, the door when closed to press against the seal and close off the containment chamber from an external environment.

In one embodiment, the DDU system 128 includes the following: an electromagnetic lock comprising at least one electromagnet mounted to the case and a metal latch coupled to an inside surface of the door, wherein the metal latch is attracted to the at least one electromagnet when the door is closed and the at least one electromagnet is energized.

In one embodiment, the DDU system 128 includes a magnetic lock comprising at least one magnet mounted to the case and a metal latch coupled to an inside surface of the door, wherein the metal latch is attracted to the at least one magnet when the door is closed.

DDU Chamber

Figure 2A:
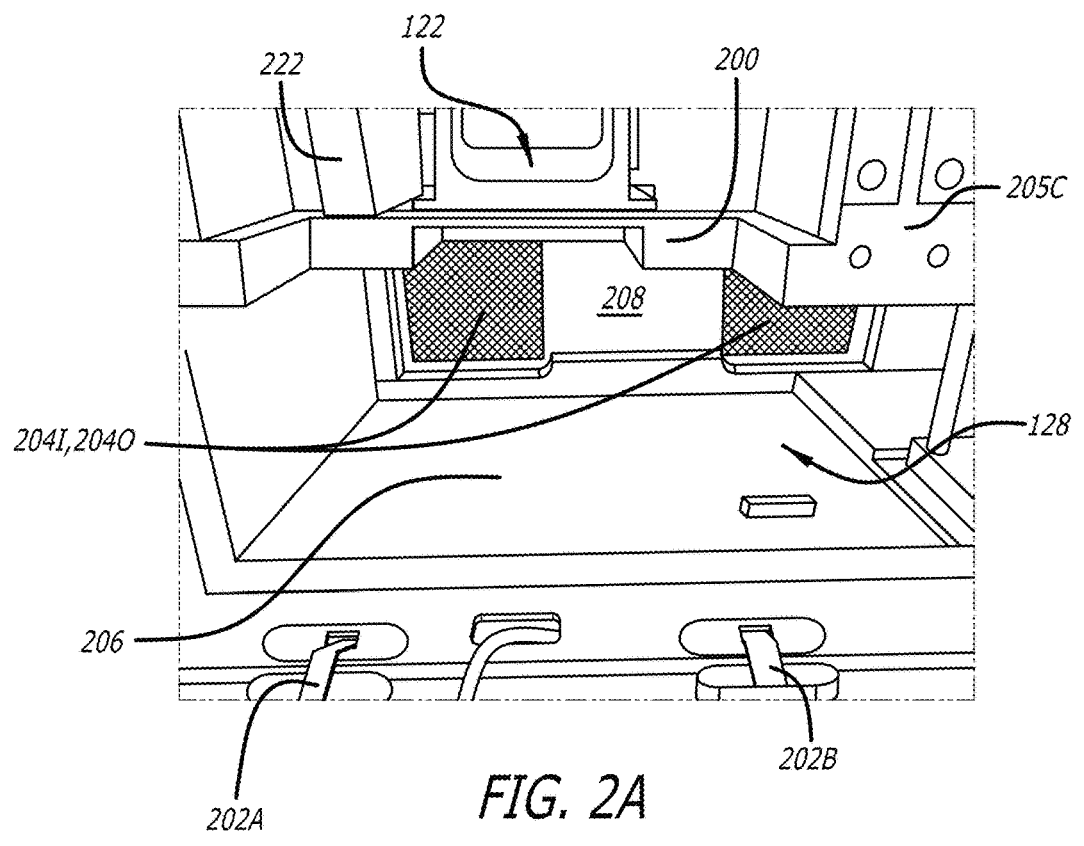
FIGS. 2A-2B are views of the droplet deposition unit (DDU) of the compact cell sorter system with the DDU door and the sample input door open.

FIG. 2A illustrates a portion of the deflection chamber 122 with its door 222 being open. The DDU chamber 128 of the cell sorter 100 is viewable with both the doors 112-113 pivoted to open positions. Openings in a back wall 208 of the DDU chamber 128 show an input air filter 2041 and an output air filter 2040 mounted within tunnels leading to an air conditioning chamber. Behind the wall 208 are one or more fans and at least one heating/air conditioning element to force the air through the air filters and maintain a desirable range of temperatures of the sample in the SIS 130 and the sorted cells/molecules in the DDU chamber 128.

At a base of the DDU chamber 128 is a separation plate 206 that separates a driver mechanism under the separation plate from the DDU chamber 128. Under the separation plate 206 are magnetic control mechanisms to control movement of a magnetically coupled puck 210 shown in FIG. 2B. A magnetic loading system for the DDU chamber and the magnetically coupled puck 210 is disclosed by U.S. provisional patent application No. 63/146,562, titled LOADING SYSTEM WITH MAGNETICALLY COUPLED SAMPLE MOVER FOR FLOW CYTOMETRY AND CELL SORTER SYSTEMS filed on Feb. 5, 2021, by Babak Honaryar et al., and incorporated herein by reference for all intents and purposes. Movement of the magnetically coupled puck 210 is controlled underneath the separation plate 206 by the magnetic loading system.

Figure 2B:
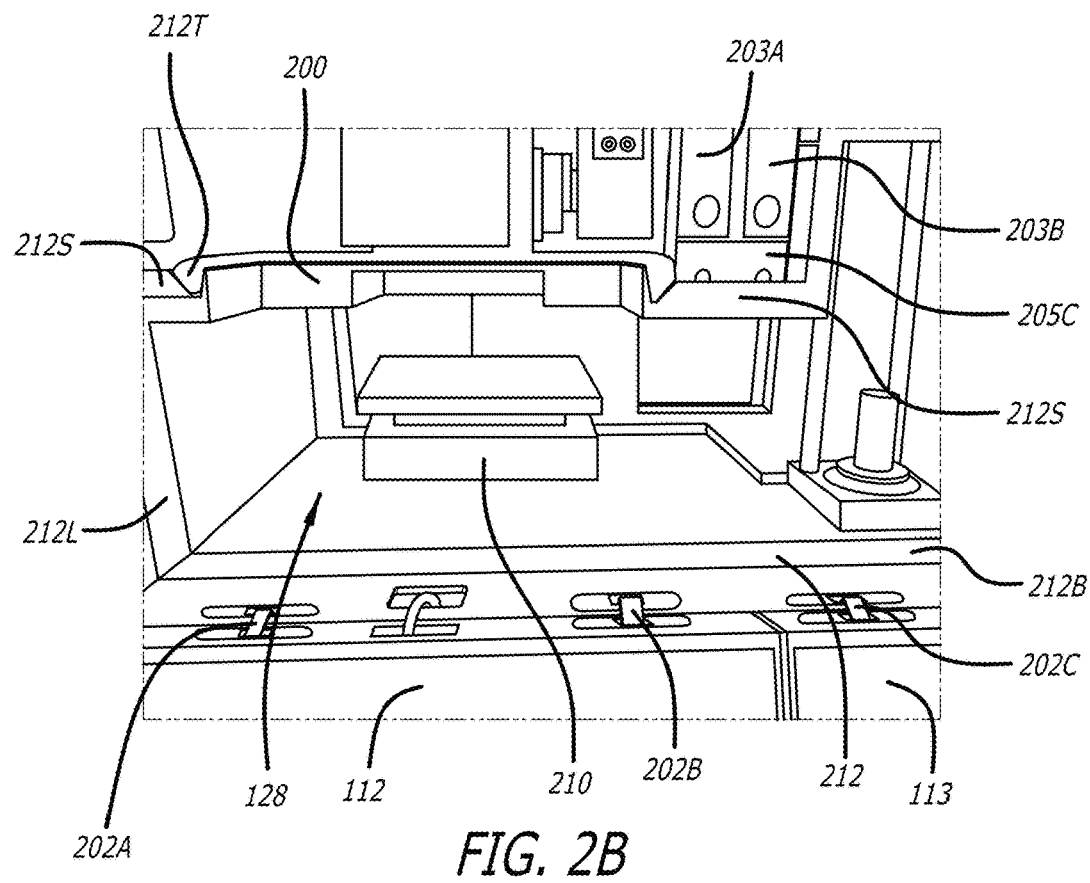

FIG. 2B illustrates a seal 212 that is mounted along edges of the DDU chamber 128 and the sample input station 130 to provide air resistive seal when the DDU door 112 and sample door 113 are closed. The DDU door 112 has a shelf 133 (shown in FIG. 1C) that presses down on a top seal portion 212T when closed. Other portions of the seal 212, such as the bottom portion 212B and side portions 212S, 212L, are pushed on by the doors 112-113 and squeezed up against the edges of the DDU chamber 128. With the doors closed, the DDU chamber 128 is sealed off from the ambient air of the environment (e.g., laboratory) where the cell sorter 100 is stationed. Furthermore, the DDU chamber 128 and SIS 130 are under negative pressure from a vacuum to additionally help prevent cells/molecules/gases from escaping out of the cell sorter into the ambient air of the environment, such as a laboratory.

The DDU door 112 and sample input door 113 provide a good seal to isolate the DDU chamber 128 from other parts of the flow cytometer/cell sorter 100 as well as the ambient environment. The sample drops sorted out and captured in the DDU chamber 128 may desire a temperature-controlled environment to maintain them. Furthermore, the cells that are captured may be a pathogen that are not desired to be an aerosol and escape into the environment. Accordingly, with the magnetic loading system and the sealed doors, the cell sorter can provide an integrated filtration system and temperature-controlled environment to the DDU chamber 128.

Fluidics Bucket

Figure 3A:
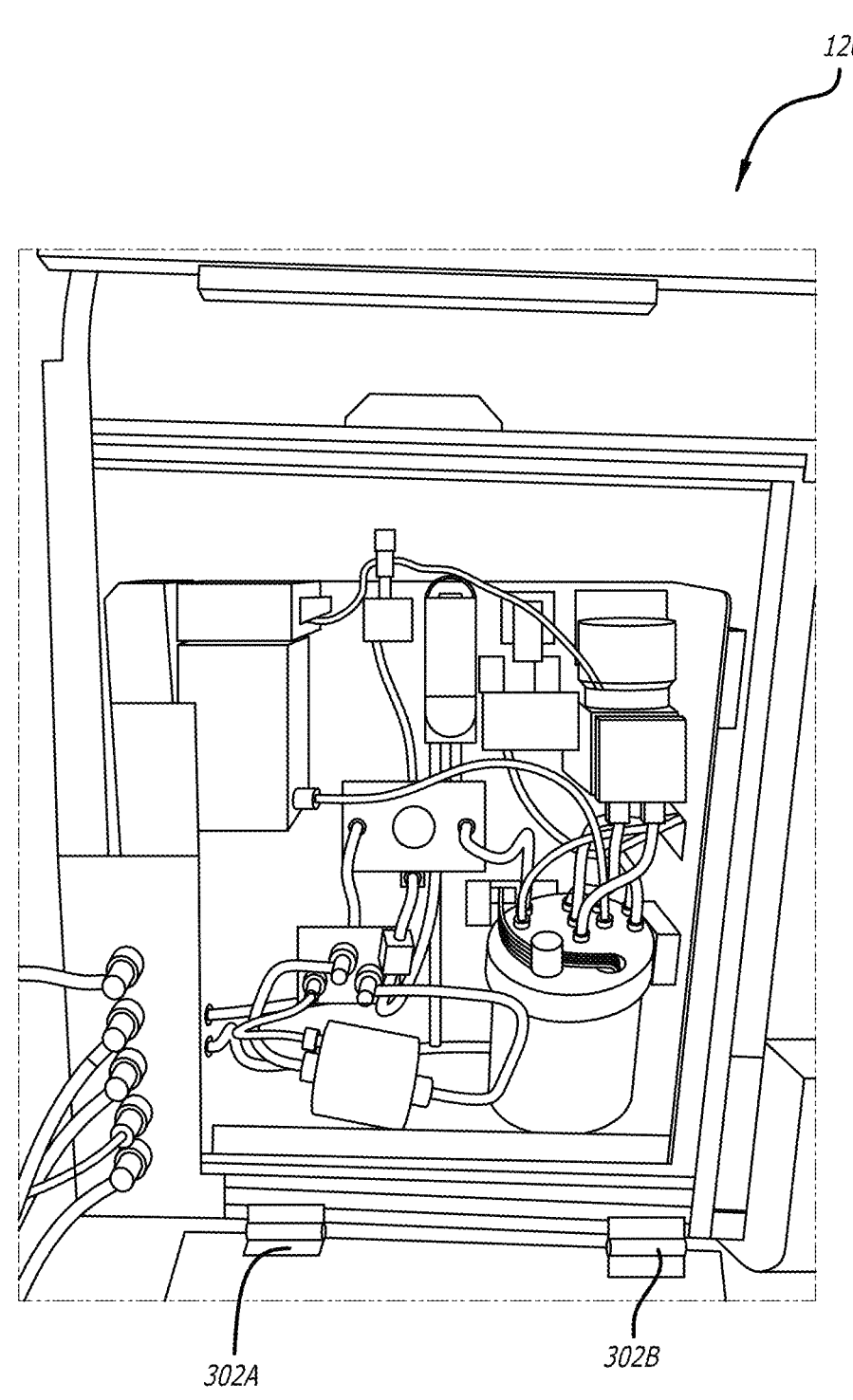
FIGS. 3A-3B are views of the fluidics bucket in the fluidics system of the compact cell sorter system.
Figure 3B:
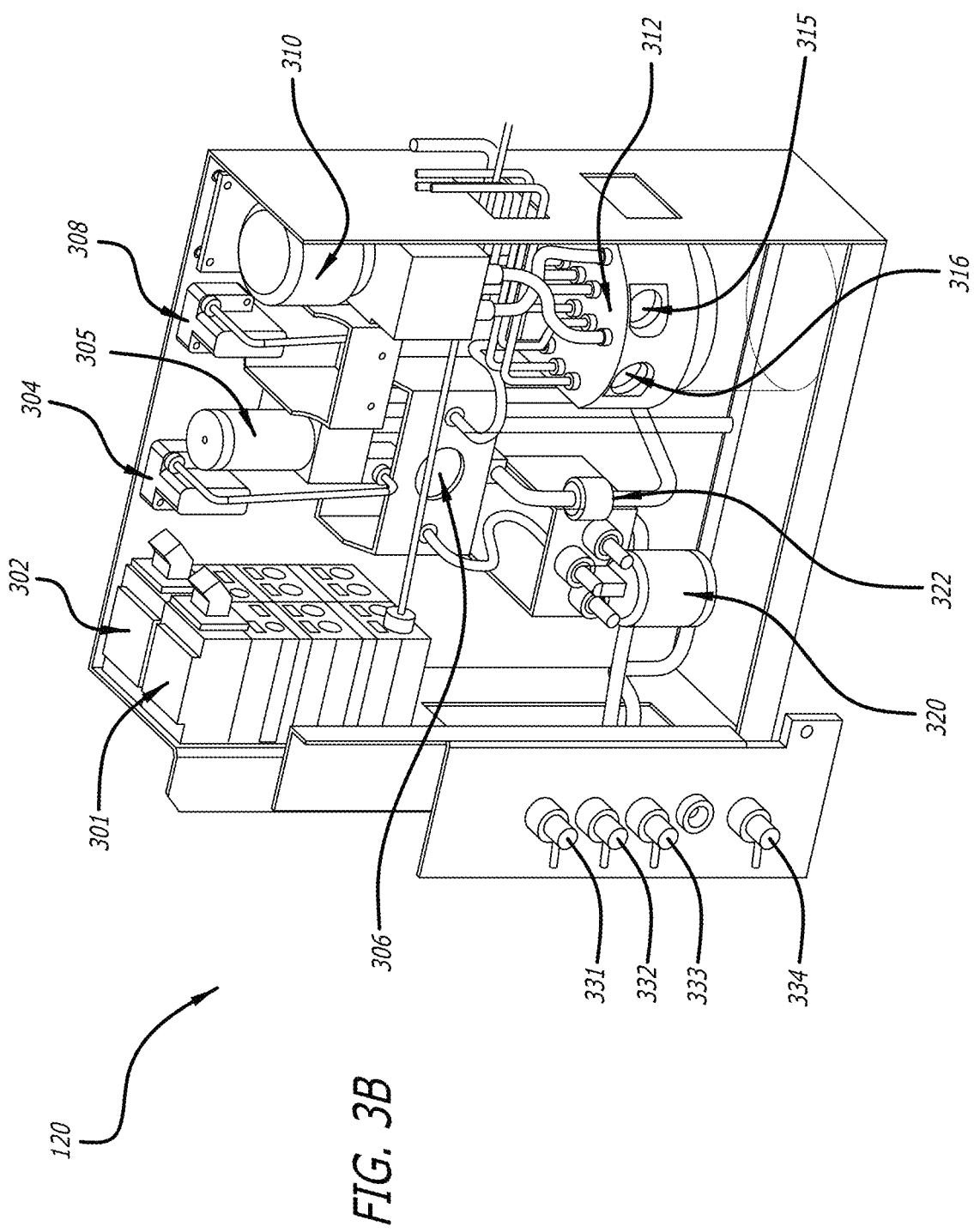

FIGS. 3A-3B illustrate various views of the fluidics bucket 120 which is a part of the fluidics system of the cell sorter system 100. In FIG. 3B, the fluidic bucket 120 includes a sample regulator 301 and a sheath regulator 302 that control the fluidic pressure of the sample fluid and the sheath fluid, respectively. The fluidics bucket 120 further includes a degasser switch 304 and a degasser pump 305 to provide air pressure so that the degasser 306 can remove bubbles from the sheath fluid. Fluidics bucket further includes an aspirator pump 310 to externally aspirate waste out of the cell sorter system through the waste output port 334. The valve manifold 312 includes a plurality of valves to control the fluid system and a sample transducer 315 and a sheath transducer 316. The fluidics input output panel 104 includes a supply air input 331, sheath air output 332, a sheath fluid input 333, and a waste output 334. The sheath fluid 333 flows through a sheath filter 320 before entering the flow cytometer system. The fluids bucket 120 includes a pressure switch that controls opening pressure of the sample pressure chamber. The aspirator pump maintains the vacuum in the tank below the valve manifold 312.

Flow Cell Assembly

Figure 4A:
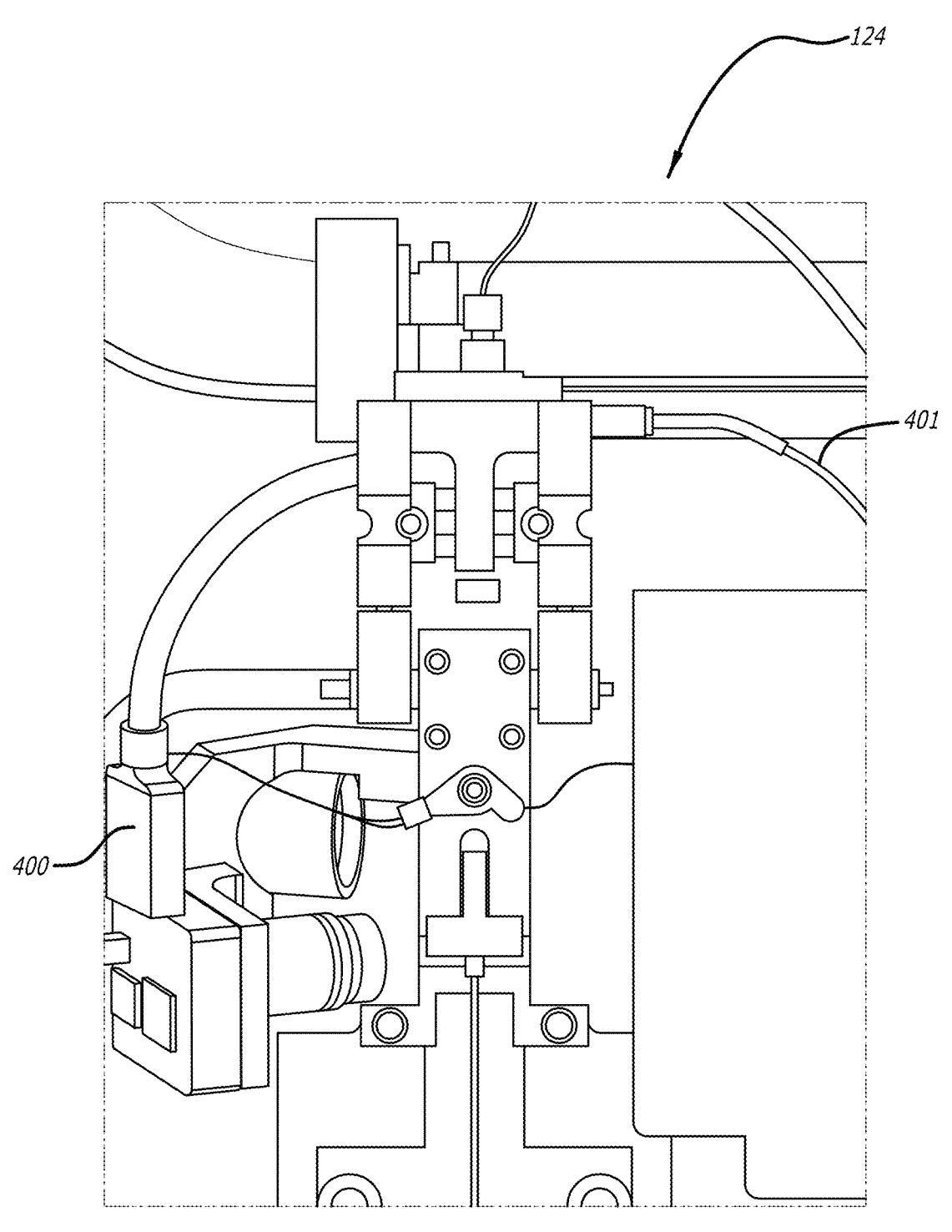
FIGS. 4A-4G are views of the flow cell in the fluidics system of the compact cell sorter system.

FIGS. 4A-4G illustrate various views and components of the flow cell assembly 124. In FIG. 4A the flow cell 124 has a ground connection 400 to a metal surface. This is to shield the sample fluid from charges being generated by the deflection unit and to remove charges that may have been already present.

Figure 4B:
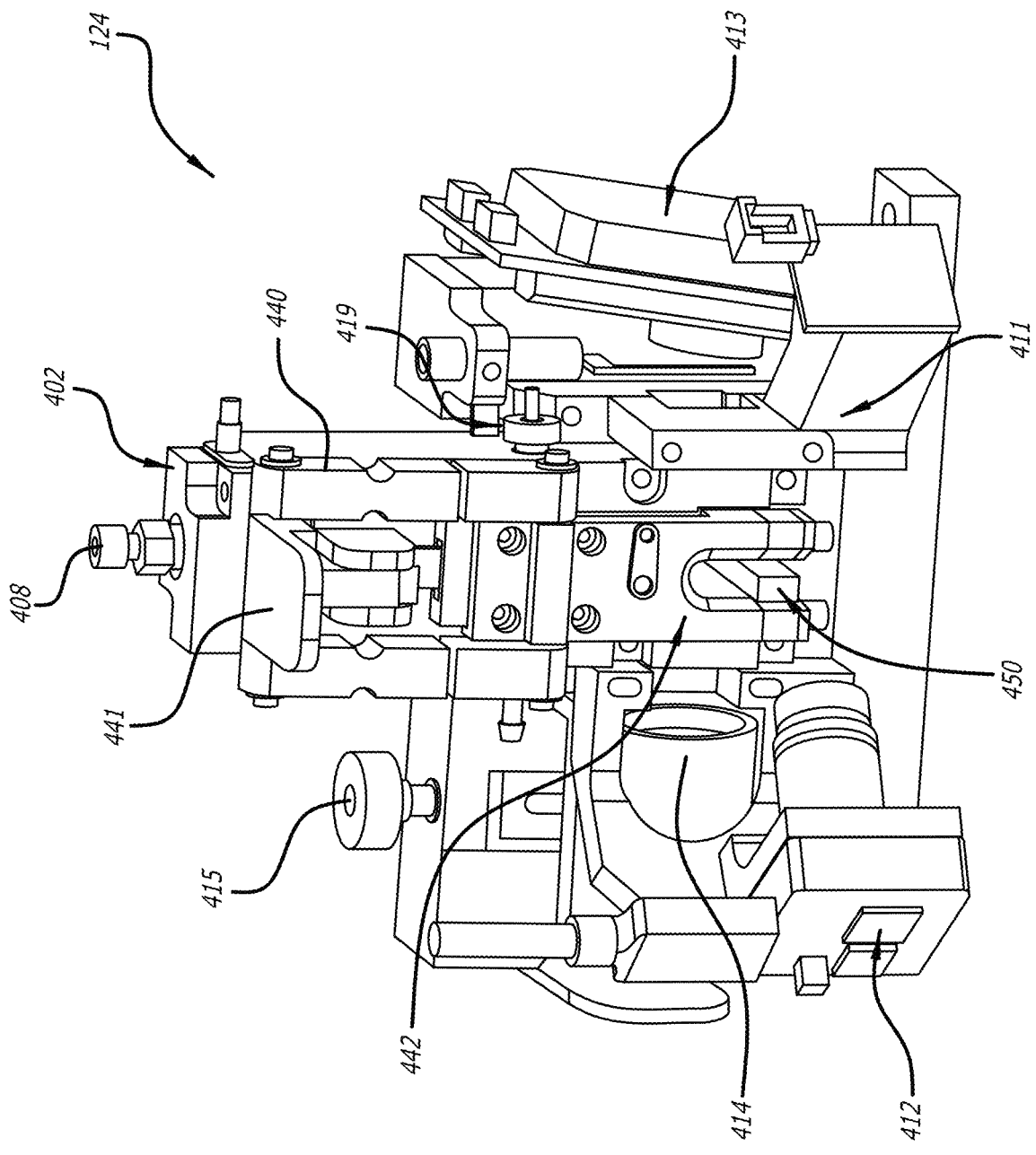

Referring now to FIG. 4B, the flow cell 124 includes a drop drive assembly 402, the nozzle assembly 450 and nozzle carriage assembly 442 and carriage release lever 441 of a flow cell linkage 440. The flow cell 124 has a number of optical components including a drop camera for 412, drop strobe assembly 411, forward scatter assembly 413, and a final focus lens 414. The final focus lens for 414 can be focused by a final focus adjustment 415. The drop drive assembly 402 has a sample input port 408 to receive a hose or pipe that carries the sample fluid.

Figure 4C:
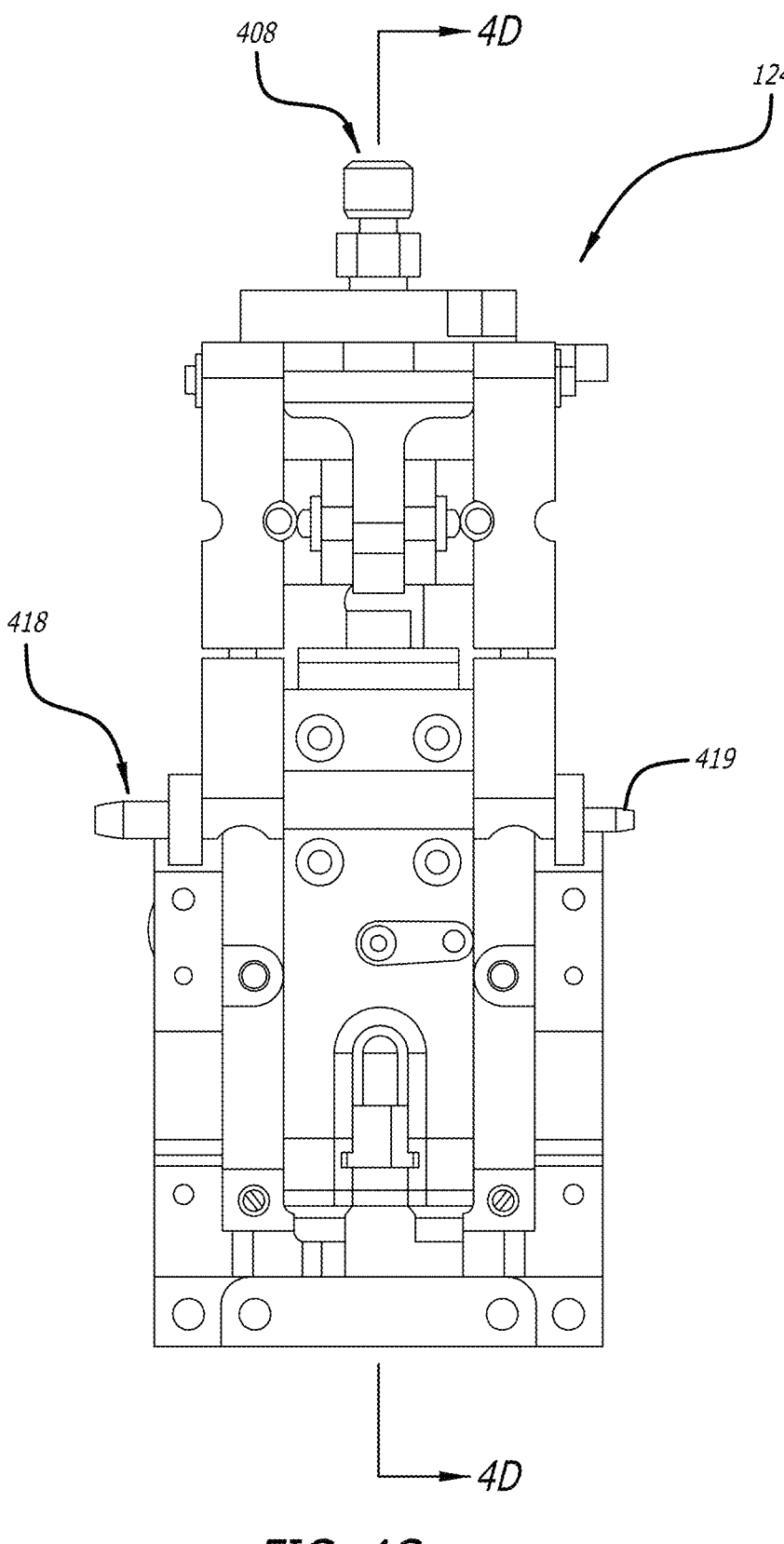

Referring now to FIG. 4C, the fluid ports for the flow cell 124 are shown. The flow cell 124 receives the sample fluid through a sample inlet port 408. The flow cell 124 receives the sheath fluid through a sheath input port 418. The flow cell 124 surrounds a stream of the sample fluid with sheath fluid. The flow cell 124 includes a conductive drain port fitting 419 threaded into the drain port of the flow cell body 404 to evacuate fluids from chambers inside the flow cell, and to impart charge onto the drops of sample fluid with a cell/particle. An electrical wire and a hose both couple to the conductive drain port fitting 419. The electrical wire is in communication with the sort controller to receive a signal that is synchronized with the drops. Over time the signal may be ground, one or more levels of positive charge voltages (e.g., +150, +300), or one or more levels of negative charge voltages (e.g., −150, −300) to respectively keep a drop uncharged, to positively charge a drop, or to negatively charge.

Figure 4D:
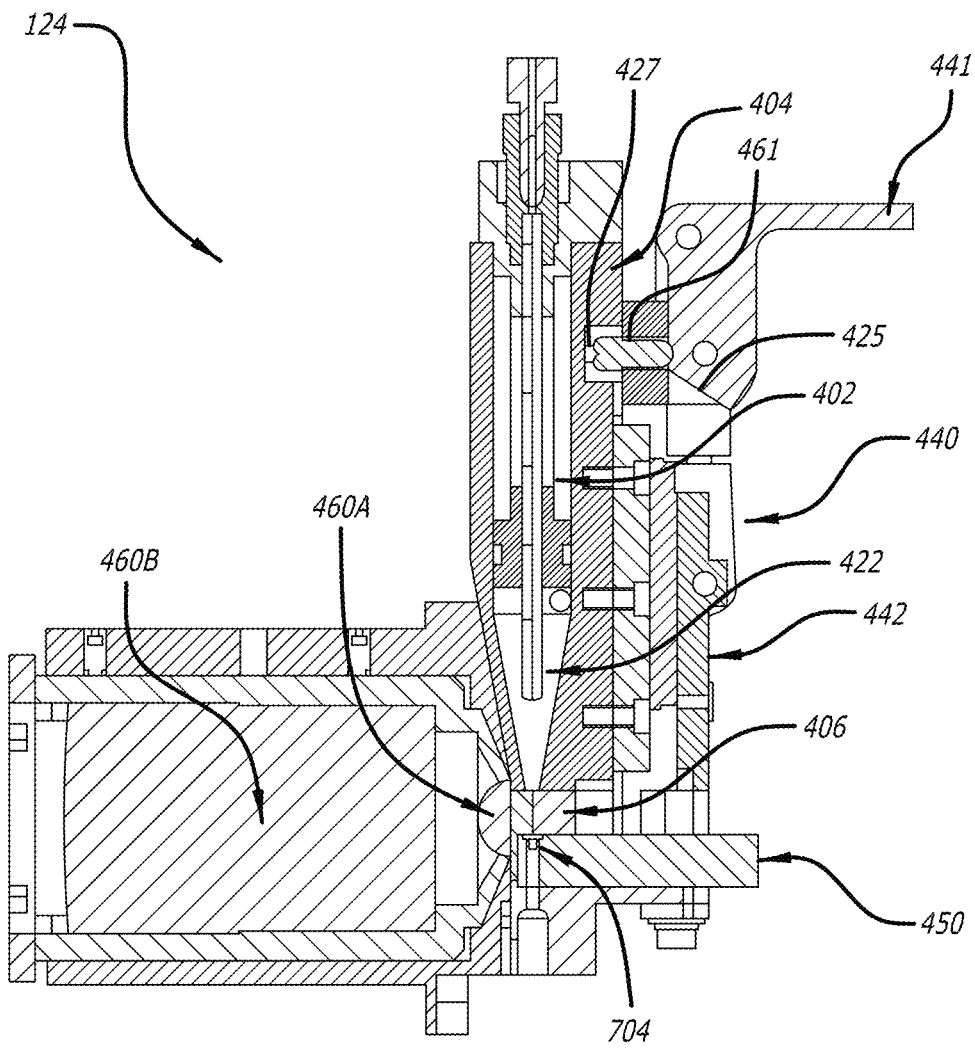

Referring now to FIG. 4D, a side cross-section of the flow cell 124 shown. the flow cell 124 includes a flow cell body 404, a drop drive assembly 402, a cuvette 406, a linkage assembly 440, a carriage assembly 442, and a nozzle assembly 450 with a nozzle 704. The linkage assembly 440 includes a carriage release lever 441 that pivots to move the nozzle assembly up and down with respect to the cuvette 406. The drop drive assembly 402 includes a sample injection tube 422.

The flow cell body 404 has top, bottom, left, right, front, and back sides. In the top side, the flow cell body includes a top chamber opening leading into a chamber of the flow cell body 404. The drop drive assembly (including the sample injection tube) is mounted through the top chamber opening into the chamber. The flow cell body receives the sample fluid from the sample injection tube of the drop drive assembly. In one side (e.g., left side), the flow cell body includes an input port coupled in communication with the fluidics system of the cytometer to receive sheath fluid. In an opposite side (e.g., right side), the flow cell body includes an output port in line with the input port. The pressure of the sheath fluid and the sample fluid are independently controlled to achieve a desired flow rate of sample fluid surrounded by sheath fluid out of the chamber and into the flow channel 906 of the cuvette 406.

The flow cell body 404 has an opening or pocket in the back side. The pocket receives the cuvette 406 so that the flow channel 906 lines up with the stream of drops from the bottom opening in the chamber of the flow cell body. For the most part, the cuvette 406 is hidden from view in the front side by the opaque body of the flow cell 404 and the carriage assembly and nozzle assembly mounted in the mount. The pocket has an open left side and an open right side that allow laser light from one or more lasers to pass into the side of the cuvette and strike the cells/particles flowing in the flow channel. The laser light may be injected into the cuvette on one side and collected on an opposite side by an optical fiber or forward scatter detector.

A base or bottom side of the flow cell body 404 also has a small cutout (upper arched cutaway) from front side to back side. Because the cuvette is fairly well hidden, the small cutout allows a microscope test instrument to be inserted through the front side of the flow cell body to view the flow channel in the cuvette 406 from the front side of the flow assembly 124.

The large cutout in the base of the flow cell body allows the nozzle assembly 450 to be mounted into the mount 452 below the cuvette 406. The large cutout further allows the nozzle assembly 450 to be moved up and down by the linkage and the carriage assembly into below the cuvette.

Laser light from one or more lasers is sent into one or more interrogation regions in the flow channel of the clear cuvette to excite flowing cells/particles and/or one or more fluorescent dye markers attached thereto that pass by. The flow cell 124 further includes one or more objective lenses 460A-460B in order to capture light (e.g., reflected light, scattered light, fluorescent light) from the cells/particles and/or the one or more fluorescent dyes attached to the cells/particles on one side. On an opposite side, the one or more objective lenses 460A-460B can launch the captured light into a fiber optic cable.

To support the movement of the linkage 440 and the carriage assembly 442, the flow cell body 404 can include a plurality of threaded openings in the front side. The threaded openings can receive threaded fasteners through holes in the linear slide rail 446 to mount it to the front side of the flow cell body. The linear slide rail 446 is used to allow the nozzle carriage assembly 442 to slide up and down with respect to the release lever 441 and the linkage 440. The flow cell body can further include a shallow oval opening in the front side to receive the spring 427 and the detent 461 (spring loaded detent) for holding the position of the release lever 441, the linkage, the carriage assembly, and the nozzle assembly. The hole or opening is oval in order to allow the spring and the detent to move up and down with adjustments in position of the hinge bracket 443.

Figure 4E:
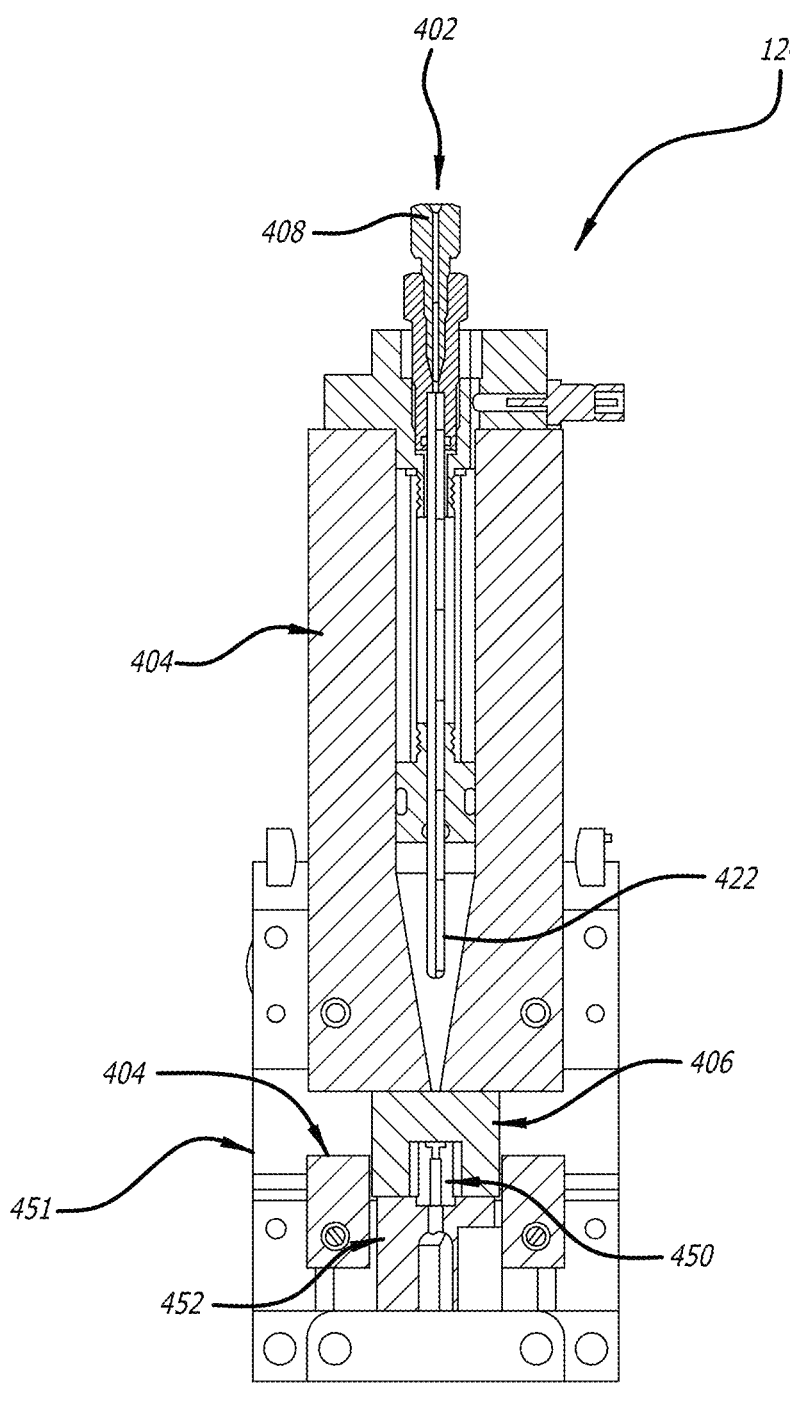

Referring now to FIG. 4E, a front cross-sectional view of the flow cell 124 is shown. The flow cell 124 includes a flow cell body 404 to receive the drop drive assembly 402. The nozzle assembly 450 is slid into a mount 452 that is coupled to the carriage assembly. The sample injection tube 422 is preferably formed of glass to avoid surface etching in the presence of electrical currents in the sheath fluid for drop charging and vibration of the drop-drive for drop separation that can cause leakage. The drop drive assembly 402 includes a sample inlet 408 to receive the sample fluid.

Figure 4F:
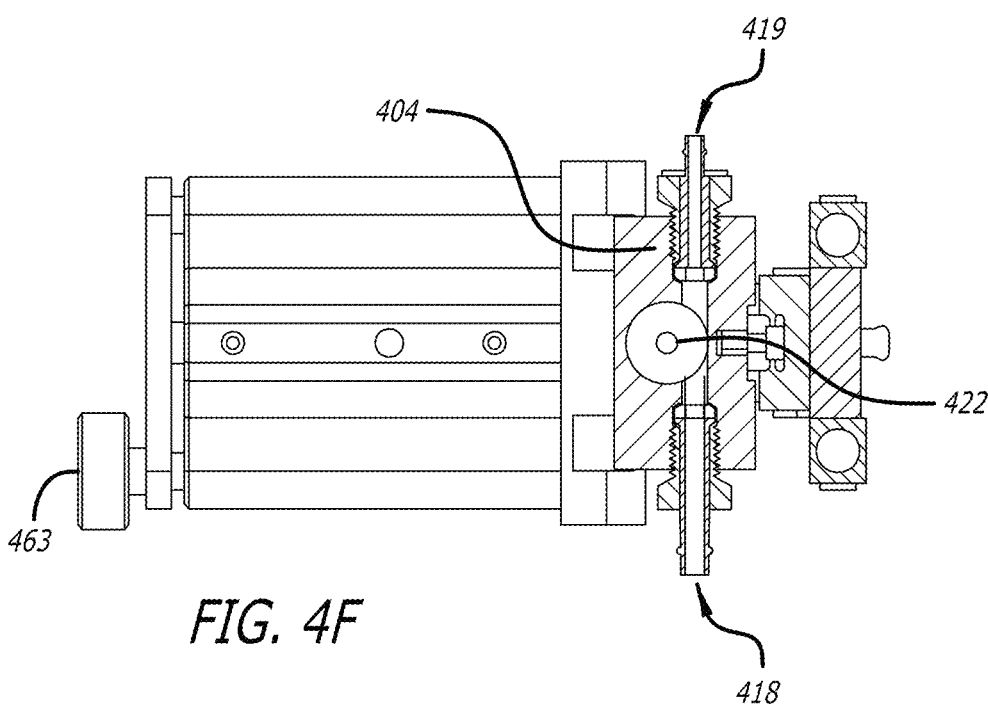

Referring now to FIG. 4F, a cross-sectional view of the flow cell 124 is shown cut through the drain port/charging port with the conductive hose fitting 419 and the sheath inlet port with its hose fitting 418. The sample injection tube 422 is centered in a chamber within the flow cell body 404. The flow cell 124 includes a rear focus adjustment 463 for the one or more objective lenses.

Figure 4G:
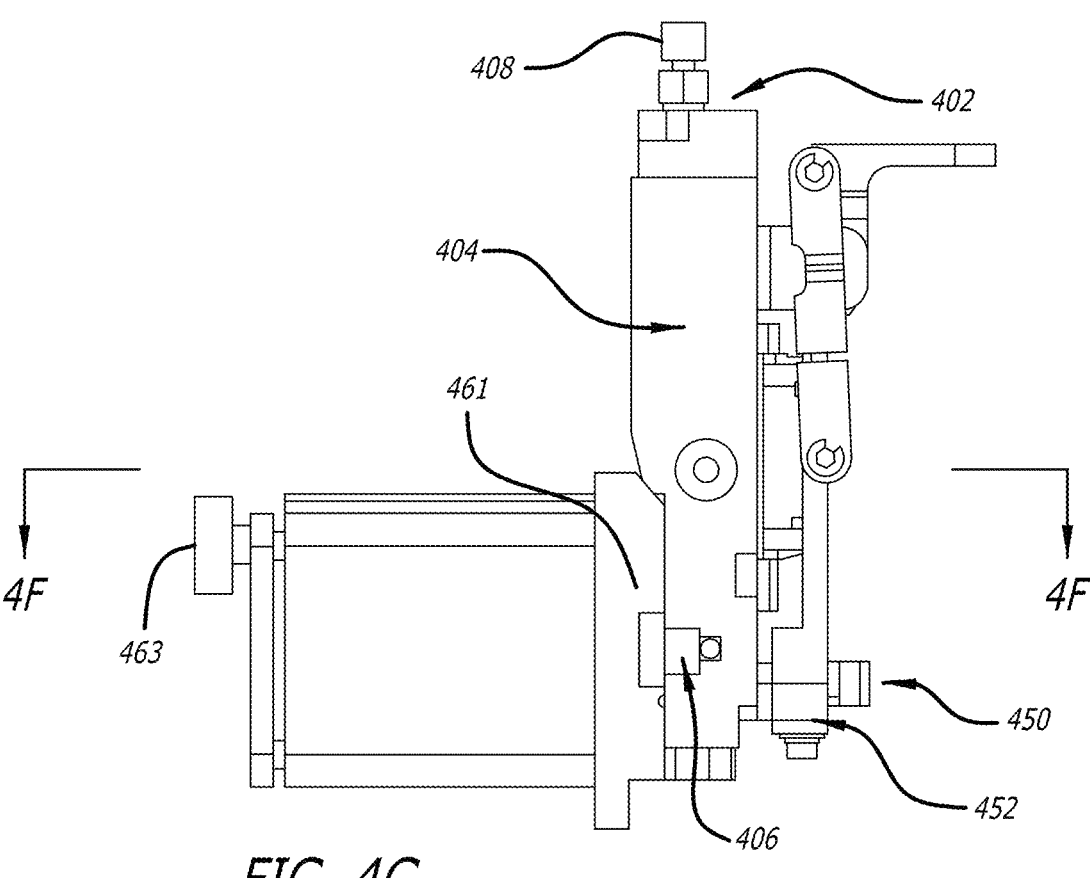

FIG. 4G illustrates a side view of the flow cell 124. The center optical axes of the objective lenses 460A-460B are shown lined up to receive light from the cuvette. The objective lens mount 461 assures that the objective lenses 460A-460B remain in alignment. The flow cell body 404 is opaque so that light from other sources, such as ambient, is not captured by the objective lenses for 460A-460B.

The nozzle assembly 450 slides in and out of the mount 452 in order to service or repair components of the nozzle assembly or swap for a different diameter of opening in the nozzle. The nozzle of the nozzle assembly receives a sample flow of fluid from a cuvette and forms drops with preferably a single cell/particle each for sorting out.

Flow Cell Linkage and Nozzle Carriage

FIGS. 4H-4L illustrate various views and components of the flow cell linkage 440 and nozzle carriage assembly 442 for the flow cell assembly 124 of the cell sorter system 100. FIGS. 5A-5B and 6A-6B respectively illustrate side views and cross section views of the flow cell assembly 124 to show operation of the flow cell linkage 440 and nozzle carriage assembly 442.

Figure 4H:
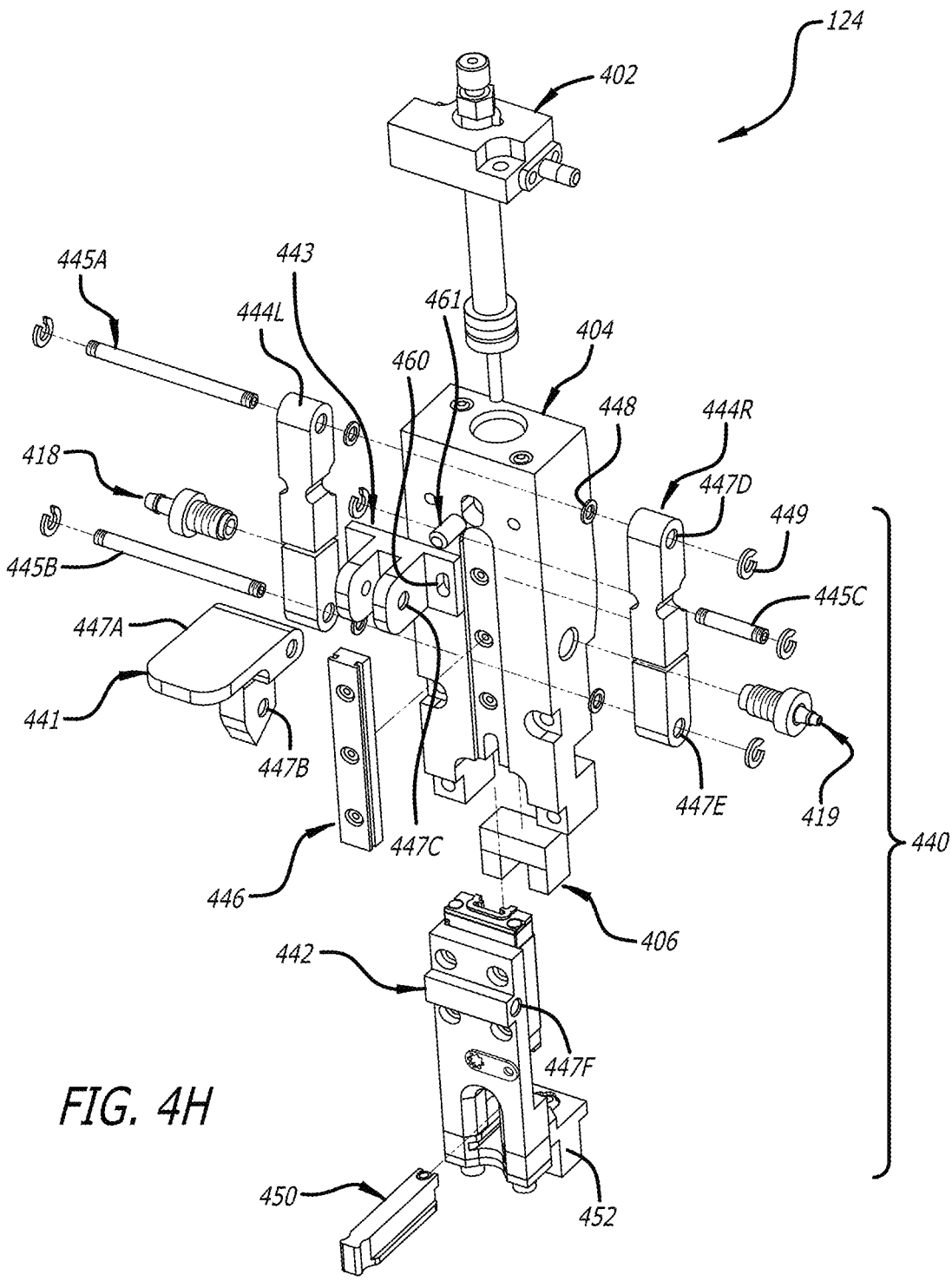
FIG. 4H is an exploded view of the flow cell of the compact cell sorter system.
Figure 4I:
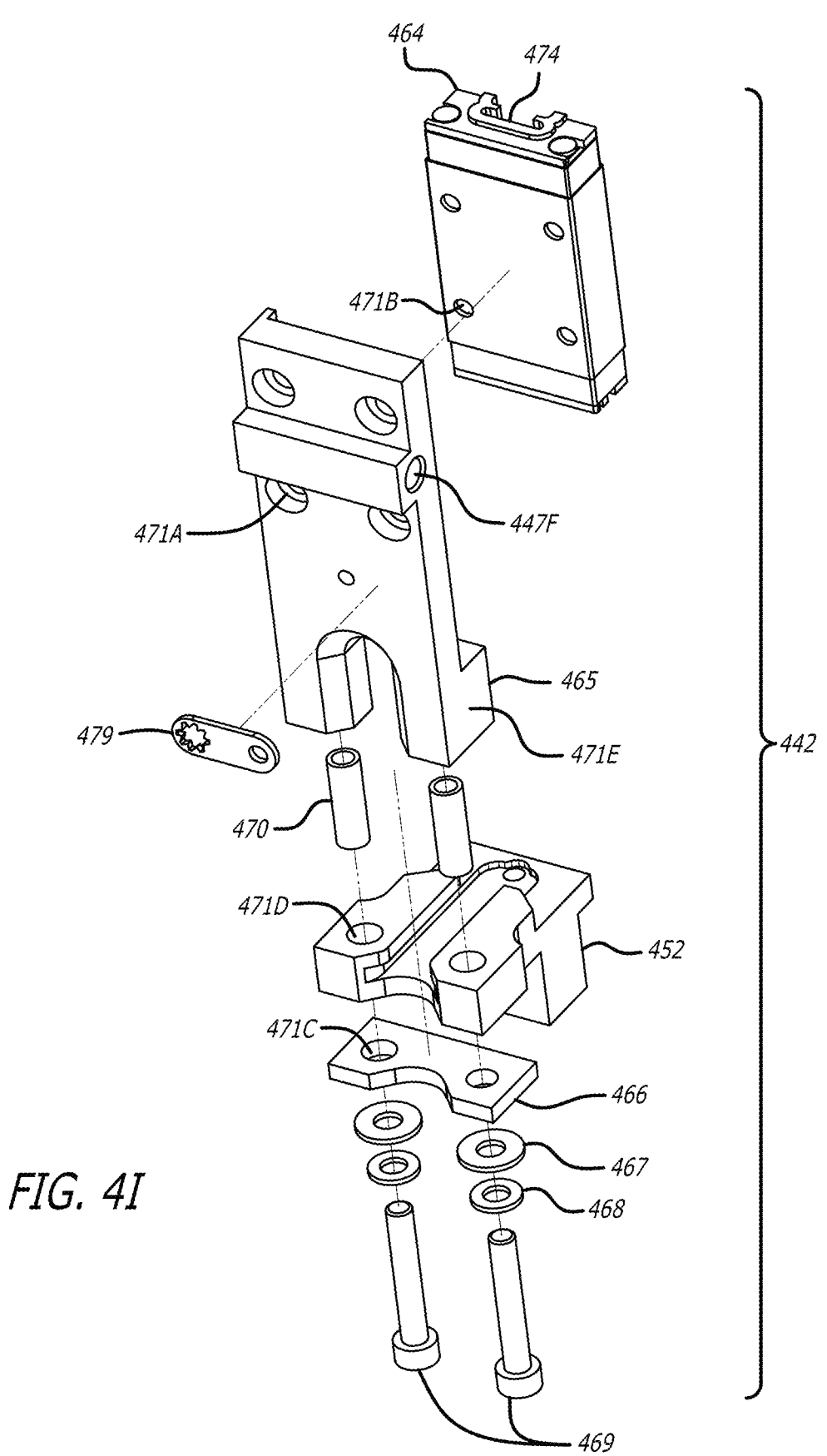
FIG. 4I is an exploded view of the nozzle carriage assembly of the flow cell shown in FIG. 4H.

Referring now to FIG. 4H an exploded view of the flow cell 124 is shown. The flow cell 124 includes flow cell linkage 440 and the nozzle carriage assembly 442. The nozzle assembly 450 slides into and out of the mount 452. an exploded view of the nozzle carriage assembly 442 is shown in FIG. 4I.

The flow cell linkage 440 has one or more links including a carriage lever 441, left and right spring-loaded lever arms 444L-444R, nozzle carriage assembly 442 pivotally coupled together at pivot points by pivotal shafts 445A-445C. Each of the pivotal shafts 445A-445C can include washers along the shaft between the lever arms and the pivotal openings 447A, 447C, and 447F. Each of the pivotal shafts 445A-445C is retained within the pivotal openings by a circlip (retention fastener) 449.

The carriage lever 441 is pivotally mounted to a pair of pivot point openings 447C in arms of a leverage hinge bracket 443 by shaft 445C at a pivot point opening 447B in a protrusion extending from the lever.

A top pivot point opening 447D in each of the left and right lever 444L-444R arms is pivotally coupled to the lever 441 at a pivot point opening 447A by the shaft 445A. A lower pivot point opening 447E in each of the left and right lever arms 444L-444R is pivotally coupled to the nozzle carriage assembly 442 at pivot point opening 447F by the pivotal shaft 445B. The nozzle carriage assembly 442 is slidingly coupled to a linear slide rail 446 that is mounted to the flow cell body 404 by one or more fasteners (e.g., threaded screws or bolts).

In operation, the carriage lever 441 pivots about pivot point opening 447B thereby lifting up or letting down at the top of the lever arms 444L-444R through the shaft 445A at pivot point openings 447A, 447D. This translates through the lever arms into linear motion at the bottom pivot point openings 447E. By the shaft 445B through the bottom pivot openings 447E in the lever arms 444L-444R and the pivot opening 447F in the nozzle carriage assembly 442, the liner motion in the lever arms is translated into a linear motion in the carriage assembly 442. With a nozzle assembly 450 slid into the mount 452, the carriage assembly 442 can lift up and lower down the nozzle assembly to engage and disengage with the cuvette 406.

The lever arms 444L-444R are spring-loaded between an upper portion and a lower portion to be sure a proper force is exerted upward on the nozzle assembly 450. This assures that an O-ring is squeezed to properly seal up against a surface the cuvette 406.

The flow cell linkage 440 is adjustable upward and downward by the hinge bracket 443. The hinge bracket 443 has a pair of elongated openings 460 in opposite sides of the flanges that mount to the flow cell 404. A pair of screws or bolts (not shown) are inserted through the elongated openings 460 through the elongated openings 460 and into threaded openings in the flow cell 404. The elongated openings 460 allow the bracket 443 to shift up or down around the pair of screws or bolts when loosened. The movement of the bracket 443 adjusts the flow cell linkage 440, including the carriage assembly 442, up or down.

The flow cell linkage 440 further includes a spring-loaded lever detent 461 with one end inserted into an opening in the flow cell 404 that can couple against a spring 427 (see FIG. 4D). As shown in FIG. 4D, an opposite end of the lever detent 461 rides up against a backside cam 425 in the lever hinge 441 to maintain the flow cell linkage 440 in either of an upward position or a downward position.

Referring now to FIG. 4I, an exploded view of the nozzle carriage assembly 442 is shown. The nozzle carriage assembly 442 includes a carriage plate 465, a linear bearing 464, the nozzle mount 452, a clamping plate 466, flat washers 467, lock washers 468, threaded bolts 469, and alignment tubes 470 assembled together. The threaded bolts 469 are inserted through the lock washers 468, the flat washers 467, through holes 471C in the clamping plate 466, holes 471D in the nozzle mount 452, and inner hollow cylinders of the alignment tubes 470. The threads of the bolts 469 are screwed or threaded into threaded holes 471E in the base of the carriage plate 465 to hold the mount 452 coupled to the plate. Fasteners, such as metal screws, are inserted through a plurality of through holes 471A in the front of the carriage plate 465 and screwed into threaded holes 471B in the linear bearing 464 to couple the plate and bearing together.

The linear bearing 464 includes a pair of guide rails 474 in a backside to slide along the linear slide rail 446 shown in FIG. 4H. The front side of the carriage plate 465 includes the pivotal opening 447F to receive the shaft 445B. A rectangular shaped portion of the carriage plate extends out from the front face of the plate to form the pivotal opening 447F.

To electrically ground the carriage assembly 442, a ground wire lug 479 coupled to a ground wire is mounted by a fastener to near a front center portion of the carriage plate 465.

Referring now to FIGS. 4J through 4M, various views of the lever arm 444L-444R are shown. Each of the lever arms 444L-444R can include at least one small side cutout to allow the lever arms to pass by the ends of the shaft 445C. Each of the lever arms can also include a back side cutout adjacent the side cutout.

Figures 4J, 4K, 4L, 4M:
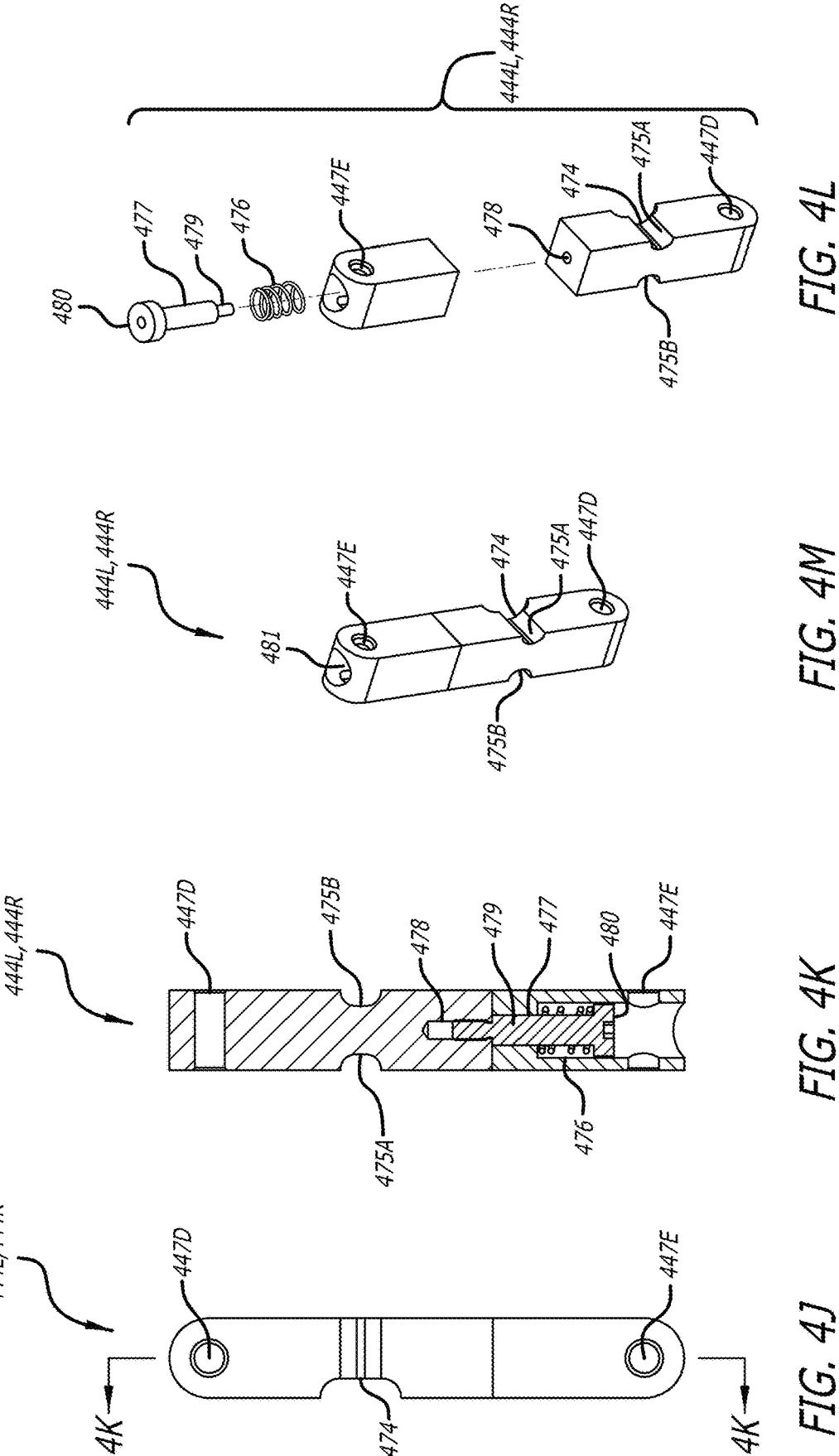
FIGS. 4J-4M illustrate various views of an instance of a left and right spring-loaded lever arm for the carriage linkage.

FIG. 4J illustrates the back notch 474 in each of the lever arms 444L-444R. The back notch provides clearance for the bracket 443 mounting screw heads.

FIG. 4K illustrates the spring-loaded assembly of each lever arm. FIG. 4K further illustrates the through holes 447D-447E. A bolt 480 holds the spring 476 and the upper and lower portions of each lever arm spring loaded together. The bolt 480 includes a shaft 477 with a smaller threaded portion 479 screwed into a threaded opening 478 in the upper portion up until the larger shaft buts up against a lower surface of the upper portion.

As shown in FIG. 4L, the shaft of the bolt 480 is inserted into and through the spring into the opening 481 in an end of the lower portion. The bolt 480 can have a hex head, a socket head, a screw head or otherwise a type of head rotatable by a tool inserted into the opening 481 in the end to reach the head deep in the opening.

The spring 476 presses up against the head of the bolt 480 at one end and presses against the bottom of the opening 481 in the lower portion at the opposite end. Accordingly, the lower portion and the upper portion of the lever arm can be slightly pulled apart and placed in tension up until the spring is fully compressed. The spring provides tension against the cam to help hold a position of the carriage release lever 441 and the carriage assembly.

Figures 5A, 5B:
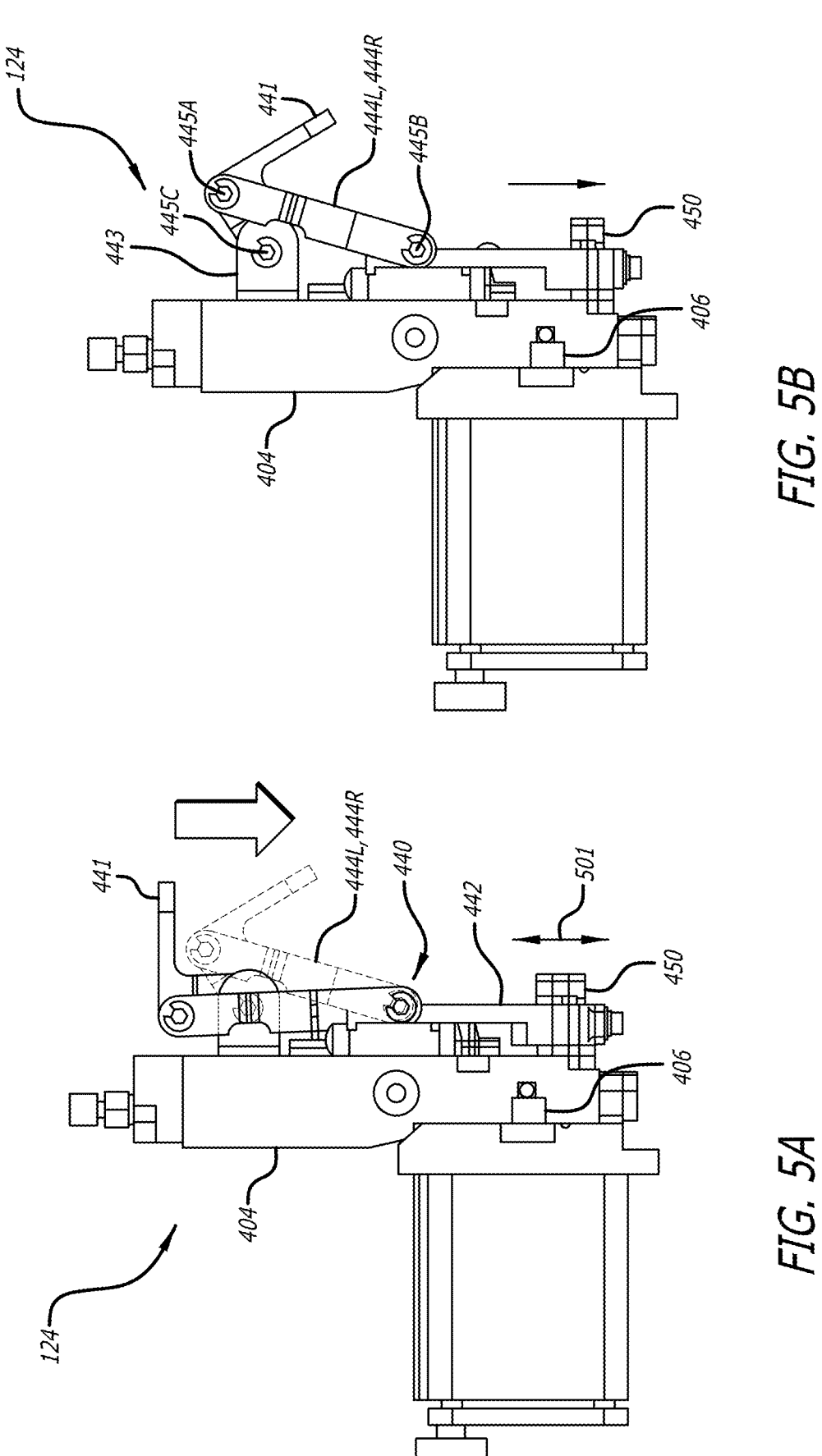
FIGS. 5A-5B are side views illustrating carriage movement of the flow cell as the lever is raised and lowered, respectively.

Referring now to FIGS. 5A-5B, the motion in the flow cell linkage 440 is shown under control of the carriage release lever 441. In the upward position of the release lever 441, the nozzle carriage assembly 442 is in its highest position so that the nozzle assembly 450 engages the cuvette 406. In this highest position, the lever arms 444L-444R are in a substantially vertical position. The cam in the release lever 441 is held in the upright position by friction from the detente. Pressing down on the release lever 441 causes the lever arms 444L-444R to pivot in parallel together away from the flow cell body 404 and allows the nozzle carriage assembly 442 to slide down in the guide rails. This lowering of the nozzle carriage assembly 442 disengages the nozzle assembly 450 from the cuvette 406.

As can be seen in FIG. 5B, the carriage release lever 441 pivots around the shaft 445C in the lever hinge/bracket 443. A lower end of the lever arms 444L-444R pivot around the shaft 445B in the carriage plate of the carriage assembly 442. An upper end of the lever arms pivot about shaft 445A in the release lever 441. The L shape of the release lever pushes the lever arms 444L-444R out and slightly downward with respect to the flow cell body 404.

Figures 6A, 6B:
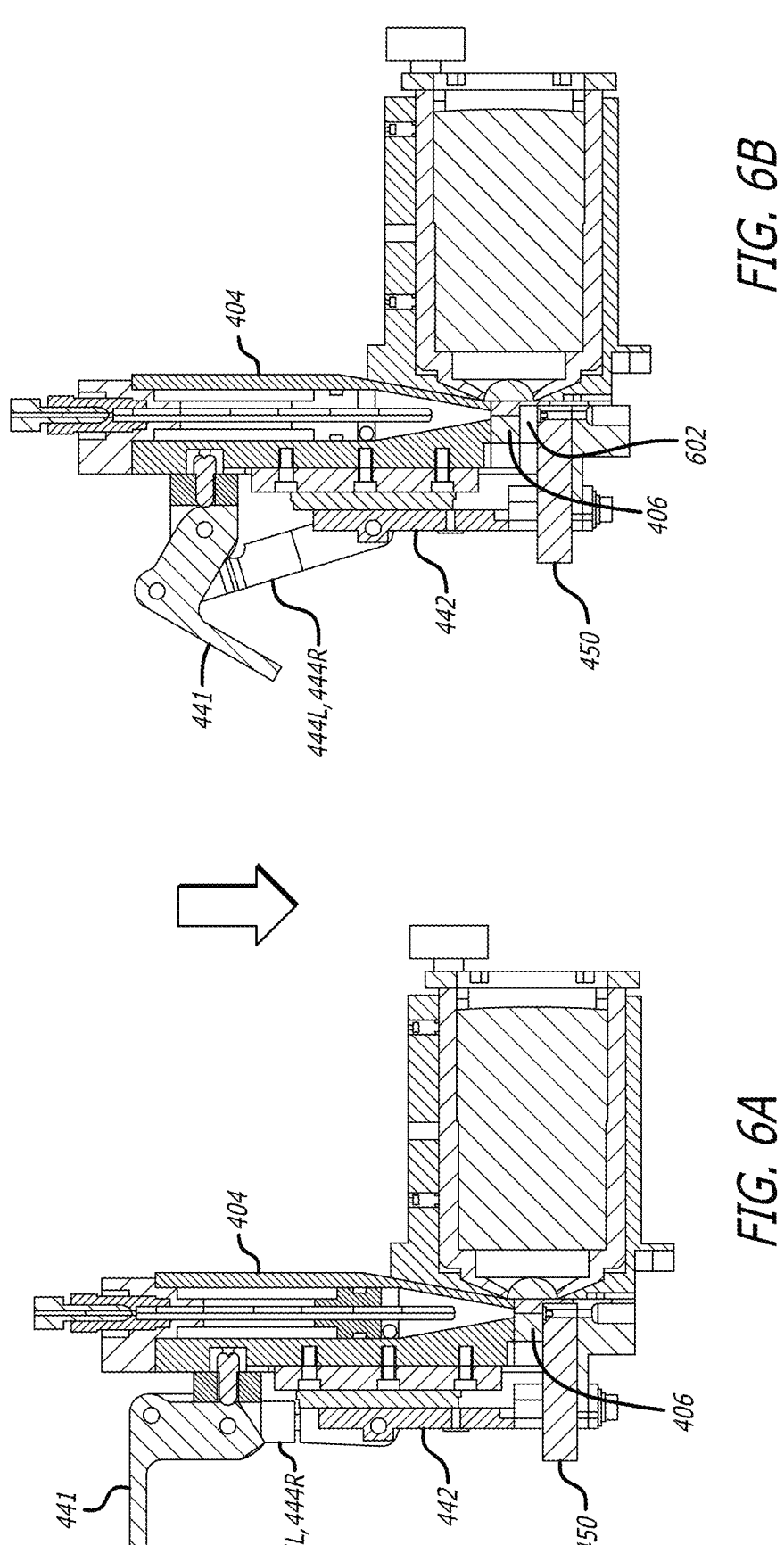
FIGS. 6A-6B are cross-sectional views illustrating carriage movement of the flow cell as the lever is raised and lowered, respectively.

FIGS. 6A-6B better show the disengagement of the nozzle assembly from the cuvette 406. In FIG. 6A, the release lever 441 is in its upward position. The lever arms 444L-444R (see FIG. 5A) are in their upward vertical position. The nozzle assembly 450 is in an upward position engaging the cuvette 406. The O-ring seal of the nozzle assembly 450 is pressed up against the cuvette 406 to seal around the nozzle to deter fluid leakage.

Figure 7A:
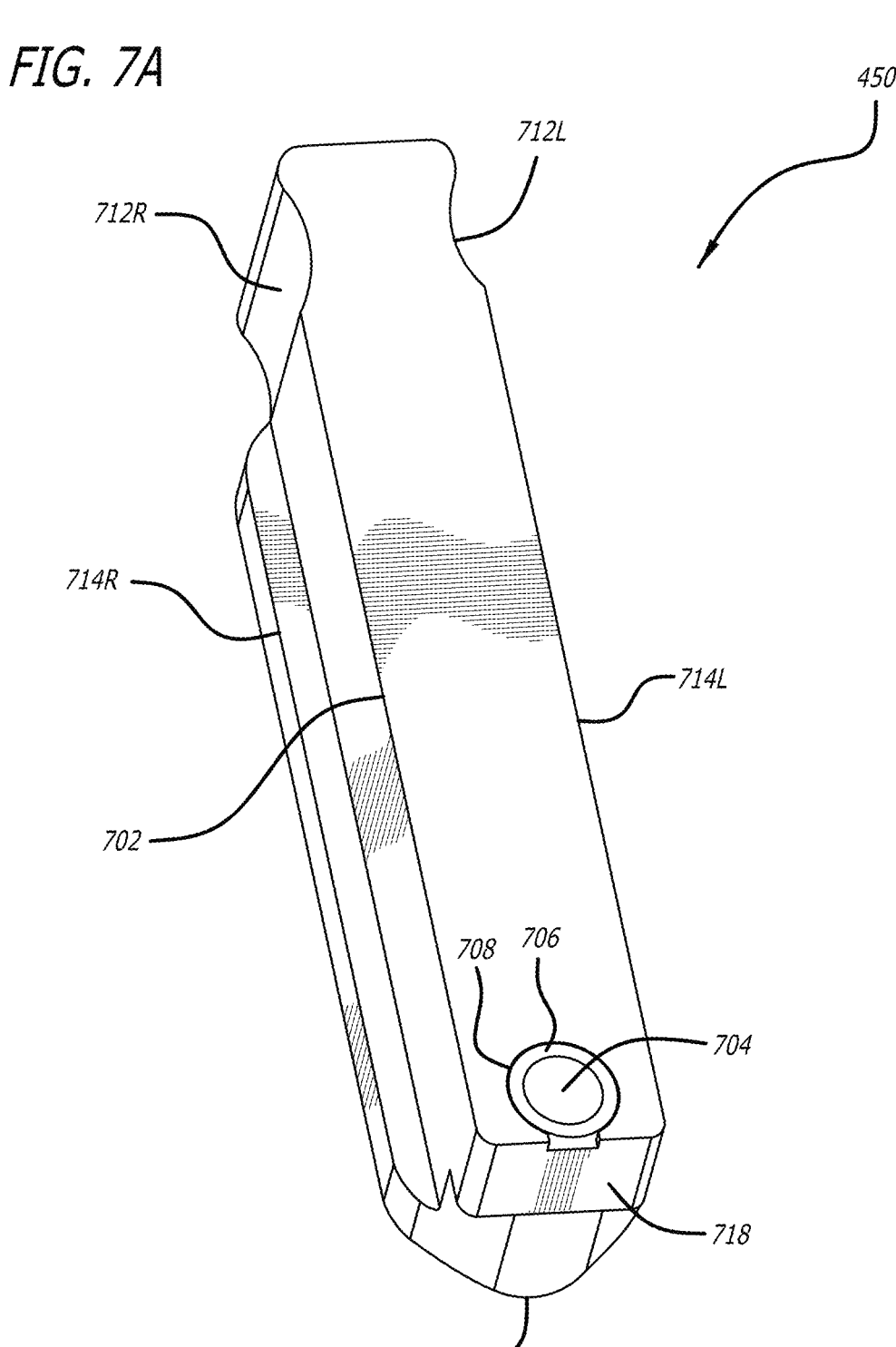
FIG. 7A is a perspective view of the nozzle assembly in the flow cell of the compact cell sorter system.
Figures 7B, 7C, 7D:
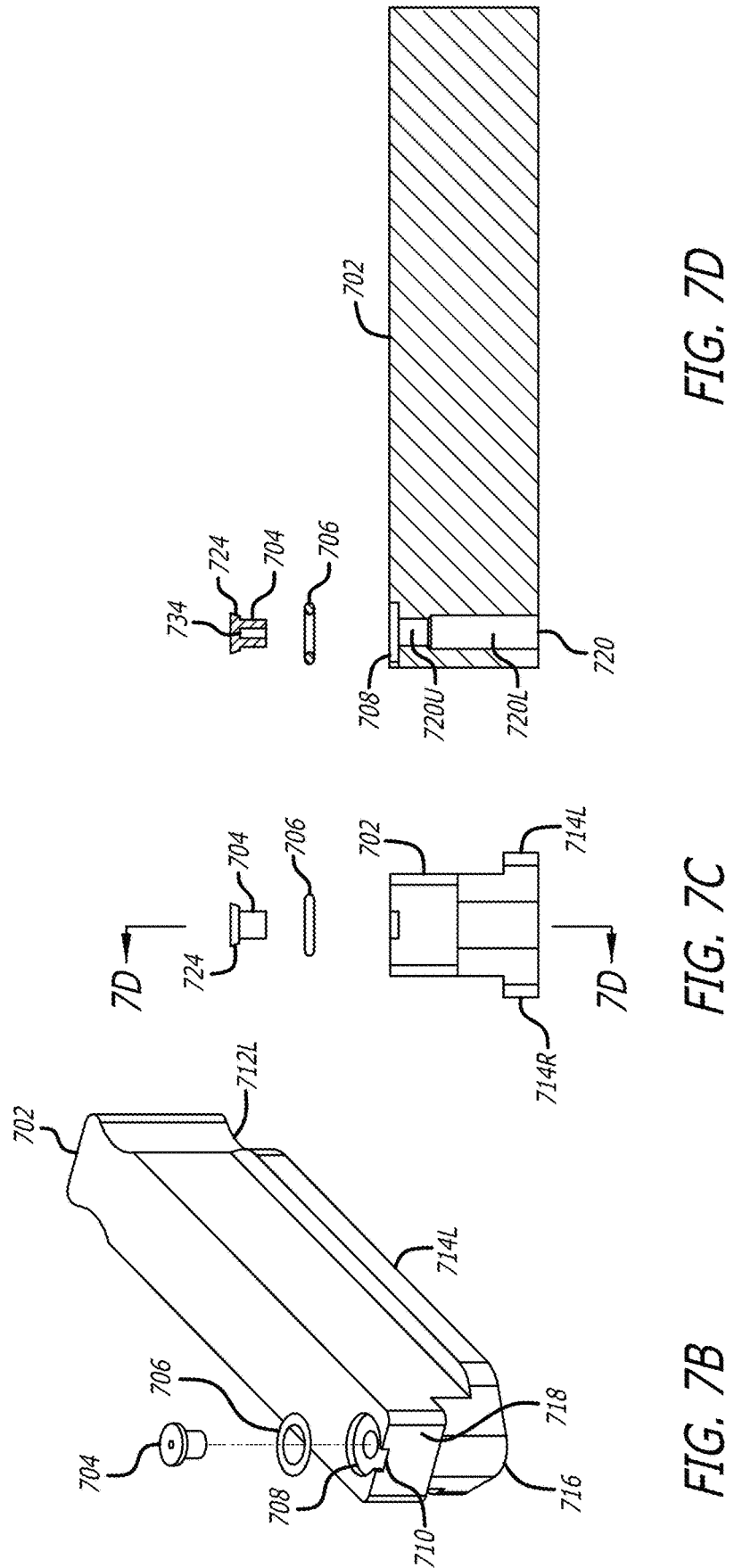
FIGS. 7B-7D are exploded views of the nozzle assembly in the flow cell of the compact cell sorter system.

In FIG. 6B, the release lever 441 is in its lower position, the lever arms are pivot away from the flow cell body 404 and the carriage assembly is in a lower position along with the nozzle assembly 450. Accordingly, the nozzle assembly 450 is disengaged from the cuvette 406. A gap 602 is shown between the nozzle assembly 450 and the cuvette 406. In this lowered position, the nozzle assembly 450 can be slid out and away from the mount 452 of the carriage assembly 442. Nozzle Assembly Referring now to FIGS. 7A-7F, various views of the nozzle assembly 450 are illustrated. FIGS. 7B-7D illustrate various exploded views of the nozzle assembly 450. FIGS. 7A and 7E-7F illustrate various assembled views of the nozzle assembly 450.

The nozzle assembly 450 includes a three-dimensional nozzle body 702, a ceramic nozzle 704, a replaceable O-ring 706, and a partial gland opening 708. The partial gland opening 708 is washer shaped opening that includes a slot 710 at a back end for easy O-ring removal by fingernail or a small tool. Despite having the slot 710, the O-ring 706 in the partial gland opening 708 can still provide a seal around the nozzle 704 capable of withstanding high pressures when pressed against a cuvette. The cross-section of the three-dimensional body 702 generally has a top portion, a mid-section portion under the top portion, and a base portion under the top and midsection portions. The three-dimensional body 702 further includes a left rail 714L and a right rail 714R along left and right sides in the base portion.

The three-dimensional body 702 is elongated and provides a handle at a front end by a left indentation 712L and a right indentation 712R in top, midsection, and bottom portions. At a back end opposite the front end, the three-dimensional body 702 provides a nose or arch-shaped stop 716 in the base portion to make two points of contact. The nose or arch-shaped stop 716 extends up from the base through the midsection up to the top portion of the body. The end 718 of the top portion extends slightly out over the nose or arch-shaped stop 716 to be sure the O-ring has sufficient support in the partial gland to seal up against the cuvette. Because it provides a handle, the three-dimensional body 702 may be referred to herein as the nozzle handle 702.

As shown in FIG. 7D, the three-dimensional body 702 includes a through hole 720 starting at the base of the partial gland 708 with an upper receptacle portion 720U to receive the nozzle 704 and a lower drop channel portion 720L to allow drops to flow through without interference from the sidewalls.

The three-dimensional body 702 is formed of a high performance engineered thermoplastic polymer, such as polyether-ether-keytone (PEEK) in the polyaryletherketone (PAEK) family, to provide mechanical strength and high temperature and chemical resistance. The three-dimensional body 702 is generally formed with low tolerances. The low tolerances allow the nozzle assembly to readily slide in and out of guides in a mount. The low tolerances also provide a somewhat sloppy friction fit to the mount and allow a slight pivotal motion to clear debris from two stop points at the arch shaped stop 716. Other thermoplastic polymers may be used to form the three-dimensional body 702 at low cost and low tolerances.

The size (e.g., diameters, depth) and shape of the gland and the nozzle, allow a low-cost standard rubber O-ring to be used as the replaceable O-ring 706. The O-ring may be formed of ethylene propylene diene monomer (EPDM), a synthetic rubber, having good resistance to various environmental factors. In alternate embodiments, the O-ring can be formed of silicon rubber or natural rubber.

The nozzle 704 is preferably a ceramic nozzle formed of a ceramic material given its insulative electrical properties to avoid grounding of the charges being transferred to the drops of sample fluid before reaching the deflection unit. As shown in FIGS. 7C-7F, the top of the nozzle 704 has a beveled ring 724 to properly receive and hold the circular cross section of the O-ring in the depth of the partial gland. The top of the nozzle 704 has a drop inlet 734 that leads to a somewhat larger diameter drop channel 735 in the nozzle. When the nozzle 704 is friction fitted into the upper receptacle portion 720U of the body 702, the nozzle channel 735 of the nozzle 704 is in communication with a somewhat larger diameter lower drop channel 720L of the through hole 720 extending the width of the body 702.

FIGS. 7E and 7F illustrate how the nozzle 704 and O-ring 706 are assembled into through hole and partial gland opening in the body 702 of the nozzle assembly. The O-ring 706 is held in the partial gland opening 708 by the beveled ring 724 in the top portion of the nozzle 704.

The nozzle assembly 450 is selectively slidingly coupled into and decoupled from the nozzle mount 452. The tolerances between the nozzle body of the nozzle assembly 450 and the nozzle mount 452 is about 0.25 microns or more for a lose fit. It is not a tight fit. This allows the nozzle assembly 450 to pivot somewhat about an axis through the orifice of the nozzle. The lose fit facilitates clearing of debris between the nose and the receiver of the nozzle mount for a proper registration of the nozzle orifice with the fluid flow channel in the cuvette 406.

The cuvette 406 can be formed of one or more pieces of optical grade quartz to receive laser light and allow reflected light, scattered light, fluorescent light to be captured.

The sample droplets can become charged by the conductive host fitting mounted in a drain/charge port of the flow cell. Accordingly, the nozzle assembly is formed of non-conductive or insulative materials to avoid charge loss through a ground path to the carriage assembly. The nozzle mount 452 and the nozzle carriage assembly 442 are electrically grounded to shield the charged droplets from the charges on deflection plates below the nozzle mount.

FIGS. 8A-8B, and 9A-9B illustrate views of sliding the nozzle assembly 450 into and out of the nozzle mount 452 of the carriage assembly 442 in the flow cell 124. This allows for maintenance of the nozzle assembly 450, including replacement of its O-ring gasket or seal.

Assume the nozzle assembly 450 is pushed into the slot 910 in the mount 452. Initially, as better shown in FIGS. 9A-9B, bottom rails 714L-714R of the nozzle assembly 450 are lined up and respectively inserted into guide rail openings 914L-914R in the mount 452. The nozzle assembly 450 is pushed into the mount within the slot 910 as far as possible so that the nose stop 716 of the body 702 engages the end wall of the mount in the slot 910.

In operation of the cell sorter (sorting flow cytometer), a stream of sample drops with marked cells/particles flow from the SIT into the flow cell body and then into the flow channel 906 of the cuvette 406 for analysis by lasers and detectors. If the nozzle assembly 450 is properly aligned in the mount 452, the stream of drops from the flow channel in the cuvette 406 are received by the opening in a nozzle of the nozzle assembly. The mount 452 has an opening 916 in the slot 910 that allows a stream of drops received from the opening in the nozzle of the nozzle assembly 450 to pass through. Accordingly, it is desirable to achieve proper alignment of the nozzle assembly 450 in the mount 452.

Alternatively, assume the nozzle assembly 450 is pulled out of the slot 910 from the mount 452 for maintenance. A user squeezes two fingers into the left and right finger grabs 712L-712R of the body 702 and pulls out on the nozzle assembly 450 sliding it out of the slot 910 and away from the mount 452.

FIGS. 8B-8C, and 9B-9C, illustrate views how the nozzle assembly 450 in the mount 452 is raised and lowered by the flow cell linkage 440 and carriage assembly 442 to respectively press and un-press an O-ring seal of the nozzle assembly 450 up against the cuvette 406.

Figures 8A, 8B:
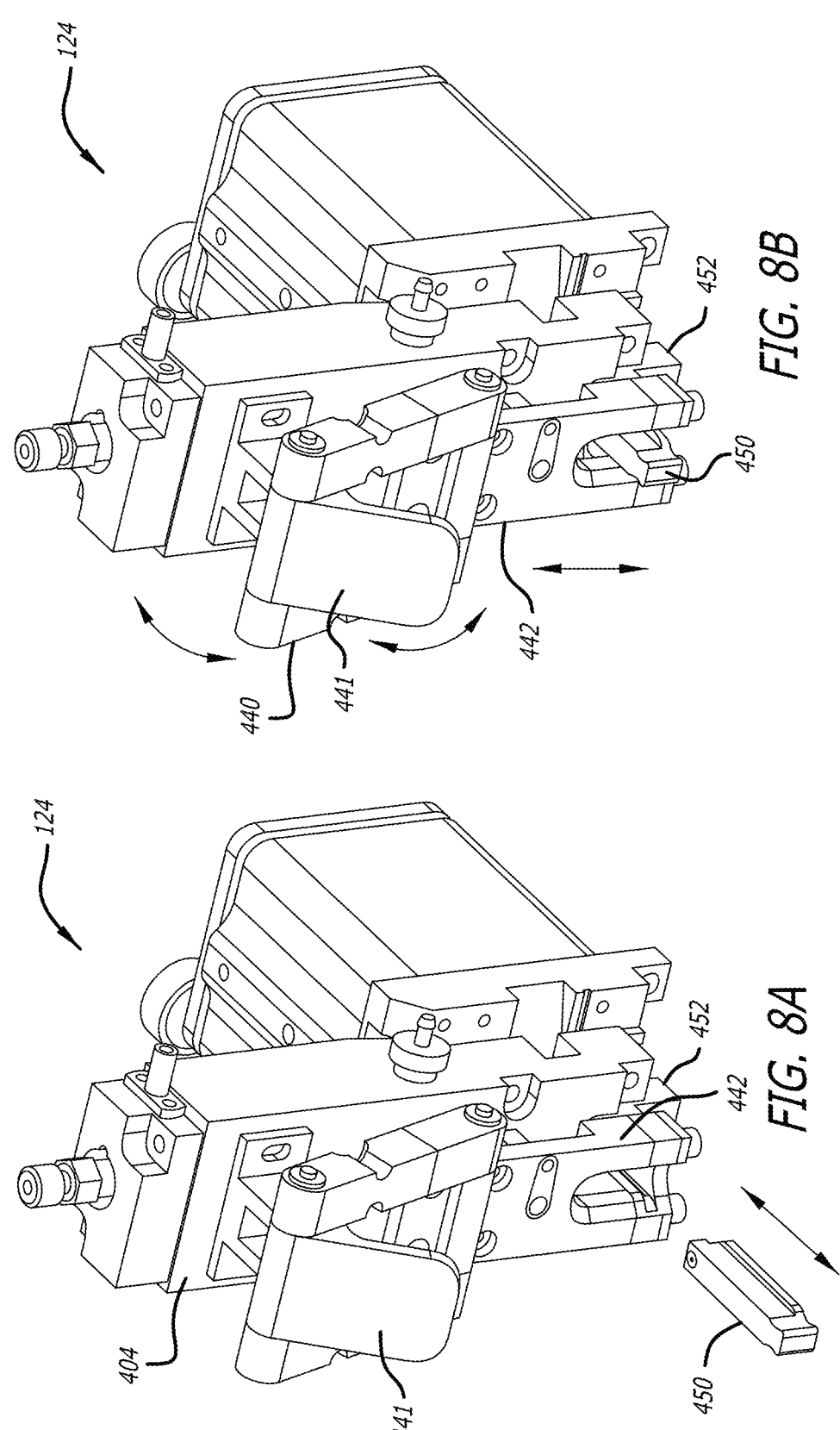
FIG. 8A is a view of engagement/disengagement of the nozzle assembly with the flow cell of the compact cell sorter system.
FIGS. 8B-8C are perspective views of the flow cell illustrating carriage and nozzle assembly movement down and up as the lever arm is pivoted.
Figures 9A, 9B, 9C:
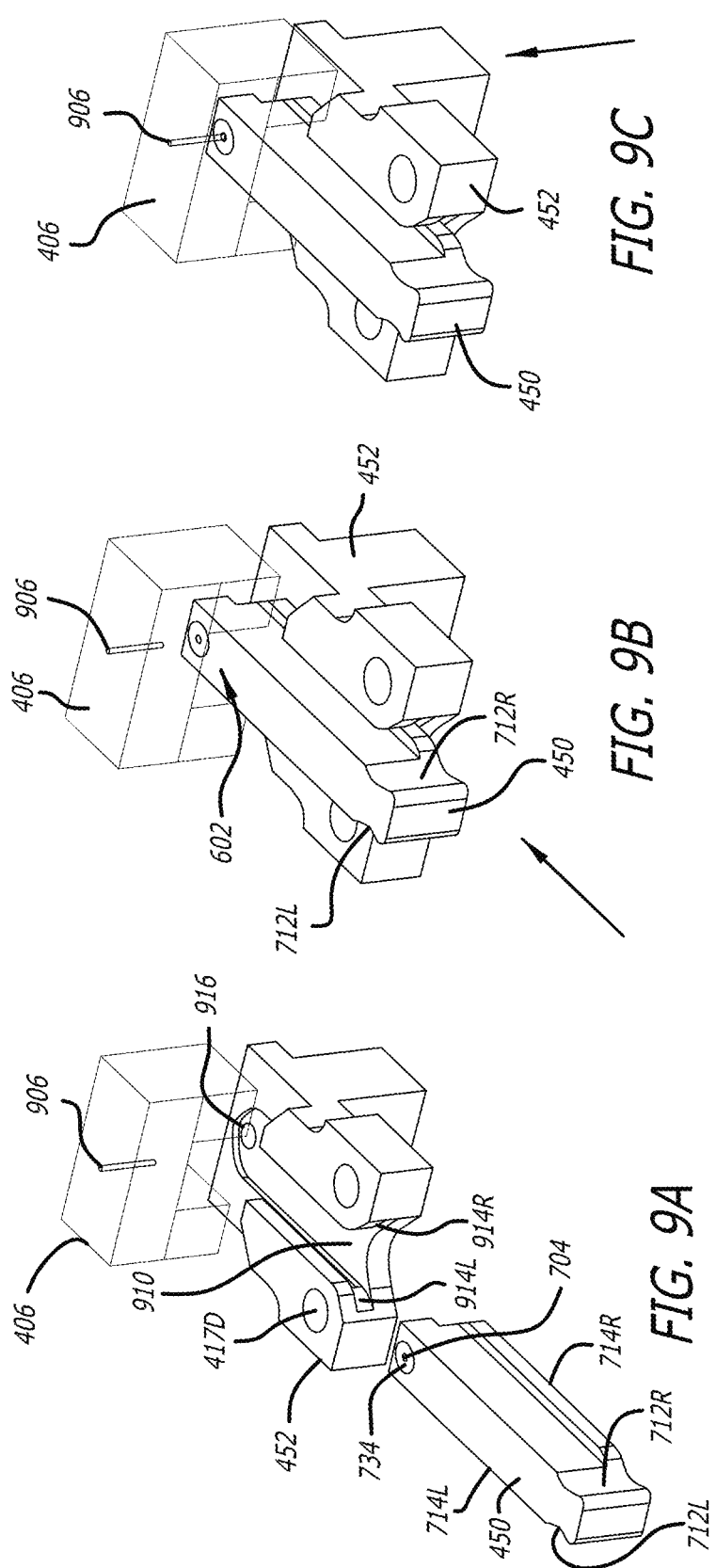
FIG. 9A is a perspective view of engagement/disengagement of the nozzle assembly with the nozzle mount of the flow cell.
FIGS. 9B-9C are perspective views of the registered nozzle assembly moving up to engage the cuvette as the lever arm is pivoted.

In FIGS. 8B, and 9B, release lever 441 and the nozzle assembly 450, engaged in the mount 452 of the carriage assembly 442, are in a lowered position. In the lowered position, a gap 602 exists between the cuvette 406 and the nozzle assembly 450 as shown in FIG. 9B. To engage the nozzle assembly 450 with the cuvette 406, a user lifts up on the release lever 441 pivoting it about the shaft 445C. This causes the linkage assembly 440 to pivot forward into the flow cell body about the shaft 445B and lift up on the lever arms 444L-444R and the carriage assembly 442. With the nozzle assembly 450 mounted in the mount 452 of the carriage assembly 442, the nozzle assembly is lifted up together with the carriage assembly.

Figure 8C:
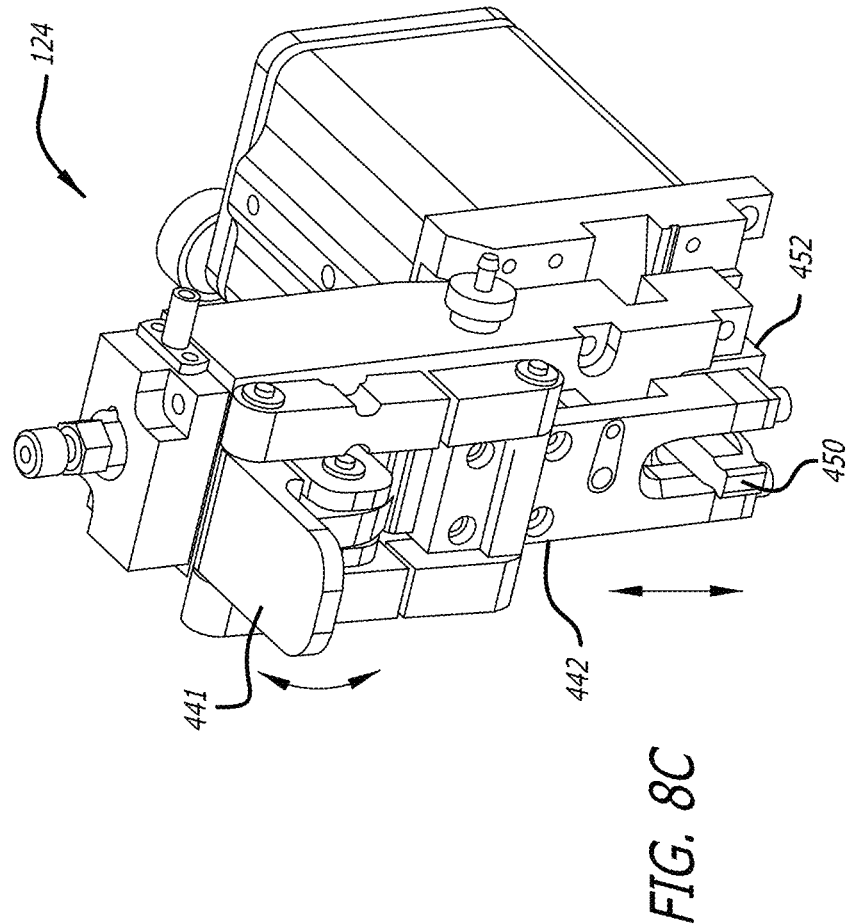
Figure 10A:
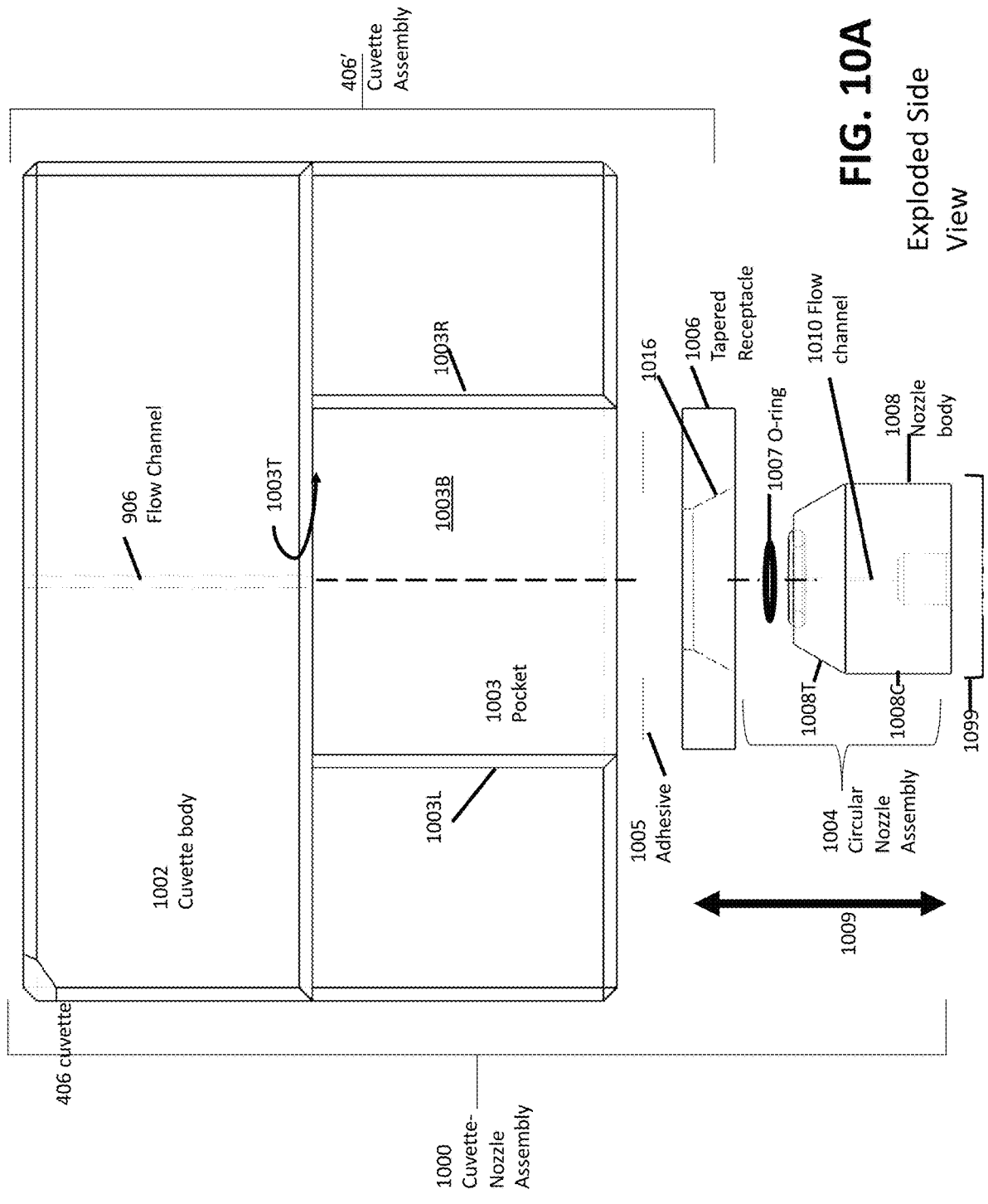
FIG. 10A is an exploded side view of a cuvette nozzle assembly with a circular nozzle assembly.
Figure 10B:
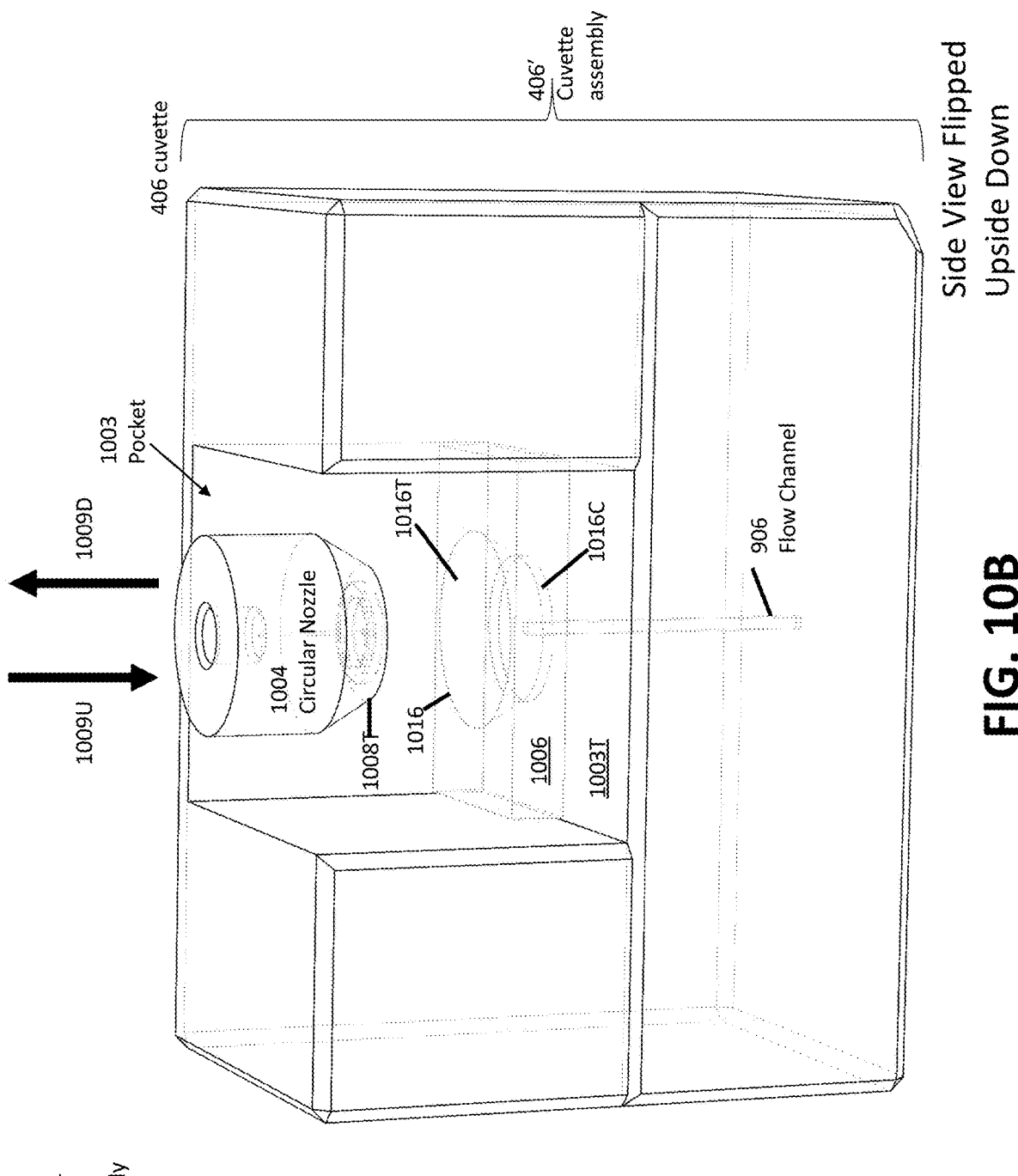
FIG. 10B is a perspective upside down view from the top of the cuvette nozzle assembly with the circular nozzle assembly disengaged from the tapered receptacle of a cuvette subassembly.
Figure 10C:
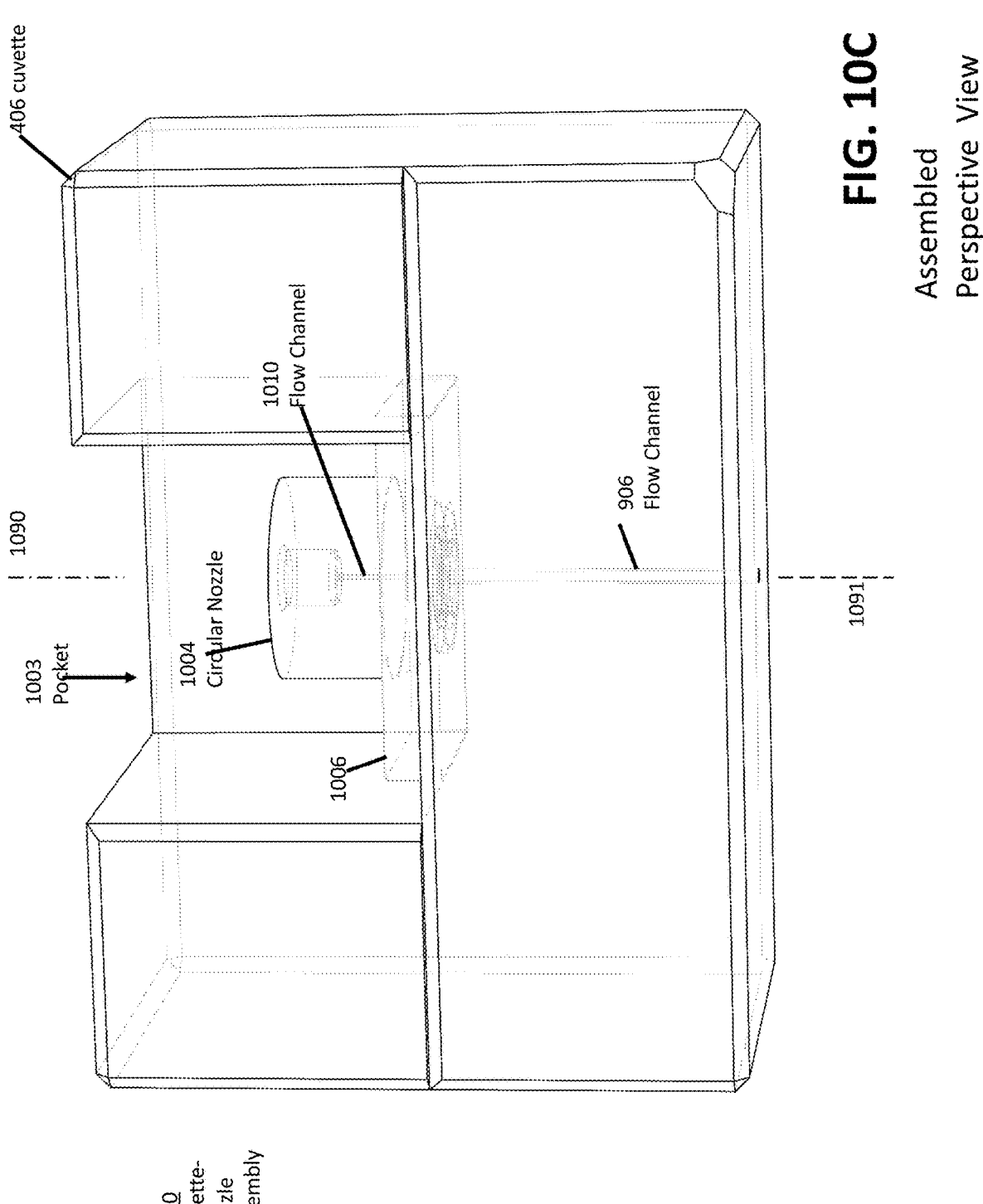
FIG. 10C is a perspective upside down view of the cuvette nozzle assembly with the circular nozzle assembly engaged with the tapered receptacle of the cuvette subassembly.

In FIGS. 8C, 9C, and 10C, the release lever 441 and the nozzle assembly 450 engaged in the mount 452 are in a raised or upper position. The gap 602 between the nozzle assembly and the cuvette 406 is substantially reduced and forces the O-ring seal of the nozzle assembly up against a base of the cuvette 406 around the flow channel 906.

The spring-loaded detent slidingly engages the backside cam 425 of the release lever 441 to maintain a selected position of the linkage, carriage assembly, and nozzle assembly. From the lower position to the upper position of the release lever 441, the spring-loaded detent 461 rides on a lower part of the backside cam 425 and comes to rest against an upper part of the backside cam 425 as shown in FIG. 4D. Between the lower part and the upper part of the backside cam 425 is a bump that has a larger radial distance from the shaft 445C than that of the lower part of the cam. The upper part of the cam can have a similar radial distance or smaller radial distance to the shaft than the bump. Accordingly, with the release lever in the upper position, the compression spring 427 behind the detent 461 is compressed more and applies more force against the cam 425. This spring force on the detent and the upper portion of the cam helps maintain the release lever in the upper position. A user pushes down on the release lever 441 to overcome the force and friction applied by the spring-loaded detent in the upper portion and move the cam to the lower portion actuating the linkage 440 in order to lower the carriage 442 and the nozzle assembly 450.

To disengage the nozzle assembly 450 from the cuvette 406, a user pushes down on the release lever 441 pivoting it about the shaft 445C. This causes the linkage assembly 440 to pivot forward away from the flow cell body about the shaft 445B and let down the lever arms 444L-444R and the carriage assembly 442. With the nozzle assembly 450 mounted in the mount 452 of the carriage assembly 442, the nozzle assembly is lowered down together with the carriage assembly. Accordingly, in the lowered position, the large gap 602 is formed between the cuvette 406 and the nozzle assembly 450 to allow the nozzle assembly 450 to be slid out from the mount 452 without damaging the cuvette 406. With the nozzle assembly 450 slid out and away from the mount, a new nozzle assembly may be installed in its place and/or maintenance can be performed on the used nozzle assembly and reinstalled when completed.

While the nozzle assembly 450 is referred to herein, a test or alignment nozzle assembly can be similarly inserted and removed from the nozzle mount 452. Furthermore, a circular nozzle assembly can also be engaged with and disengaged from a cuvette or cuvette assembly by a mount and a carriage or elevator assembly and its linkages.

Cuvette Nozzle Subsystem

The nozzle assembly 450 described previously can be engaged to and disengaged from a flow cytometer by sliding it into and out of the nozzle mount 452. Furthermore, the nozzle assembly 450 is held in the nozzle mount 452 by the fit and friction of the engaging portions (e.g., side rails and rail slots, bottom surface of nozzle body and base of slot) therebetween. Unfortunately, a nozzle assembly is often removed (dismounted) from the mount such as to clear a clog in the nozzle orifice or replaced with a different size flow channel to generate different sized drops of fluid. When the nozzle assembly 450 is slid back into the mount, it may not stop or register at a substantially similar spot in the mount. Thus, the flow channels in the nozzle may be slightly offset from the flow channel in the cuvette so that the flow of drops may be slightly altered.

To avoid having to recalibrate the cell sorter or flow cytometer for drop flow each time a nozzle assembly is replaced, it is desirable to have a nozzle assembly stop and register at substantially the same spot in the mount. This is so the alignment between flow channels in the nozzle and the cuvette remains substantially the same to that for which they were previously calibrated. Advantageously, a cuvette-nozzle subsystem 1000 with a circular nozzle assembly 1004 in a flow cytometry system (e.g., a flow cytometer or a cell sorter) can implement such desirable functionality.

Referring now to FIGS. 10A-10E, a cuvette-nozzle subsystem (assembly) 1000 of a flow cytometry system (e.g., flow cytometer and cell sorter) is now described. In FIG. 10A, an exploded view of the cuvette-nozzle subassembly 1000 is shown. The cuvette nozzle subsystem 1000 includes the cuvette 406, a tapered receptacle 1006, and a circular nozzle assembly 1004. An adhesive or epoxy 1005 is used to couple the tapered receptacle 1006 and the cuvette 406 together to form a cuvette assembly 406'.

The cuvette 406 has a cuvette body 1002 with a pocket 1003 and a flow channel 906. The flow channel 906 in the body 1002 is between a top surface 1003T in the pocket 1003 and a top surface of the cuvette 406. The cuvette 406 is made of plastic, glass, crystal, or optical grade quartz that is clear and transparent to laser light of desired wavelengths and the light generated by fluorescent dyes for detectors to detect in a visible portion of the electromagnetic spectrum and infrared light in a non-visible portion of the electromagnetic spectrum for detectors to detect. Accordingly, the flow channel 906 allows fluid with particles to flow through so that the particles (e.g., biological cells) can be analyzed by laser light and infrared light from lasers with detectors. In the pocket, the cuvette 406 has a left side surface 1003L, a back side surface 1003B, a right-side surface 1003R, and the top side surface 1003T. The front side and the base of the pocket 1003 are open. The base opening in the pocket 1003 can receive the tapered conical receptacle 1006 and the circular nozzle assembly 1004.

In the pocket 1003, the top surface of the tapered conical receptacle 1006 is coupled to the top side surface 1003T of the cuvette 406 by the adhesive. The body of the tapered conical receptacle 1006 includes a tapered through-hole 1016. The adhesive 1005 may be thinly applied to portions of a top surface 1003T in the pocket avoiding the through-hole 1016 of the receptacle 1006. The through-hole 1016 includes a tapered conical surface 1016T joined to a circular cylindrical surface (a relief having a ring-shape opening) 1016C. The tapered conical surface 1016T can receive the top conical portion 1008T of the circular nozzle assembly 1004. The body of the receptacle 1006 can be made of a high performance engineered thermoplastic polymer, such as polyether-ether-keytone (PEEK), or a ceramic material to provide mechanical strength, high temperature resistance, and chemical resistance.

The circular nozzle assembly 1004 includes an o-ring gasket 1007 and a nozzle body 1008 coupled together. The nozzle body 1008 can be formed out of a high performance engineered thermoplastic polymer (e.g., PEEK) or a ceramic material for similar reasons of the receptacle body. The nozzle body has a ring groove or opening 1008R with a semi-circular or u-shaped cross section in its top surface to receive the o-ring gasket 1007. The nozzle body 1008 further has a center flow channel 1010 between the top surface and an open cylindrical chamber 1012 to allow the flow of fluid and the formation of droplets in a stream. The o-ring gasket 1007 rests in the ring groove 1008R around the flow channel 1010.

The circular nozzle assembly 1004 is removably mounted (mounted and dismounted) to a movable circular mount 1099. An elevation device, such as the carriage linkage assembly (flow cell linkage) 440 shown in FIG. 4B, is coupled to the mount 1099 to move the mount 1099 and the circular nozzle assembly 1004 together up and down. The up and down movement, indicated by double arrow headed line 1009, allows the circular nozzle assembly 1004 to engage with (arrow head line 1009U in FIG. 10B) and disengage from (arrow head line 1009D in FIG. 10B) the tapered conical receptacle 1006. When the circular nozzle assembly is moved up into position, a top surface of the o-ring gasket 1007 engages the top surface 1003T of the cuvette to seal around the flow channels 906, 1010 to avoid leakage. In one embodiment, the o-ring gasket 1007 is a rubber gasket formed out of rubber in the shape of an o-ring. In another embodiment, the o-ring gasket 1007 is a silicon gasket formed out of silicon in the shape of an o-ring. Other pliable materials can be used to form the o-ring gasket 1007. The nozzle body 1008 includes a cylindrical portion 1008C and a tapered conical portion 1008T.

Figure 10D:
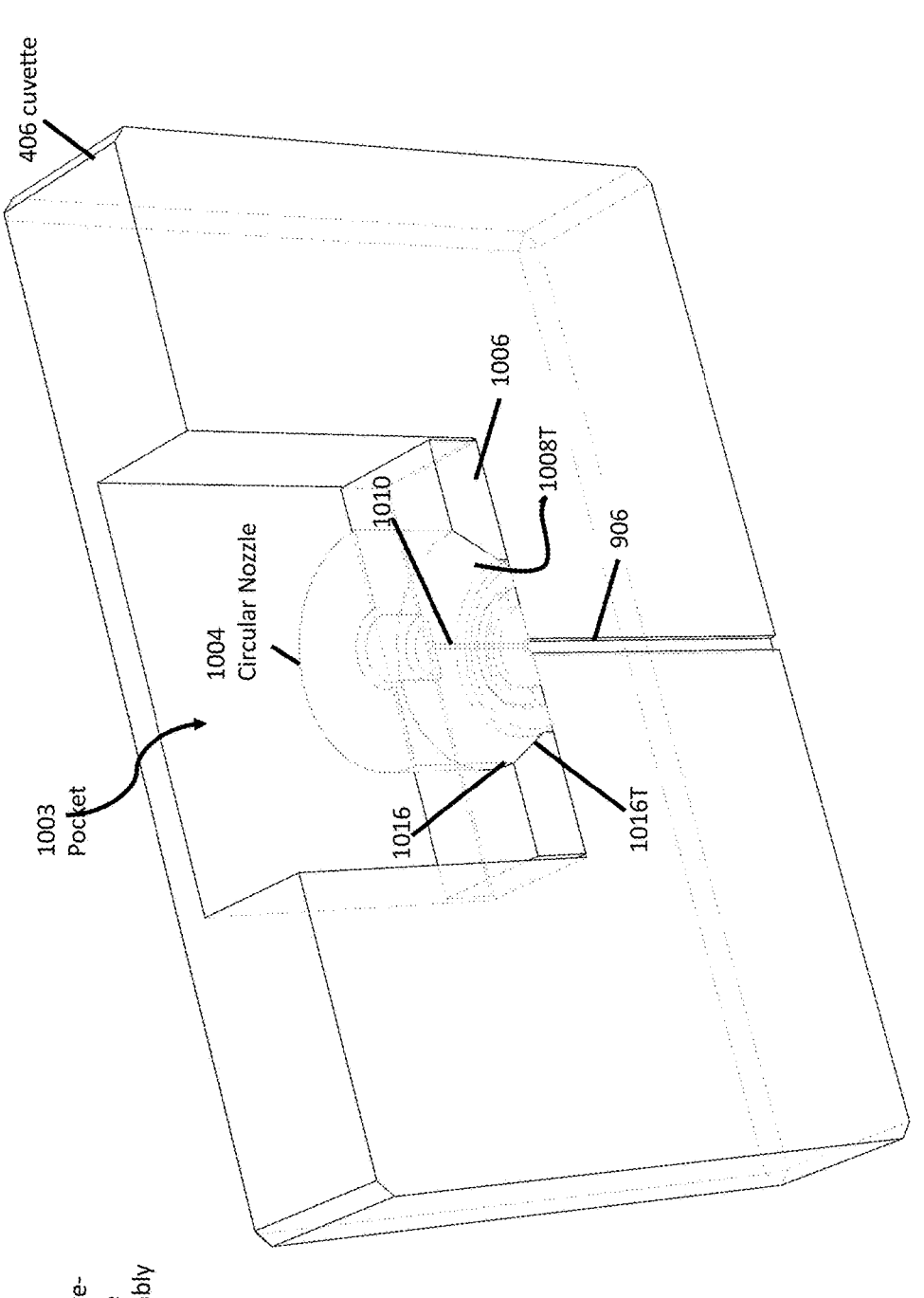
FIG. 10D is a perspective upside down cross-sectional view of the cuvette nozzle assembly.

The tapered conical receptacle 1006 is coupled to the cuvette 406 by the adhesive 1005. In one embodiment, the adhesive 1005 is an epoxy. In another embodiment, the adhesive 1005 is a glue. The body of the tapered conical receptacle 1006 includes a through-hole 1016 having a hollow tapered conical portion 1016T merged or joined to a hollow cylindrical portion 1016C. The hollow cylindrical portion 1016C of the through-hole 1016 prevents the adhesive from entering the through-hole and interfering with the engagement between the circular nozzle assembly and the cuvette assembly. As shown in FIG. 10B, the receptacle 1006 is located nearer the back side surface 1003B of the pocket 1003 instead of the front. As shown in FIG. 10D, the hollow tapered conical portion 1016T of the through-hole 1016 receives the tapered conical portion 1008T of nozzle body 1008 of the circular nozzle assembly 1004. The surfaces of the hollow tapered conical portion 1016T and the tapered conical portion 1008T are formed with the same angle form a similar point of view. However, the surface area of the tapered conical portion 1008T is greater than the surface area of hollow tapered conical portion 1016T to allow the circular nozzle assembly 1004 to slide further into the through-hole to press the o-ring gasket against the top surface of the cuvette. As shown in FIG. 10C, when the circular nozzle assembly 1004 is engaged with the tapered conical receptacle 1006, axes 1090, 1091 of the flow channel 906 and the flow channel 1010 are substantially aligned together within a range of tolerances (e.g., 0 mm to 2 mm).

Figure 10E:
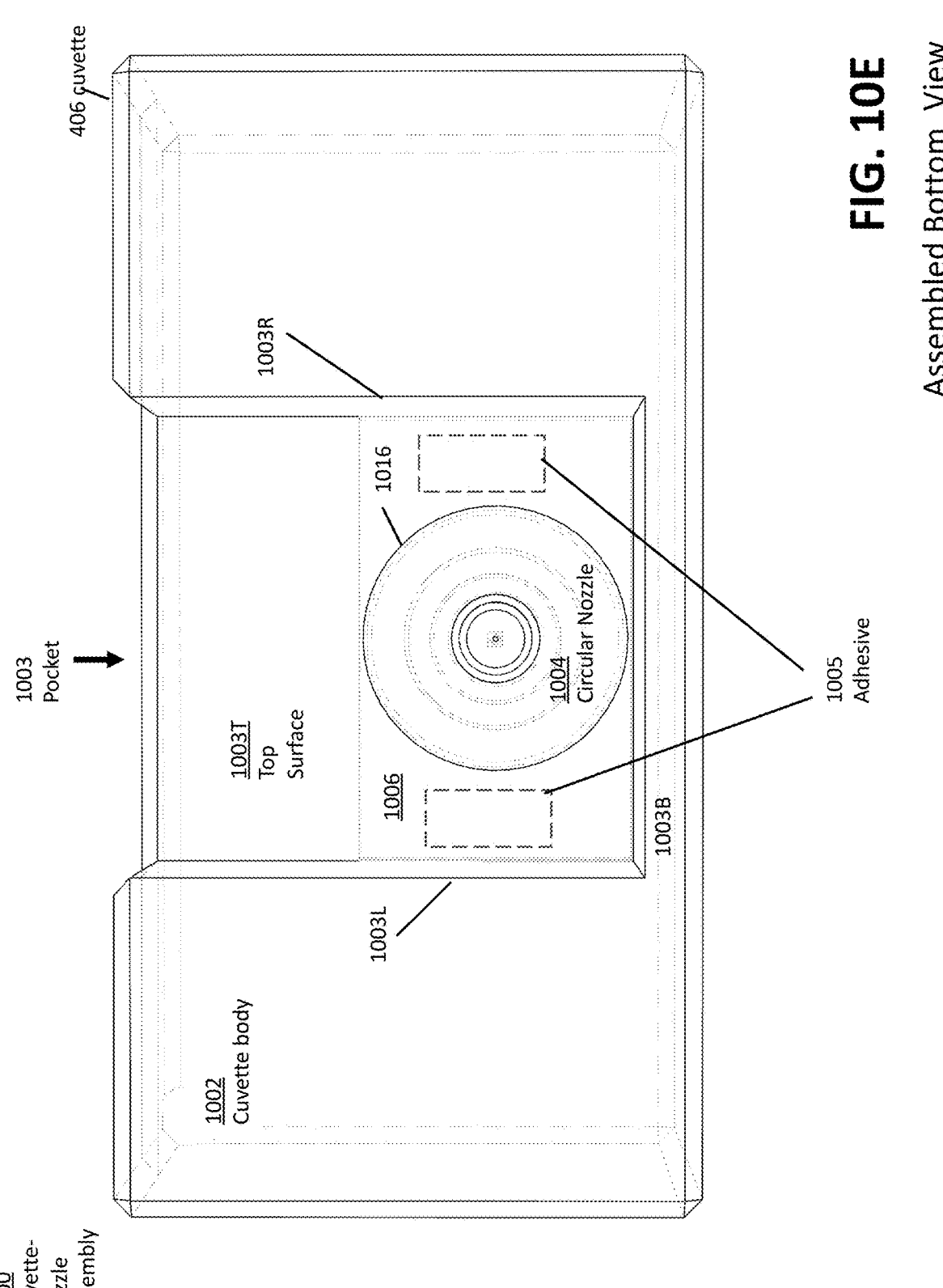
FIG. 10E is a perspective upside down view from the bottom of the cuvette nozzle assembly.

In FIG. 10E, one or more portions of adhesive 1005 are placed on the surface 1003T of the cuvette 406 within the pocket 1003. The adhesive is carefully placed to avoid leaking over/under the receptacle 1006 and into an area of the surface 1003T within the through-hole 1016. This is to avoid the adhesive from interfering with the circular nozzle assembly 1004. After an alignment process to position the receptacle around the flow channel in the cuvette, the adhesive 1005 is allowed to dry and hold the receptacle 1006 and the cuvette 406 coupled together as the cuvette assembly 406'.

Referring now to FIGS. 11A-11D, various views of the circular nozzle assembly 1004 are shown. The circular nozzle assembly 1004 includes a nozzle body 1008 and the o-ring gasket 1007.

The nozzle body 1008 is a three-dimensional solid body with the flow channel 1010, the open cylindrical chamber 1012, and the ring-shaped opening 1008R. The exterior side of the nozzle body 1008 has a cylindrical portion 1008C with a circular cylindrical shape and a tapered conical portion 1008T with a truncated cone (frustrum) shape. The exterior of the nozzle body 1008 further has a top surface 1008S, and a bottom or base surface 1008B. The nozzle body 1008 material is carefully selected and manufactured (machined/lapped) so that a plurality of circular nozzle assemblies 1004 are interchangeable and mount the same to each cuvette assembly 406' with the same flow channel alignment. The diameter of the flow channel 1010 can be varied to allow for the generation of different sized drops from different circular nozzle assemblies.

The nozzle body 1008 further includes the flow channel 1010 that begins at a tapered opening 1010T at the top surface 1008S and ends in the open cylindrical chamber 1012. The open cylindrical chamber 1012 is substantially a hollow circular cylinder including a beveled tapered ring portion 1012T, a center circular cylinder 1012C, and a beveled tapered ring portion 1012B in the base surface 1008B. The open cylindrical chamber 1012 has a larger diameter than the flow channel 1010 to allow a stream of drops to fall from the circular nozzle assembly 1004 without interference.

Figure 11A:
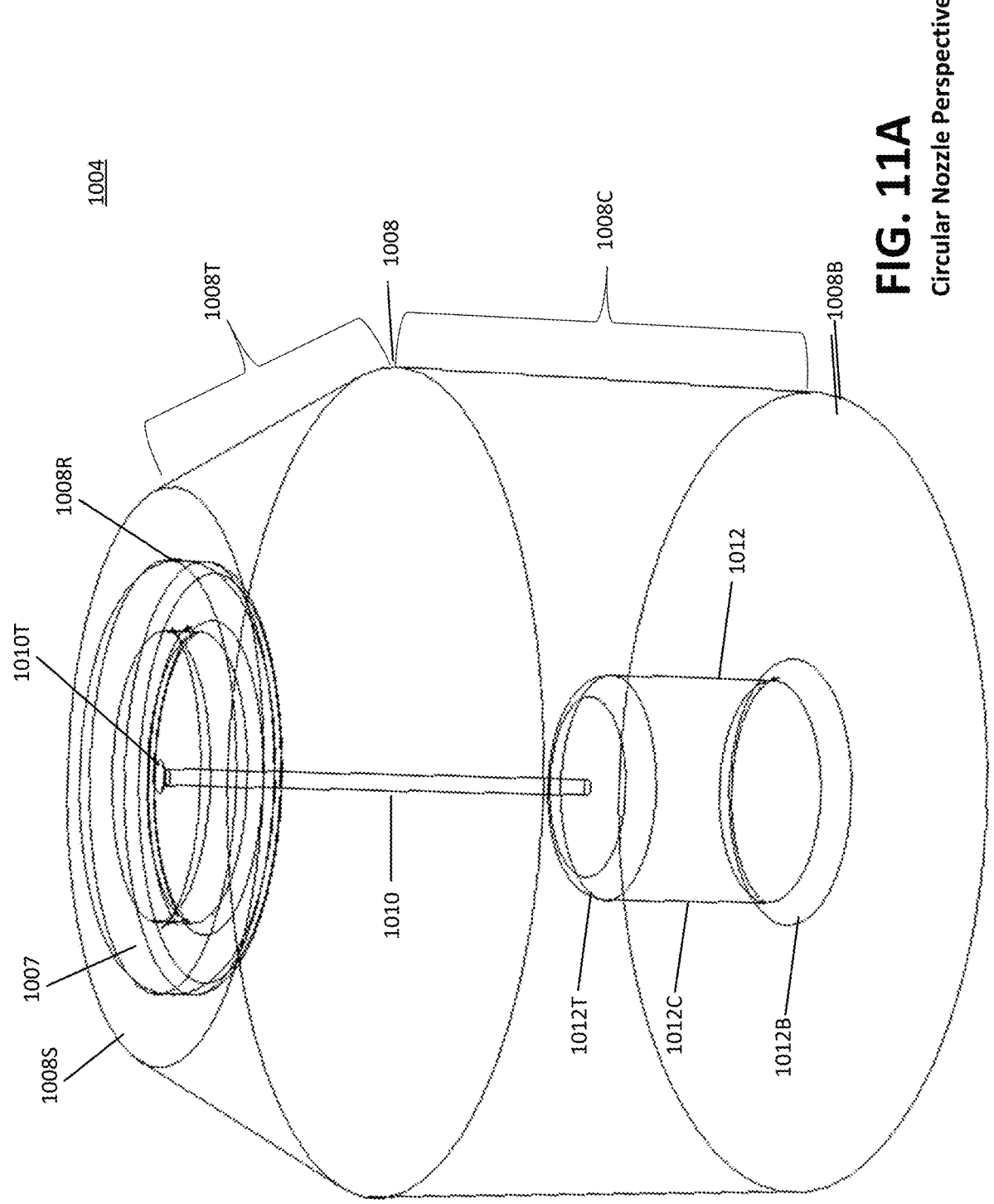
FIG. 11A is a perspective view of the circular nozzle assembly.
Figure 11B:
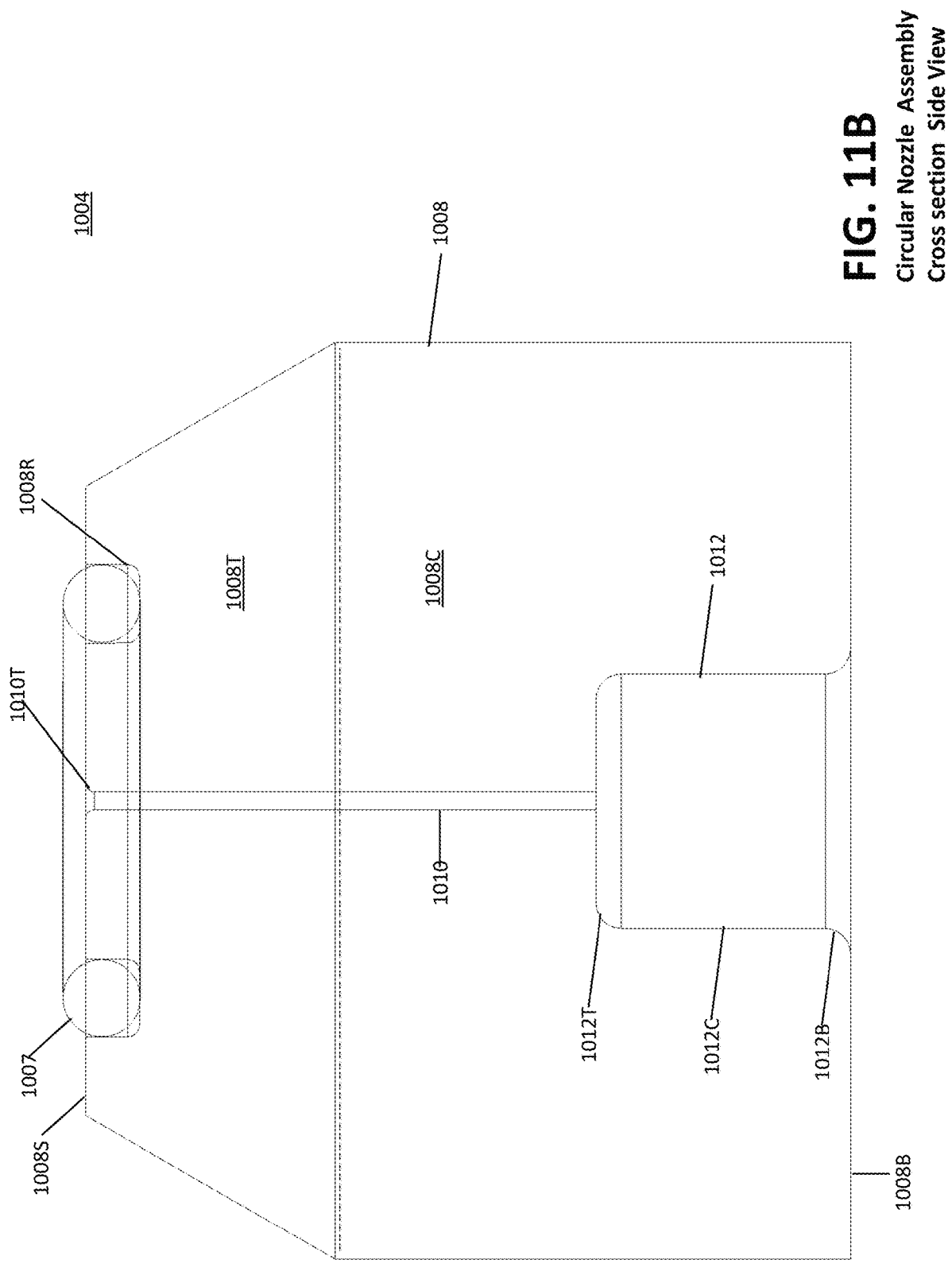
FIG. 11B is a cross sectional view of the circular nozzle assembly.
Figure 11C:
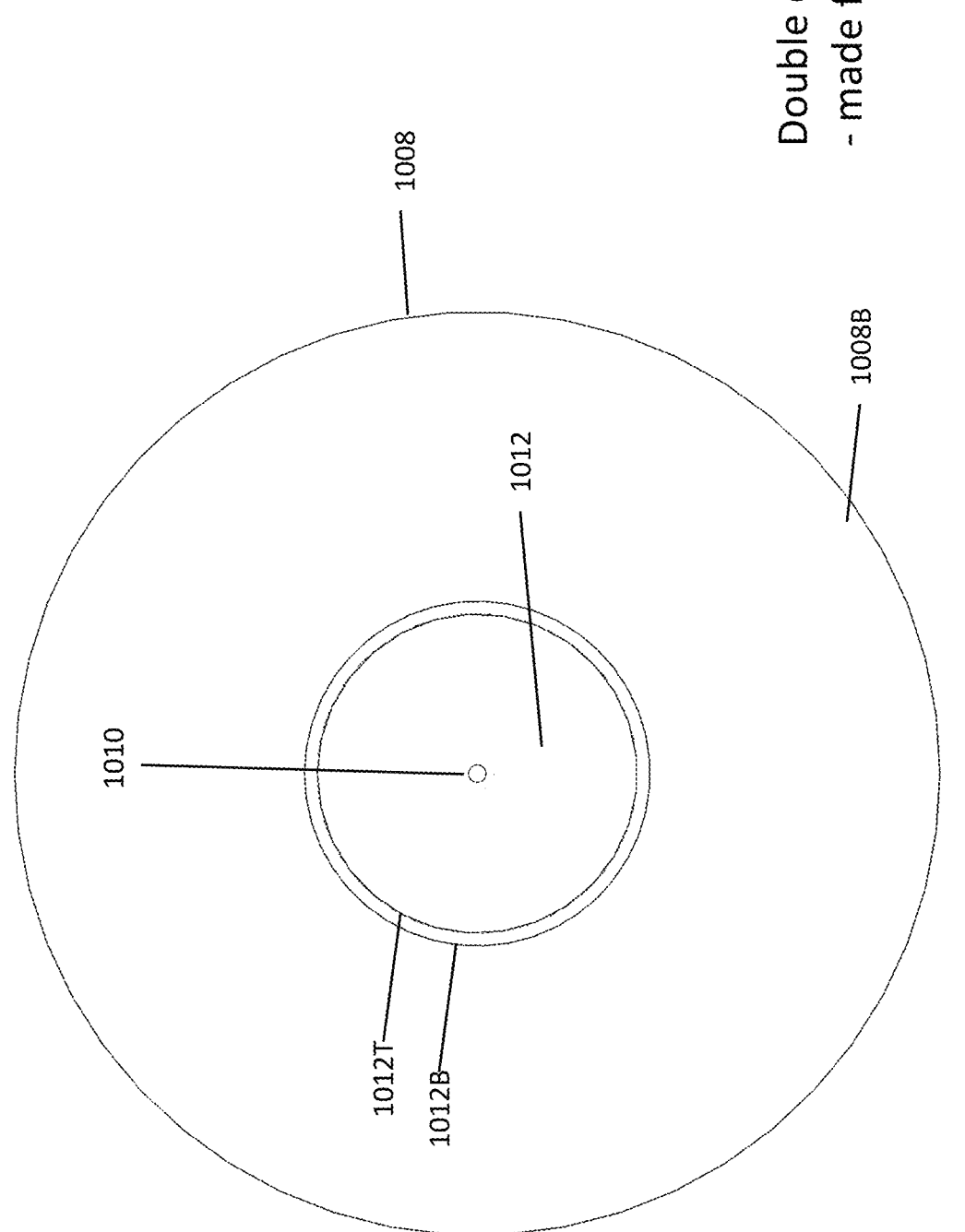
FIG. 11C is a bottom view of the circular nozzle assembly.
Figure 11D:
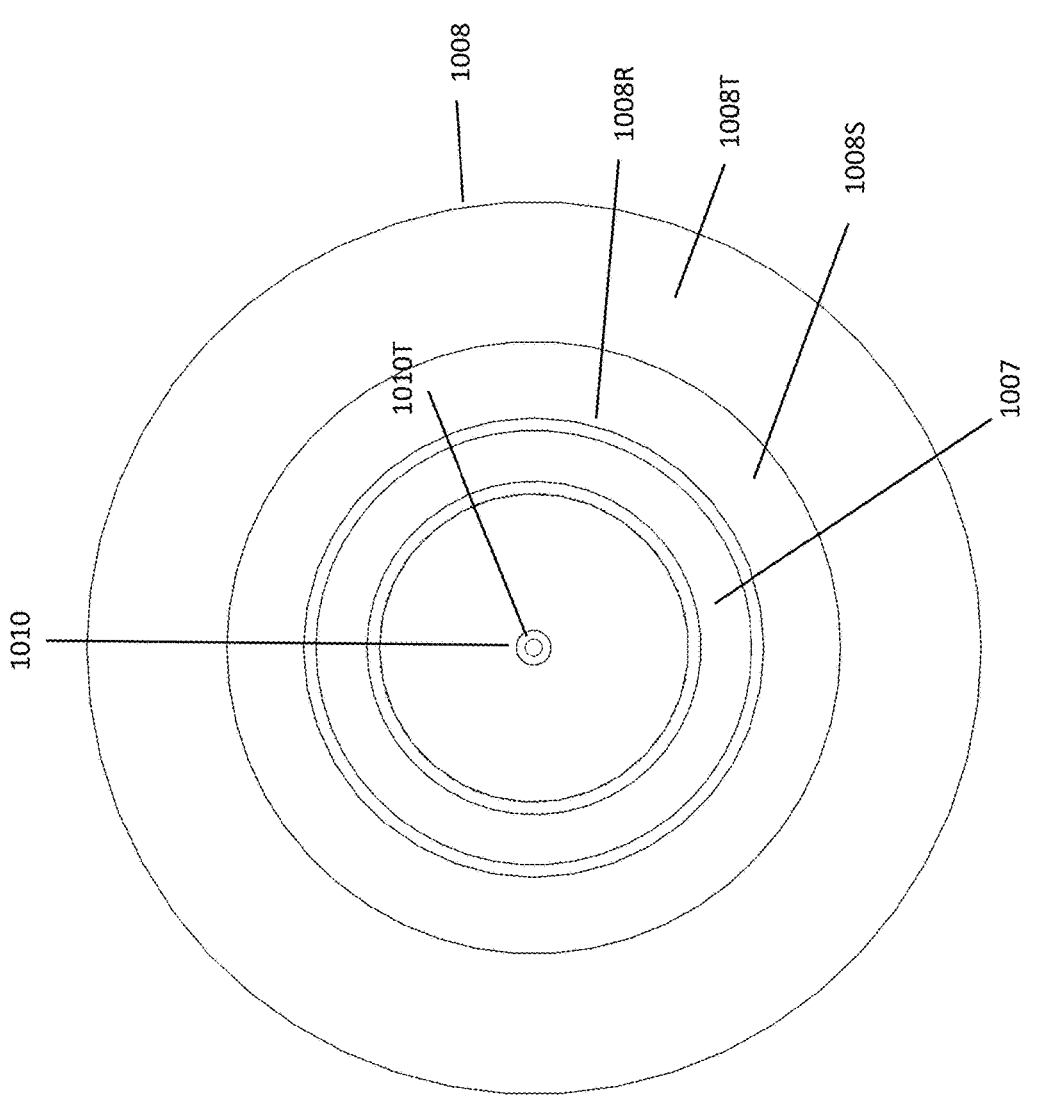
FIG. 11D is a top view of the circular nozzle assembly.
Figure 12A:
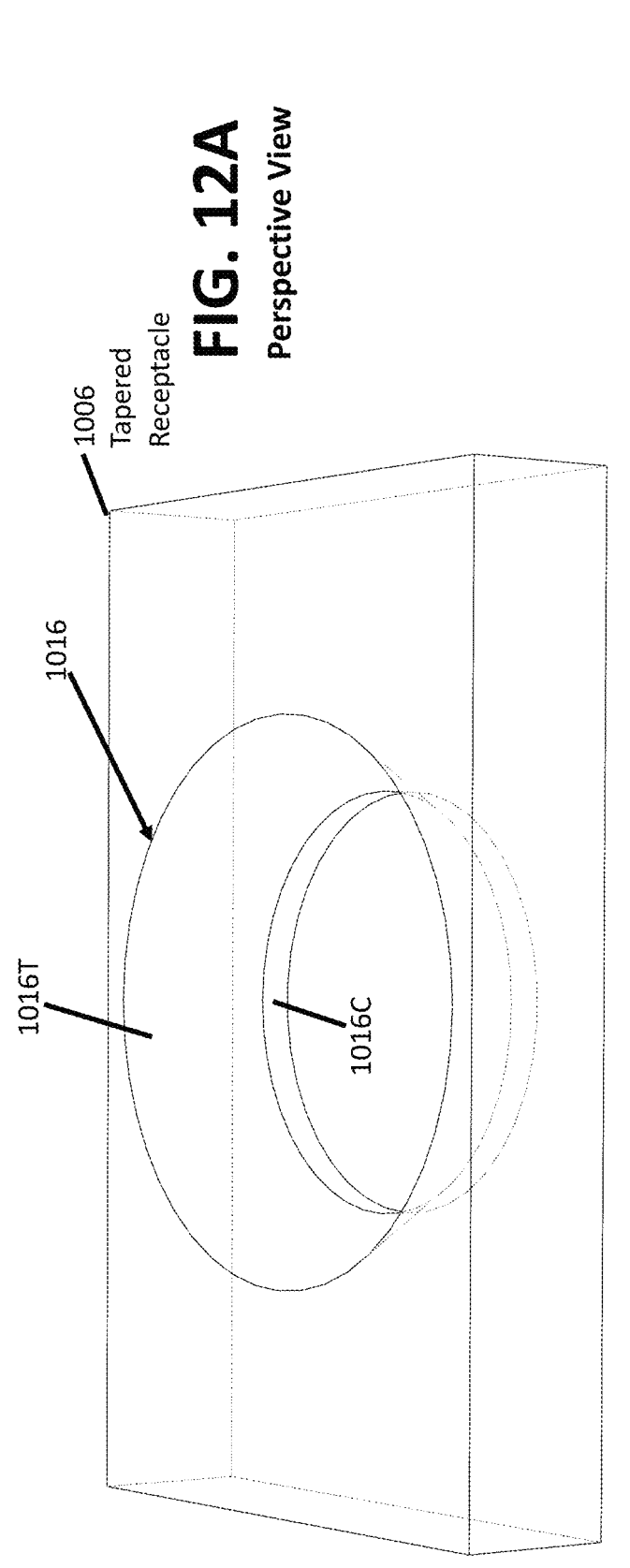
FIG. 12A is a perspective view from the top of the tapered conical receptacle.
Figure 12B:
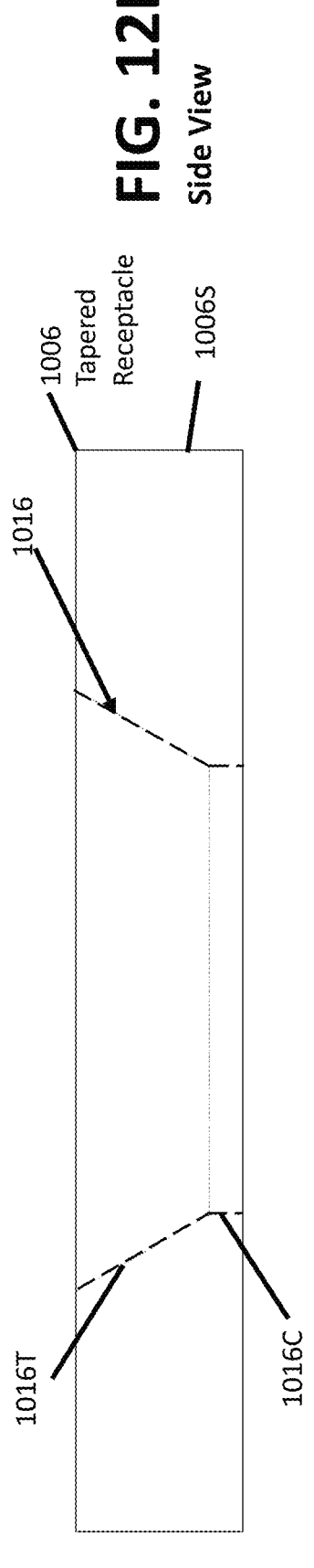
FIG. 12B is a side view of the tapered conical receptacle.
Figures 12C, 12D:
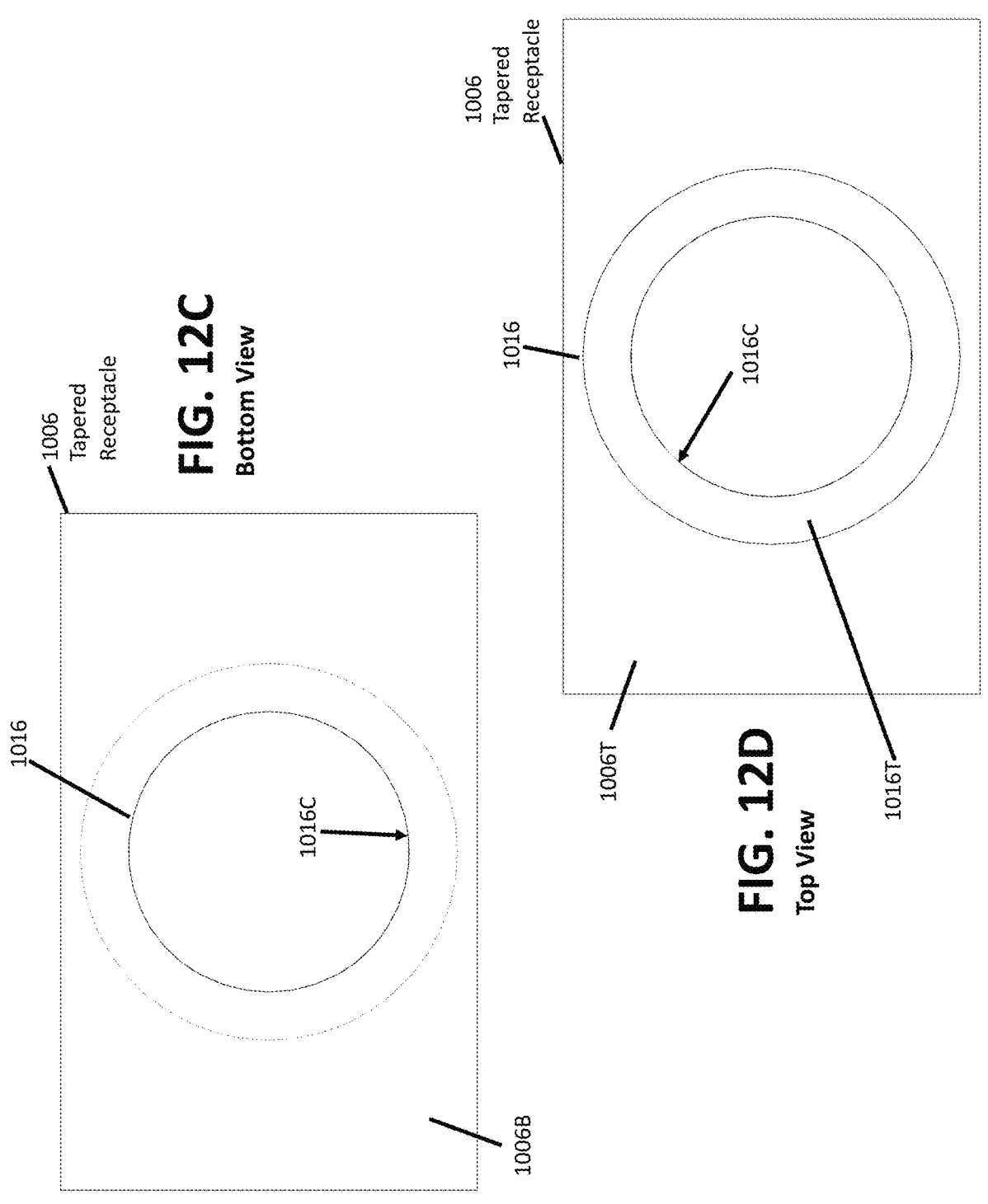
FIG. 12C is a bottom view of the tapered conical receptacle.
FIG. 12D is a top view of the tapered conical receptacle.

The top surface 1008S has a U-shaped or semicircular shaped ring 1008R to receive a lower portion of the o-ring gasket 1007. An upper portion of the o-ring gasket 1007 extends above the top surface 1008S as best shown in FIG. 11B. The o-ring gasket 1007 can be a silicon gasket or rubber gasket formed out of silicon or rubber in the shape of an o-ring.

Referring now to FIGS. 12A-12D, various views of the tapered conical receptacle 1006 are shown. The tapered conical receptacle 1006 is a three-dimensional solid body with a through-hole 1016. The exterior of the receptacle 1006 has a rectangular or cuboid shape. The through-hole 1016 has a hollow tapered conical (hollow truncated cone) portion 1016T merged or joined to a hollow cylindrical portion 1016C. The hollow cylindrical portion 1016C of the through-hole 1016 allows the o-ring gasket 1007 in the nozzle to be pressed against the top surface 1003T of the cuvette 406. The hollow cylindrical portion 1016C further helps prevent adhesive from interfering with the engagement between the circular nozzle assembly and the cuvette assembly when receptacle and cuvette are coupled together. The hollow tapered conical portion 1016T in the receptacle interfaces with the tapered conical portion 1008T of the circular nozzle assembly 1004 to self-align the flow channels together when the mount moves the circular nozzle assembly up into the cuvette assembly 406'.

Figure 13:
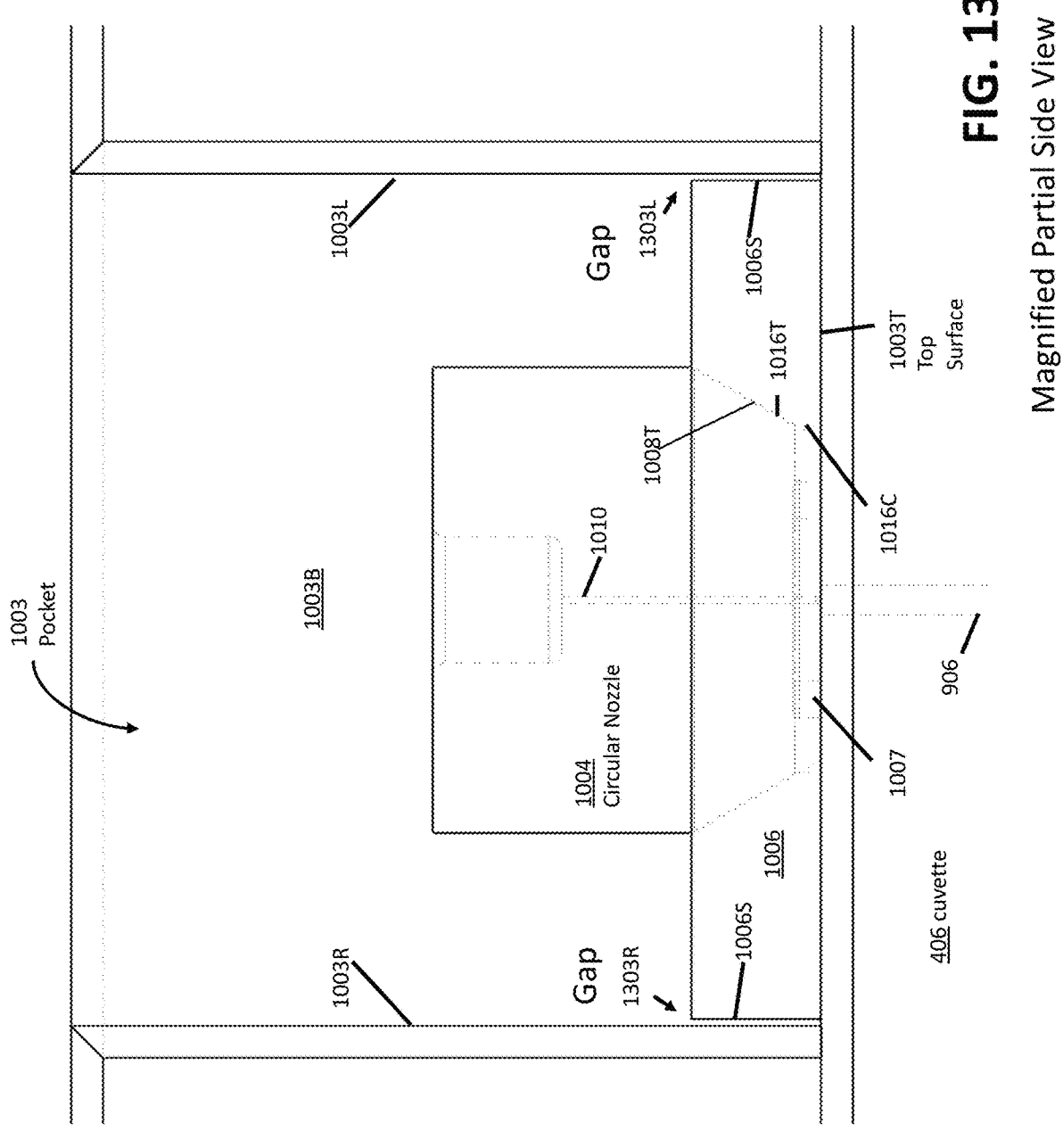
FIG. 13 is a magnified side and upside-down view of the cuvette nozzle assembly with the circular nozzle assembly engaged with the tapered receptacle of the cuvette subassembly.
Figure 16A:
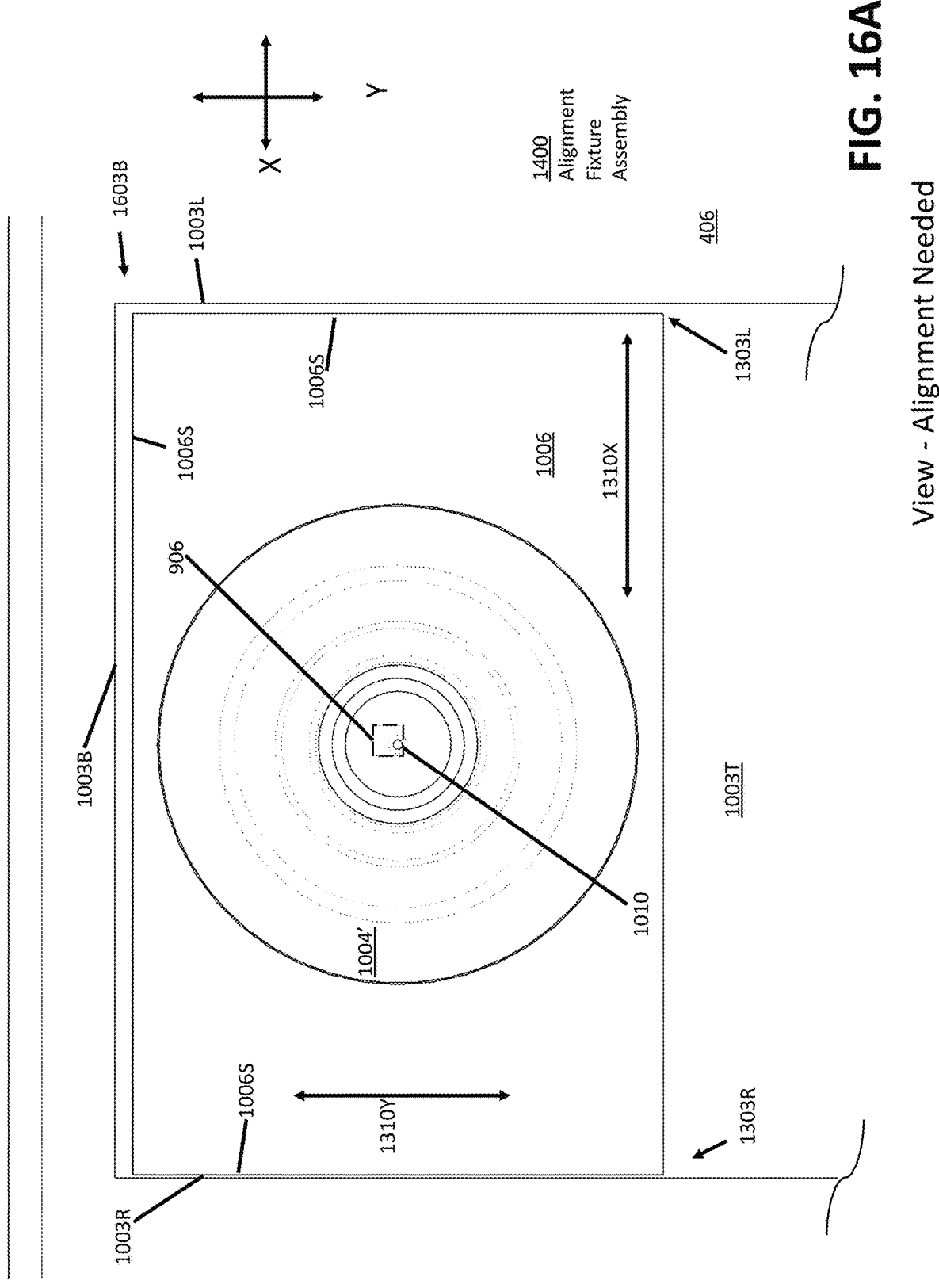
FIG. 16A is a magnified bottom view of the pocket of the cuvette subassembly showing misalignment between flow channels in the circular nozzle and the cuvette.
Figure 16B:
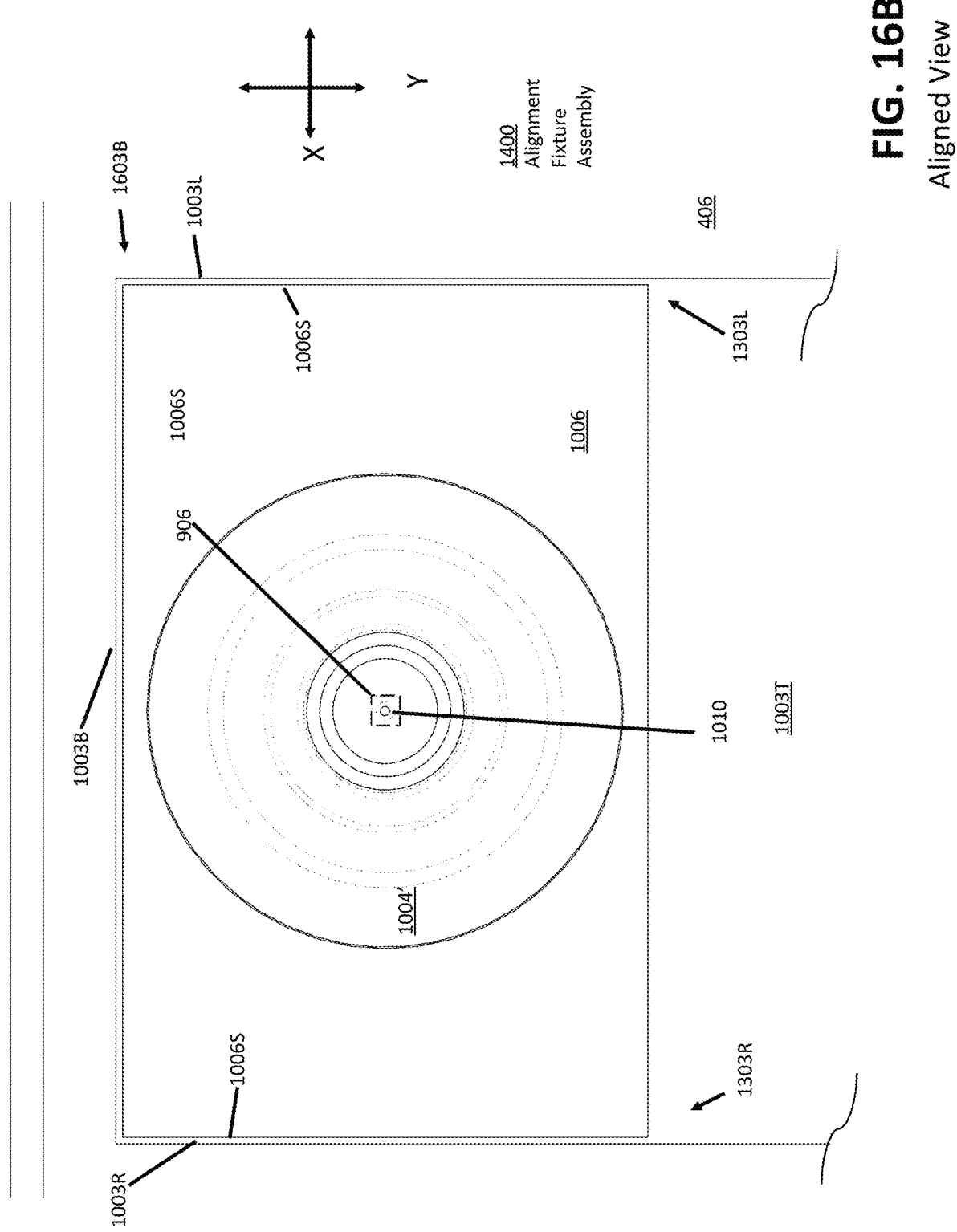
FIG. 16B is a magnified bottom view of the pocket of the cuvette subassembly showing proper alignment between flow channels in the circular nozzle and the cuvette.

FIG. 13 illustrates a magnified side view of the center portion of the cuvette-nozzle assembly 1000. The size of the tapered conical receptacle 1006 leaves gaps 1303R, 1303L between the sidewalls 1003R, 1003L in the pocket of the cuvette 406 and left/right sides 1006S of the receptacle. This is so the receptacle 1006 can be adjusted left or right within the pocket 1003 to align the flow channels 906, 1006 together during initial calibration of the cuvette assembly. As shown in FIGS. 16A-16B, the size of the tapered conical receptacle 1006 is further chosen to leave a gap 1603B between the back side surface (wall) 1003B of the pocket and the back side 1006S of the receptacle for similar reasons. The gap 1603B allows the receptacle 1006 to be adjusted front to back within the pocket 1003 to align the flow channels together during initial calibration of the cuvette assembly.

Figure 14A:
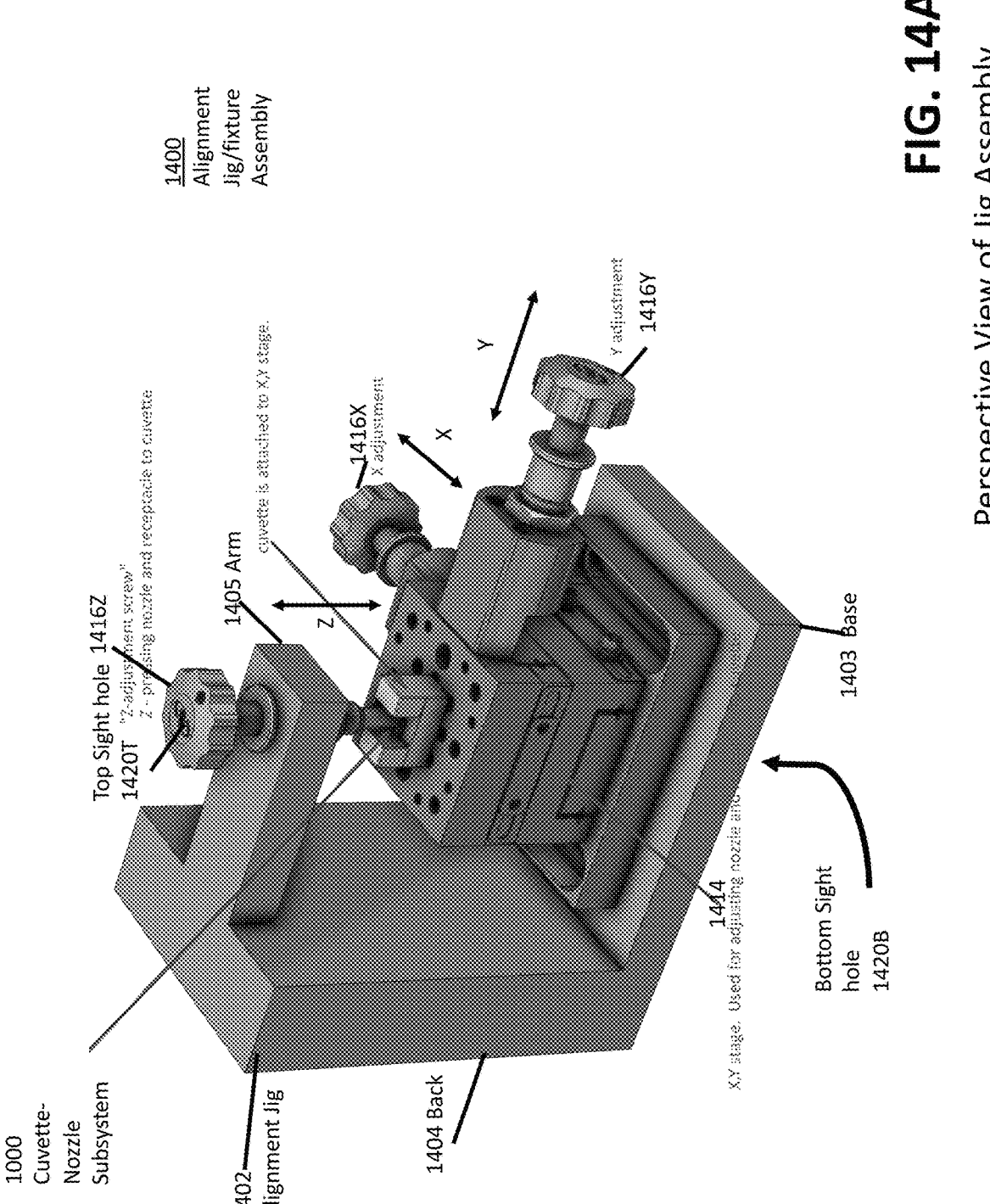
FIGS. 14A-14B are perspective views of the alignment fixture assembly including an alignment jig (fixture) to align and affix the tapered conical receptacle to the cuvette to form the cuvette subassembly.
Figure 14B:
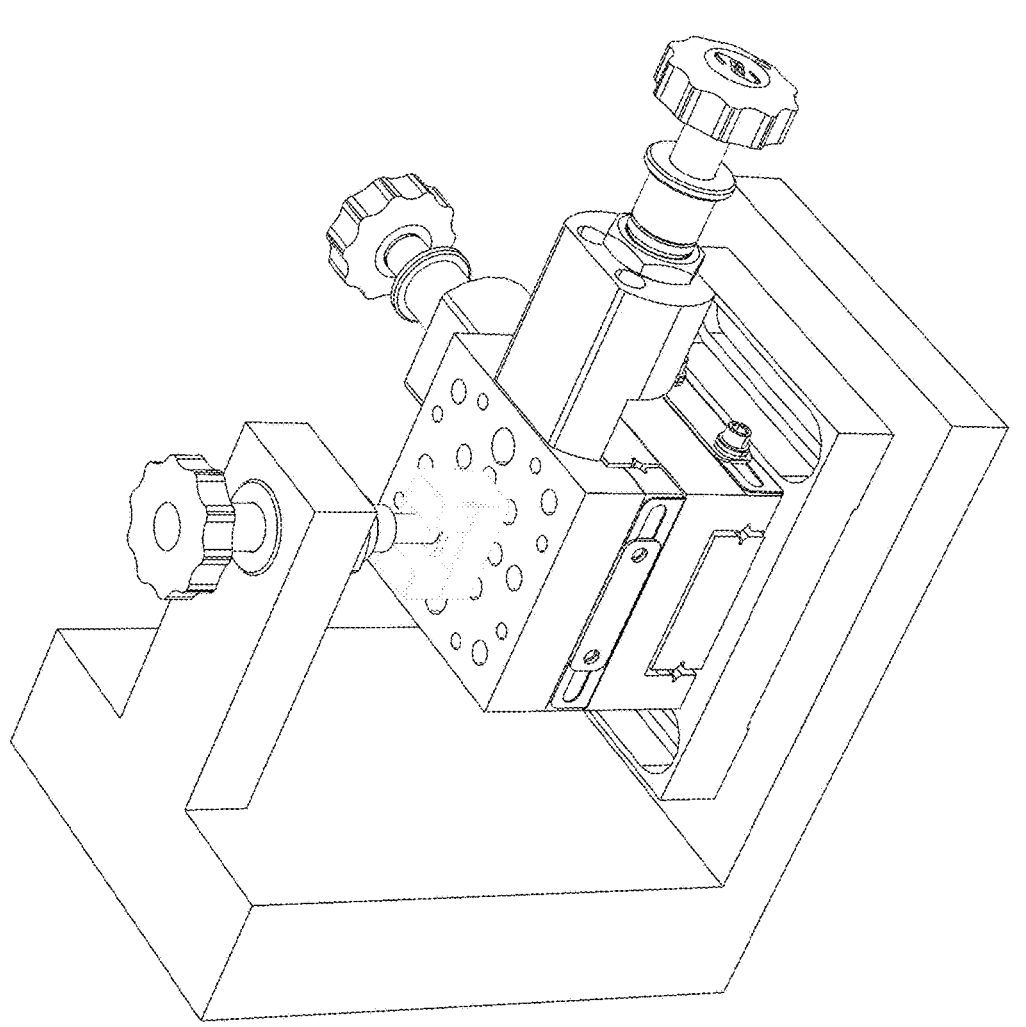

FIGS. 14A-14B illustrate an alignment jig (fixture) 1402 that can be used to align the flow channels 906, 1006 together and couple the tapered conical receptacle 1006 to the cuvette 406 in the pocket. The cuvette-nozzle subsystem 1000 mounted in the fixture 1402 forms an alignment fixture assembly 1400.

The alignment jig (fixture) 1402 includes a frame of a base 1403, a back 1404, and an arm 1405; and an X-Y adjustable stage 1414. The alignment jig (fixture) 1402 further includes a Z adjustment screw 1416Z threaded through the arm 1405. The X-Y adjustable stage 1414 is mounted to the base 1403 under the Z adjustment screw 1416Z. The X-Y adjustable stage 1414 includes an X adjustment screw 1416X and Y adjustment screw 1416Y to move the stage in the X-Y plane.

The Z adjustment screw 1416Z has a top sight hole 1420T with a sight channel to see down through a flow channel in a test circular nozzle to the top surface of the cuvette and its flow channel. A light may be shined up through a bottom sight hole 1420B and sight channel in the base and the X-Y adjustable stage 1414 into the flow channel of the cuvette 406. Optionally, a light may be shined down through the top sight hole 1420T, the sight channel, and through the flow channel in the test circular nozzle so that it is viewed through the bottom sight hole 1420B and its sight channel. That is, the alignment between flow channels at the interface between the cuvette and the circular nozzle can be viewed through either the top sight hole 1420T or the bottom sight hole 1420B.

Figure 14C:
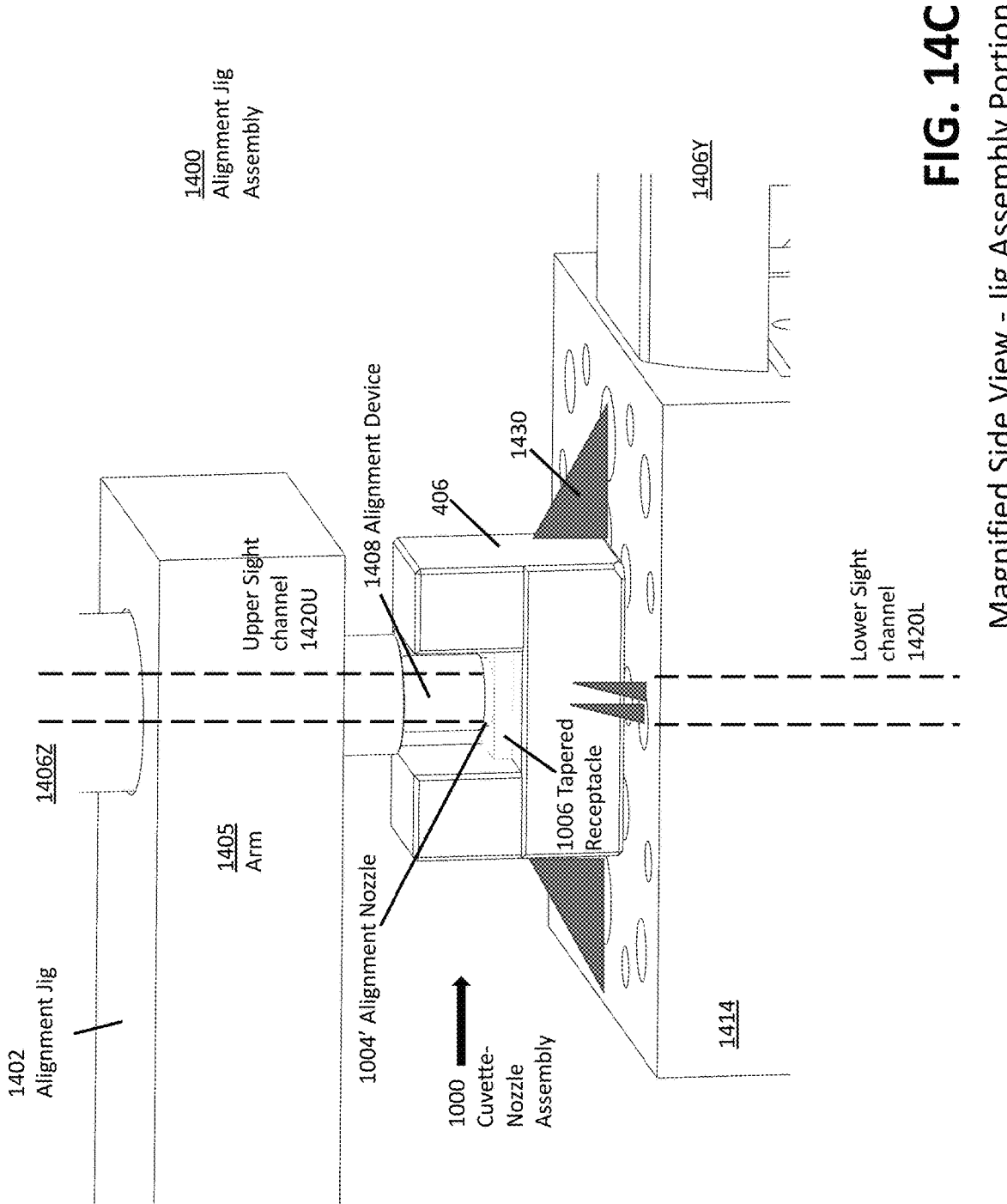
FIG. 14C is a magnified side view of the alignment jig (fixture) and the cuvette subassembly.

FIG. 14C illustrates a magnified side view of a portion of the alignment jig assembly 1400 with the cuvette 406 mounted to the stage 1414 by one or more clamps 1430. An alignment device 1408 of the Z screw 1406Z interfaces with a circular test or alignment nozzle 1004'. The circular alignment nozzle 1004' is substantially similar to the circular nozzle 1004 but without an o-ring gasket or seal. The alignment nozzle 1004' can be used over and over again with the alignment jig 1402 for each cuvette and receptacle that are to be coupled together and have their alignment set.

An upper sight channel 1420U is open from the top sight hole 1420T through the Z screw 1406Z, and the alignment device 1408 to view the alignment nozzle 1004'. This provides a view down the flow channel 1010 in the alignment nozzle 1004' and into the surface of the cuvette 406 and its respective flow channel. A lower sight channel 1420L is open from the bottom sight hole 1420B in and through the base 1403, and the stage 1414 to view the top of the cuvette 406. With the cuvette being transparent, a view through the cuvette to the top surface of the alignment nozzle 1004' and the respective flow channels in each can be seen.

The views from the bottom up or the top down to the interface allows either or both the X adjustment screw 1416X and Y adjustment screw 1416Y to be turned to move the X-Y adjustable stage 1414 and align the flow channels in the cuvette and the circular nozzle together if they are misaligned. A push rod 1406Y is associated with the Y adjustment screw 1416Y to move the X-Y adjustable stage 1414 in the Y direction. A similar push rod is associated with the X adjustment screw 1416X to move the X-Y adjustable stage 1414 in the X direction.

Before the adhesive 1005 between the receptacle 1006 and the cuvette 406 dries, the X-Y adjustable stage 1414 moves the cuvette 406 to readjust the position of the test nozzle and receptacle 1006 in the pocket 1003. This readjustment can align the flow channels together if they are misaligned.

Figure 15:
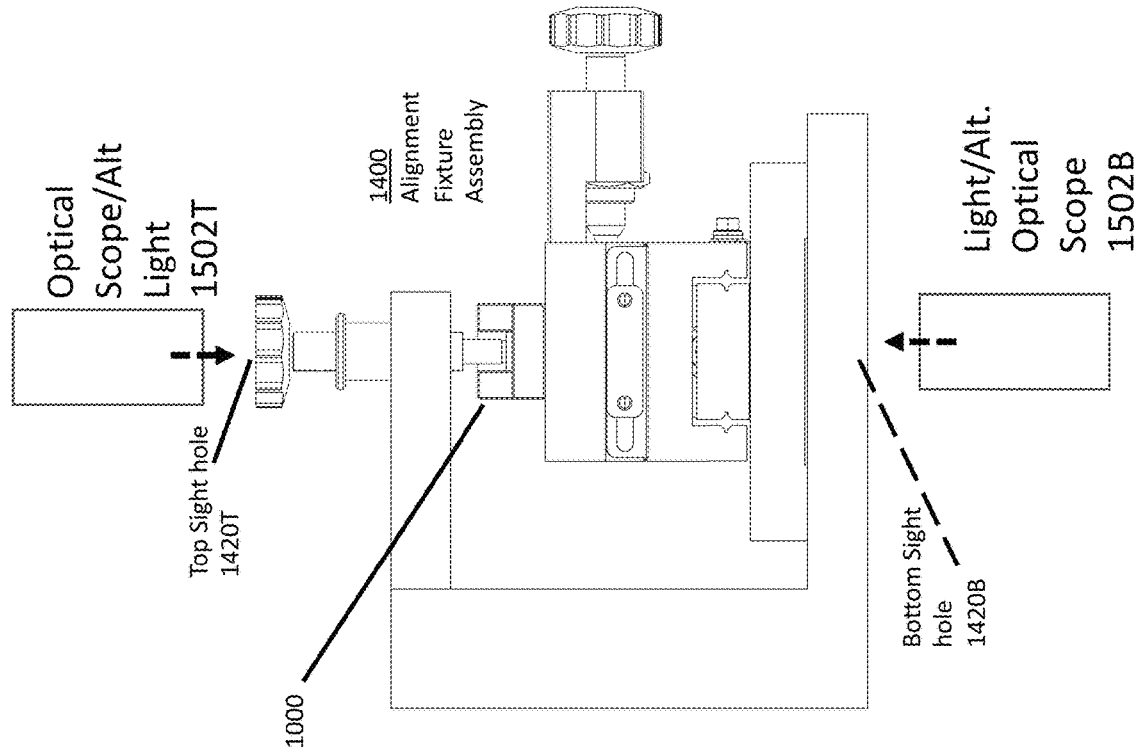
FIG. 15 is a side view of the overall alignment system to align and affix the tapered conical receptacle to the cuvette to form the cuvette subassembly.

Referring now to FIG. 15, one or more optical devices can be used to aid viewing the interface the cuvette-nozzle assembly 1000 in the alignment fixture assembly 1400. A first optical device 1502T can be used to view the interface of the cuvette-nozzle assembly down though the top sight hole 1420T and the upper sight channel 1420U. In one embodiment, the first optical device 1502T is an optical microscope or microscope camera to view the interface from above. Optionally, a second optical device 1502B can be used below the bottom sight hole 1420B, to assist the first optical device 1502T. In one embodiment, the optional second optical device 1502B is a lamp to shine light up through the bottom sight hole 1420B and the lower sight channel 1420L. Alternatively, the lamp can be a laser to provide a laser light. In another embodiment, the second optical device 1502B is an optical microscope or microscope camera to view the interface from below while the first optical device 1502T is a lamp to shine light down through the top sight hole 1420T and the upper sight channel 1420U. Alternatively, the lamp can be a laser to provide a laser light.

Referring now to FIG. 16A, a view of the interface between receptacle 1006/alignment nozzle 1004' and the cuvette 406 in the alignment fixture assembly. The flow channel 906 in the cuvette 406 is visibly distinguishable from the flow channel 1010 in the alignment nozzle 1004' with the aid of a microscope magnifying the view. A standard zoomable lab microscope can be used to view up into the fixture and cuvette from below the fixture. In one embodiment, the flow channel 906 in the cuvette has a square or rectangular cross section and the flow channel 1010 in the circular nozzle has a circular or oval cross section. The diameter or cross-sectional size of the flow channel 1010 in the nozzle is smaller than the sides or cross-sectional size of the flow channel 906 in the cuvette. The side view of FIG. 13 better shows the difference in the dimensions of the flow channels 906 and 1010. The cuvette being transparent allows for visibility of surfaces of the nozzle/receptacle, the flow channel 1010, and an outline of the flow channel 906 with respect to the flow channel 1010 in the nozzle 1004', from below the alignment fixture assembly through the cuvette. A light from above and/or below can be used in this case to aid in view the nozzle. If a light (e.g., a narrow laser light) is shined through the flow channel 1010 from above or through the flow channel 906 from below, a microscope or some other optical sensor can look into the other flow channel of from below or above the fixture to detect the positions of the respective flow channels to facilitate alignment. Regardless, an optical alignment process is used to align the centers (axes) of the flow channels 906, 1010 together.

FIGS. 16A-16B show views through the cuvette 406 from below the fixture into the circular nozzle. As shown in FIG. 16A, the flow channel 906 in the cuvette 406 is misaligned with the flow channel 1010 in the circular alignment nozzle 1004'. The cuvette 406 is mounted to the stage that can be adjusted under the receptacle 1006/alignment nozzle 1004' in either the X direction 1310X and/or the Y direction 1310Y in order to align the flow channels 906, 1010 together. The gaps 1303R, 1303L, 1303B between sides 1006S and the walls (side surfaces) 1003R, 1003B, 1003L of the cuvette 406 allow for the receptacle 1006/alignment nozzle 1004' to be adjusted in the X and/or Y directions with respect to the cuvette 406.

FIG. 16B illustrates another view of the interface between receptacle 1006/alignment nozzle 1004' and the cuvette 406 in the alignment fixture assembly. After the adjustments in the position of the cuvette 406 with respect to the receptacle 1006/alignment nozzle 1004', the flow channel 906 in the cuvette 406 is aligned with the flow channel 1010 in the alignment nozzle 1004'. This position can be held while the adhesive 1005 is allowed to dry and hold the receptacle 1006 in a fixed position to the surface 1003T of the cuvette 406 within the pocket 1003.

Figure 17A:
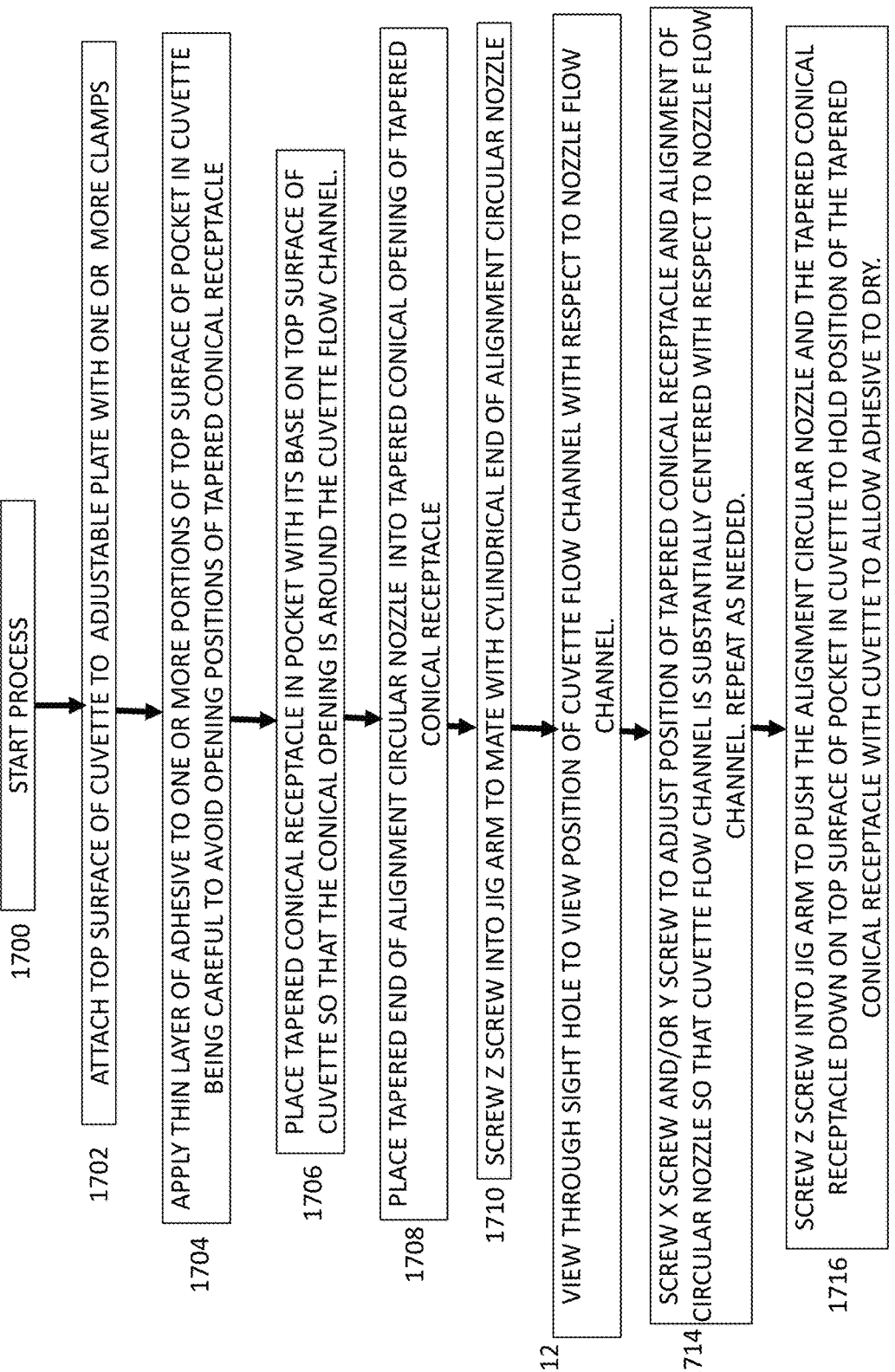

Referring now to FIGS. 17A-17B, steps of an alignment process for mounting and affixing the tapered receptacle to the surface 1003T of the cuvette 406 in the pocket 1003 are shown. This alignment process aligns the flow channels in cuvette and circular nozzle together. The alignment process starts with step 1700 and then goes to step 1702.

At step 1702, the top surface of cuvette is attached to x-y adjustable stage 1414 of alignment fixture (jig) 1404 with one or more clamps 1430 shown in FIG. 14C.

At step 1704, one or more drops (e.g., 4 drops near corners of receptacle are to be placed) of adhesive can be applied to one or more portions of top surface 1003T of pocket 1003 in the cuvette 406 to eventually form the thin layer of adhesive 1005 between cuvette and receptacle. Care is taken to avoid getting the glue moving over the surface 1003T into an area where the through-hole of the tapered conical receptacle 1006 is to be positioned. The thin layer of adhesive can be evenly applied to the surface 1003T of the cuvette, avoiding a circular area around the flow channel in the cuvette that is open through the through-hole of the receptacle.

At step 1706, the tapered conical receptacle 1006 is placed in pocket 1003 with its base on the thin layer of adhesive or epoxy 1005 over the top surface 1003T of the cuvette 406 so that the through-hole with the tapered conical opening is around the cuvette flow channel.

At step 1708, a tapered portion 1008T of the circular alignment nozzle 1004' is placed into the hollow tapered conical portion of the though-hole 1016 of tapered conical receptacle 1006. In the alignment process with the alignment nozzle 1004', the o-ring gasket does not touch the surface 1003T of the cuvette 406. In operation with the circular nozzle 1004, top surface portions of the o-ring gasket 1007 can touch the surface 1003T of the cuvette 406.

At step 1710, the adjustable Z screw 1416Z is screwed into jig arm 1405 to mate with bottom cylindrical end of circular alignment nozzle 1004'.

At step 1712, through the sight hole 1420B, 1420U and a respective sight channel, a user views the positions of cuvette flow channel 906 in the cuvette with respect to nozzle flow channel 1010 in the circular alignment nozzle 1004'.

At step 1714, the X screw 1416X and/or the Y screw 1416Y are screwed in or out to adjust position of tapered conical receptacle 1006 and circular alignment nozzle 1004' so that cuvette flow channel is substantially centered (e.g., +/−2 mm) with respect to nozzle flow channel. This step is repeated as needed.

At step 1716, the Z screw 1416Z is further screwed into jig arm to push the circular alignment nozzle 1004' and the tapered conical receptacle 1006 further down on the surface 1003T of the cuvette 406 in the pocket 1003 in cuvette 406. This is to apply pressure, squeezing and holding the position of the tapered conical receptacle 1006 with respect to the cuvette 406 in order to allow the adhesive 1005 to dry and couple the receptacle 1006 and the cuvette 406 together.

At step 1718, the position of the tapered conical receptacle 1006 is held in place by the jig (fixture) over a predetermined period of time (a waiting, curing, or drying time period, e.g., at least 30 minutes) to allow the adhesive 1005 between the tapered conical receptacle 1006 and the cuvette 406 to dry.

At step 1720, after the drying period, the Z screw 1416Z is unscrewed to release pressure that is squeezing the circular alignment nozzle 1004', the tapered conical receptacle 1006, and the cuvette 406 together. The Z screw 1416Z is unscrewed to allow the screw to lift up away from the cuvette assembly so that it can be removed from the top surface of the x-y adjustable stage 1414.

At step 1722, the one or more (or plurality of) clamps 1430, holding cuvette 406 to top surface of x-y adjustable stage 1414, are released.

At step 1724, the cuvette assembly of the cuvette 406 and tapered conical receptacle 1006 are pulled away from the x-y adjustable stage 1414.

At step 1726, the cuvette assembly of the cuvette 406 and tapered conical receptacle 1006 are assembled into a flow cytometer.

At step 1728, a circular nozzle assembly 1004, having the nozzle body and the o-ring, are assembled into the flow cytometer.

At step 1730, with reference to FIGS. 10A-10D, the circular nozzle assembly 1004 is engaged with the cuvette assembly, including the tapered conical receptacle 1006 and the cuvette 406, in the flow cytometer. The nozzle assembly is moved up into the tapered conical receptacle so that O-ring engages the top surface of the cuvette within the conical opening. This allows the respective flow channels 906, 1010 in the cuvette and circular nozzle assembly 1004 to align and the o-ring 1007 to seal between them around the respective flow channels to deter fluid leakage. Fluids with particles can then be run through the flow cytometer and the flow channels 906, 1010 in the circular nozzle assembly and the cuvette. The circular nozzle assembly is moved up (elevated) into the tapered conical receptacle so that O-ring engages a top surface 1003T in the pocket 1003 of the cuvette 406 and the respective tapered conical surfaces 1016, 1008T in the receptacle 1006 and nozzle body 1008 meet.

At step 1732, the circular nozzle assembly 1004 is disengaged from the cuvette assembly 406', including o-ring from the surface 1003T and the tapered conical surface 1008T from the tapered conical surface 1016T of the receptacle 1006. This allows the circular nozzle assembly

1004 to be removed from the flow cytometer and replaced with a different circular nozzle assembly and/or its flow channel 1010 cleaned to remove a clog.

At step 1734, assuming the flow channel was clogged, the flow channel 1010 in the circular nozzle assembly 1004 is cleaned and/or the O-ring 1007 replaced.

At step 1736, after the cleaning, the circular nozzle assembly 1004 can be re-engaged with the flow cytometer. The circular nozzle assembly 1004 is moved up into the cuvette assembly 406' including the tapered conical receptacle 1006 and cuvette 406. The flow channels are aligned together and the o-ring seals between a top surface of the nozzle body and a surface 1003T of the cuvette to run fluids with particles through the flow cytometer for examination (analysis) purposes. After examination is completed, the process steps of 1732 through 1736 can be repeated for other sample fluids with particles or the process can go to step 1799 and end.

Drop Drive Assembly

The drop drive assembly 402 of the flow cell 124 are in communication with the sample input station 130 of the fluidics system to receive sample fluid. Tubing couples the flow cell and sample input station in communication together. Generally, the drop drive assembly 402 receives the sample fluid under pressure through the sample input port 408 at one end. At an opposite end, the drop drive assembly 402 forms a stream of sample fluid out of sample injection tube (SIT) 422. The lower portion of the drop drive assembly below the hub is inserted into the chamber of the flow cell body 404, such as can be seen in FIGS. 4D-4G.

The drop drive assembly 402, amongst other features, includes the sample input port 408, the sample injection tube (SIT) 422, and a hollow piezoelectric cylindrical transducer. The upper end of the SIT 422 is in communication with the sample input port 408 and the tubing to receive the flow of sample fluid. The sample injection tube (SIT) 422 injects the sample fluid into a funnel portion of a chamber in the flow cell body. The hollow piezoelectric cylindrical transducer is under software control selected by a user (amplitude and frequency) to facilitate formation of drops.

The hollow piezoelectric cylindrical transducer mounts around a portion of the SIT 422 when assembled together. Sample fluid with cells/particles flows within the hollow center cylinder of the SIT 422. When energized by an alternating current (AC) signal (amplitude and frequency selectable) from the electronics system, the hollow piezoelectric cylindrical transducer vibrates based on frequency and amplitude of the AC signal. The vibrations are coupled into the insulated cylindrical sealing base such that the sample fluid receives acoustical energy that can help convert the sample fluid into a stream of small drops spread out in a single file line out of the nozzle. Ideally, each drop has a single cell/particle, but cells/particles of interest can vary in size. The diameter of the opening in the nozzle, the sheath pressure, and fluid viscosity can vary the size of drops and their frequency of generation. For a given sheath fluid pressure, the AC signal frequency and amplitude can be set for resonance where droplet formation is stable and yields a desired drop size. The nozzle assembly can be readily swapped in and out to get a different diameter of nozzle opening.

Drop Quality

The nozzle, in the nozzle assembly of the flow cell, breaks up the sample fluid into droplets. In a cell sorter, the drops with cells of interest in a center stream are sorted out by deflecting drops away from the center stream. The drops are charged in the flow cell so they can be deflected away (sorted) from the center stream by charged deflecting plates in a deflection chamber (unit) 122. The deflected drops with cells of interest can be collected into separate vessels (test tubes, wells of plates) for further testing in a lab.

It is desirable that the stream of drops out of the nozzle containing a biological cell be of appropriate in shape. It is desirable that the period between drops be appropriate so each drop can be deflected and collected into separate vessels. Also, the break off time point of drops from a stream is desirable to control in the formation of drops and be consistent between nozzle removal, cleaning, and reinsertion. Accordingly, the shape of the drops and the period between drops can be important in a cell sorter system. The droplet yield out from the nozzle and the droplet shape quality in the stream of drops out of the nozzle are related to how well the nozzle engages (pairs) with the cuvette. It is desirable that the top surface of the nozzle and the bottom surface of the cuvette are co-planar, and the axes of flow channels are aligned to provide good droplet yield and a good quality of drop shape.

Figure 18A:
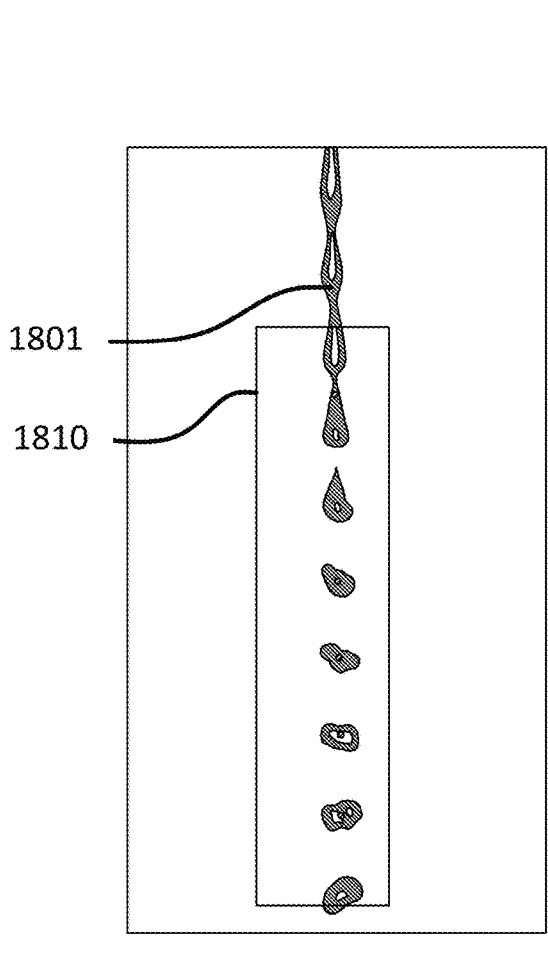
FIGS. 18A-18B are views of poor-quality drops released from a nozzle.
Figure 18B:
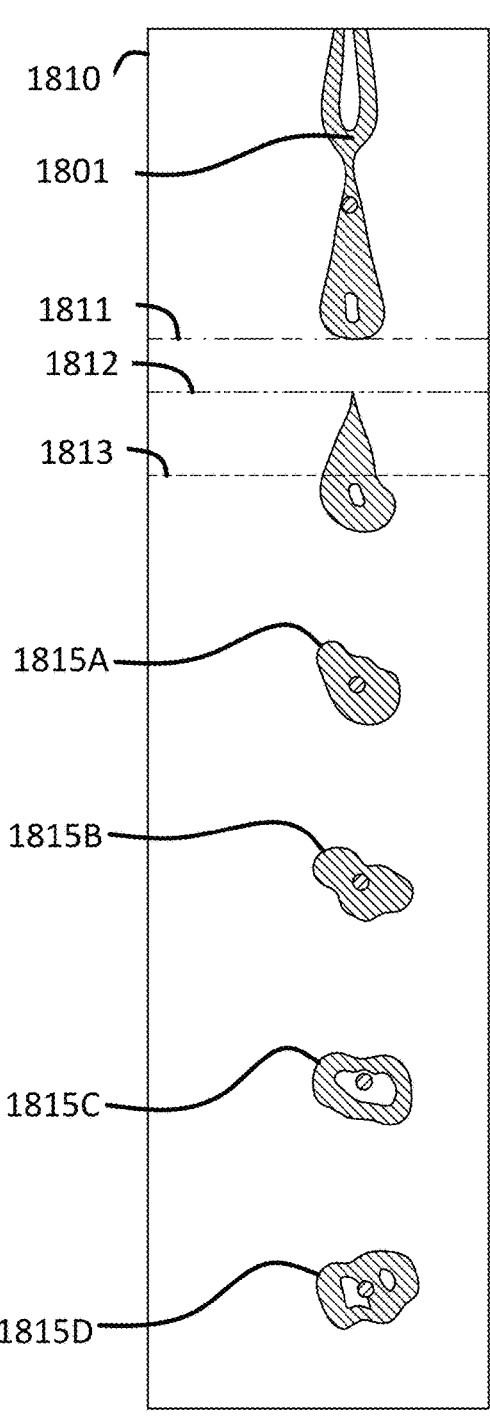
Figure 19A:
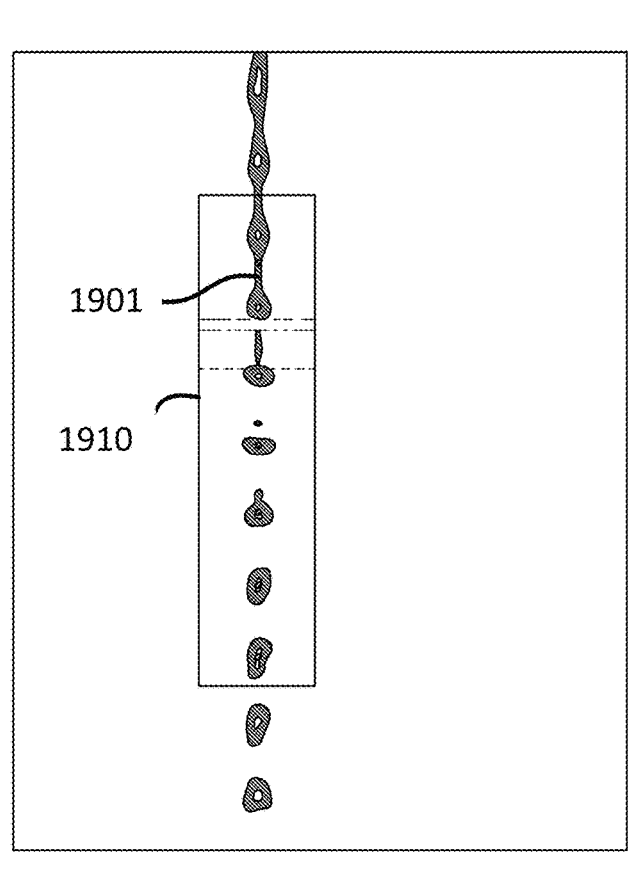
FIG. 19A-19B are views of good quality drops released from a nozzle.
Figure 19B:
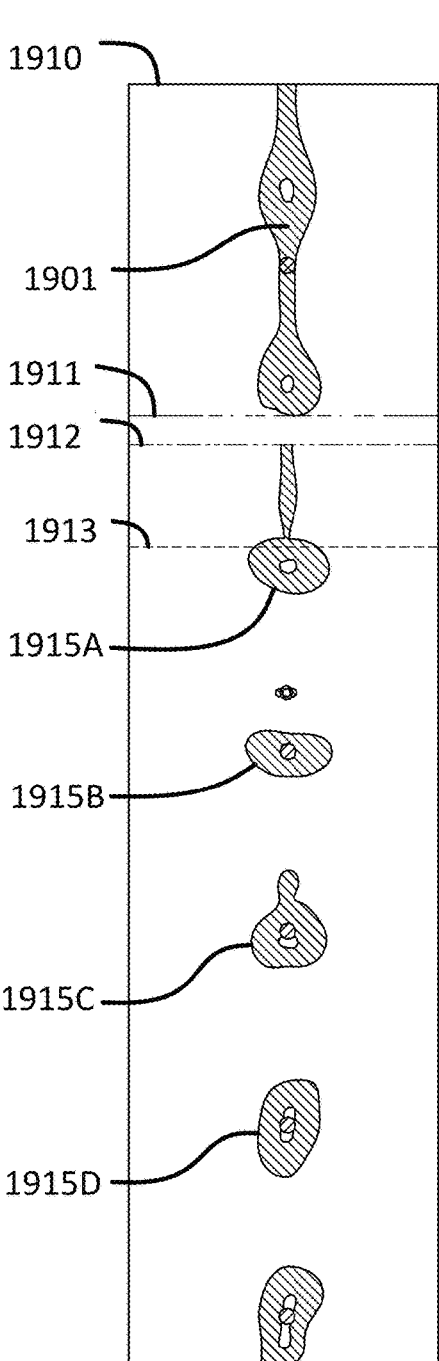

FIGS. 18A-18B illustrate magnified and unmagnified views of poor-quality drops released from a nozzle in a nozzle assembly engaged with a cuvette of a flow cytometer/ cell sorter under test. FIGS. 19A-19B illustrate magnified and unmagnified views of good quality drops released from a nozzle in a nozzle assembly engaged with a cuvette of a flow cytometer/cell sorter under test.

FIGS. 18A-18B illustrate views of a stream 1801 of poor quality drops out of the orifice (flow channels) of a nozzle. A section 1810 of the stream 1801 is magnified in FIG. 18B in order to take measurements of the quality of the drops. Lines 1811, 1812, and 1813 can be used to measure the drop delay, drop interval, drop center, and others to obtain an overall idea of the stream status. The drops 1815A-1815D are asymmetric, without a rounded drop shape. A poor engagement between the nozzle and the cuvette can cause such a poor drop quality. Nozzles that have good break off will show a symmetric well-rounded drop shape.

FIGS. 19A-19B illustrate views of a stream 1901 of good quality drops out of the orifice (flow channels) of a nozzle. A section 1910 of the stream 1901 is magnified in FIG. 19B in order to take measurements of the quality of the drops. Lines 1911, 1912, and 1913 can be used to measure the drop delay, drop interval, drop center, and others to obtain an overall idea of the stream status. The drops 1915A-1915D are symmetric. The drops have oval shapes that are well rounded. This indicates nozzles having a good break off and a good engagement between the nozzle and the cuvette to provide a good drop quality.

There are some stream controls that can be adjusted to improve poor drop quality so that it is acceptable, even with a poor engagement between the nozzle and cuvette. However, settings (e.g., higher amplitude and/or higher frequency of vibrations provided by a piezoelectric cylindrical transducer in the SIT) that may need to be set can overstress components in the flow cytometer/cell sorter and lead to premature failure that requires replacement or repair. It is desirable to provide a good mechanical engagement between the nozzle and the cuvette to provide a good drop quality at nominal settings to avoid overstress of the components and lower maintenance costs of the flow cytometer/cell sorter.

Advantages

There are a number of advantages to having a circular nozzle assembly in a flow cytometer and sorting flow cytometer (e.g., cell sorter 100). The circular nozzle assembly can be removed, cleaned, and replaced into a substantially similar position to provide a substantially similar drop quality from run to run after calibration to the nozzle.

There are a number of advantages to having the flow channels in the cuvette and nozzle be adjustable into alignment. A good alignment between the flow channels can lead to better drop quality. With better drop quality, drop settings can be more nominal within ranges. In the long run, the better drop quality can result in lower maintenance costs of a flow cytometer system or a cell sorter system.

This disclosure contemplates other embodiments or purposes. It will be appreciated that the embodiments can be practiced by other means than that of the described embodiments, which are presented in this description for purposes of illustration and not of limitation. The specification and drawings are not intended to limit the exclusionary scope of this patent document. It is noted that various equivalents for the particular embodiments discussed in this description may be practiced by the claimed invention as well. That is, while specific embodiments have been described, it is evident that many alternatives, modifications, permutations, and variations will become apparent in light of the foregoing description. For example, the threaded openings can have different dimensions in which case, the dimensions of the various threaded fasteners would differ than those described herein. Accordingly, it is intended that the claimed invention embrace all such alternatives, modifications and variations as fall within the scope of the appended claims. The fact that a product, process, or method exhibits differences from one or more of the described exemplary embodiments does not mean that the product or process is outside the scope (literal scope and/or other legally recognized scope) of the following claims.

What is claimed is:

1. A flow cytometer or cell sorter system, the system comprising:
   a flow cell coupled in communication with a fluidics system to receive a sheath fluid, wherein a sample fluid flows with cells or particles through the flow cell to be surrounded by the sheath fluid, the flow cell including a flow cell body coupled around a drop drive assembly to receive a fluid stream of the sample fluid from a sample injection tube;
   a cuvette coupled to a base of the flow cell body, the cuvette having a pocket and a cylindrical flow channel to receive the fluid stream of the sample fluid;
   a receptacle coupled to the cuvette within the pocket by an adhesive, wherein the receptacle has a body with a through-hole having a tapered conical portion; and
   a circular nozzle assembly selectively engageable with the receptacle and the cuvette, the circular nozzle assembly having a nozzle body with a center flow channel and an o-ring gasket coupled to a top surface around the center flow channel, wherein the nozzle body has an upper tapered conical portion to engage with the tapered conical portion of the through-hole in the receptacle to align together the cylindrical flow channel of the cuvette and the center flow channel of the nozzle body.

2. The flow cytometer or cell sorter system of claim 1, wherein:
   the through-hole of the receptacle further has a cylindrical portion joined to the tapered conical portion to keep adhesive out of the through-hole.

3. The flow cytometer or cell sorter system of claim 1, wherein:
   the o-ring gasket is coupled into a ring opening portion in a top surface of the nozzle body so that a portion of the o-ring gasket extends above the top surface; and
   the extended portion of the o-ring gasket engages a surface of the cuvette in the pocket around the cylindrical flow channel when the circular nozzle assembly is engaged with the receptacle and cuvette to deter fluid leakage.

4. The flow cytometer or cell sorter system of claim 1, wherein:
   the cuvette is transparent to light over an electromagnetic spectrum including laser light, fluorescent light in a visible portion of the electromagnetic spectrum, and infrared light in a non-visible portion of the electromagnetic spectrum so that particles in the cylindrical flow channel can be excited by the laser light from lasers and the infrared light and the fluorescent light can be detected by one or more detectors.

5. The flow cytometer or cell sorter system of claim 1, wherein the nozzle body further has a lower circular cylindrical portion joined to the upper tapered conical portion, and the system further comprises:
   a movable circular mount to which the circular nozzle assembly can be mounted and dismounted.

6. The flow cytometer or cell sorter system of claim 5, wherein:
   the movable circular mount enables the circular nozzle assembly to undergo upward vertical movement to engage the cuvette and the receptacle in the tapered conical portion of the through-hole; and
   the movable circular mount further enables the circular nozzle assembly to undergo downward vertical movement to disengage from the cuvette and the receptacle.

* * * * *